(12) United States Patent
Tashiro et al.

(10) Patent No.: US 7,630,039 B2
(45) Date of Patent: Dec. 8, 2009

(54) LIQUID CRYSTAL DISPLAY DEVICE

(75) Inventors: Kunihiro Tashiro, Kawasaki (JP);
Katsufumi Ohmuro, Kawasaki (JP);
Norio Sugiura, Kawasaki (JP);
Hidefumi Yoshida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 527 days.

(21) Appl. No.: 11/267,839

(22) Filed: Nov. 4, 2005

(65) Prior Publication Data
US 2006/0055856 A1     Mar. 16, 2006

Related U.S. Application Data

(62) Division of application No. 10/714,816, filed on Nov. 17, 2003.

(30) Foreign Application Priority Data

Nov. 15, 2002   (JP)   ............................... 2002-332601

(51) Int. Cl.
*G02F 1/1335* (2006.01)
(52) U.S. Cl. ...................................... 349/120
(58) Field of Classification Search ............... 349/120
See application file for complete search history.

(56) References Cited

U.S. PATENT DOCUMENTS 5,061,042 A    10/1991  Nakamura et al.
5,737,044 A *  4/1998  Van Haaren et al. .......... 349/61
6,108,064 A *  8/2000  Minoura et al. .............. 349/130

(Continued)

FOREIGN PATENT DOCUMENTS

GB           1462987           1/1977

(Continued)

OTHER PUBLICATIONS

The Journal of the Institute of Television Engineers of Japan; vol. 50, No. 8, pp. 1091-1095; Jul. 20, 1996.

*Primary Examiner*—James A Dudek
(74) *Attorney, Agent, or Firm*—Greer, Burns & Crain, Ltd.

(57) ABSTRACT

A liquid crystal display device of the present invention is composed of a λ/4 plate 1, a λ/2 plate 2, and a polarizing plate 3 which are provided in this order from the side of a liquid crystal layer 10. Here, an angle formed between an absorption axis of the polarizing plate 3 and an absorption axis of the λ/2 plate 2 is about 45°, an in-plane retardation of the λ/2 plate 2 is set to a value obtained by adding λ/4 to an in-plane retardation of a retardation plate 1, desirably, the λ/4 plate 1, and an optical axis of the λ/4 plate 1 and an optical axis of the λ/2 plate 2 are orthogonal to each other. In this configuration, the optical axis of the λ/4 plate 1 is placed at 150°, the optical axis of the λ/2 plate 2 is placed at 60°, and the absorption axis of the polarizing plate 3 is placed at 15°. This configuration improves display characteristics, that is, performs bright display at a higher contrast ratio and in a wider viewing angle with less dependence on visual field, thereby realizing an excellent reflection-type liquid crystal display device that is very easy to view even in a relatively dim place such as an indoor environment.

9 Claims, 34 Drawing Sheets

U.S. PATENT DOCUMENTS

| | | | |
|---|---|---|---|
| 6,137,556 | A | 10/2000 | Yamahara |
| 6,141,075 | A | 10/2000 | Ohmuro et al. |
| 6,226,064 | B1 | 5/2001 | Shimada et al. |
| 6,341,002 | B1 * | 1/2002 | Shimizu et al. ............. 349/119 |
| 6,433,845 | B1 * | 8/2002 | Suzuki et al. ............... 349/102 |
| 6,781,759 | B1 | 8/2004 | Wakita et al. |
| 7,015,995 | B2 | 3/2006 | Ikeno et al. |
| 2002/0075432 | A1 | 6/2002 | Yamaguchi et al. |
| 2003/0123000 | A1 | 7/2003 | Sugiura et al. |
| 2005/0248698 | A1 | 11/2005 | Okamoto et al. |

FOREIGN PATENT DOCUMENTS

| | | |
|---|---|---|
| JP | 60-256121 | 12/1985 |
| JP | 62-210423 | 9/1987 |
| JP | 6-11711 | 1/1994 |
| JP | 6-175126 | 6/1994 |
| JP | 6-337421 | 12/1994 |
| JP | 10-153802 | 6/1998 |
| JP | 11-142836 | 5/1999 |
| JP | 11-295526 | 10/1999 |
| JP | 11-311784 | 11/1999 |
| JP | 2000-035570 | 2/2000 |
| JP | 2000-171788 | 6/2000 |
| JP | 2001-004999 | 1/2001 |
| JP | 2001-154190 | 6/2001 |
| WO | WO98/52093 | 11/1998 |

* cited by examiner

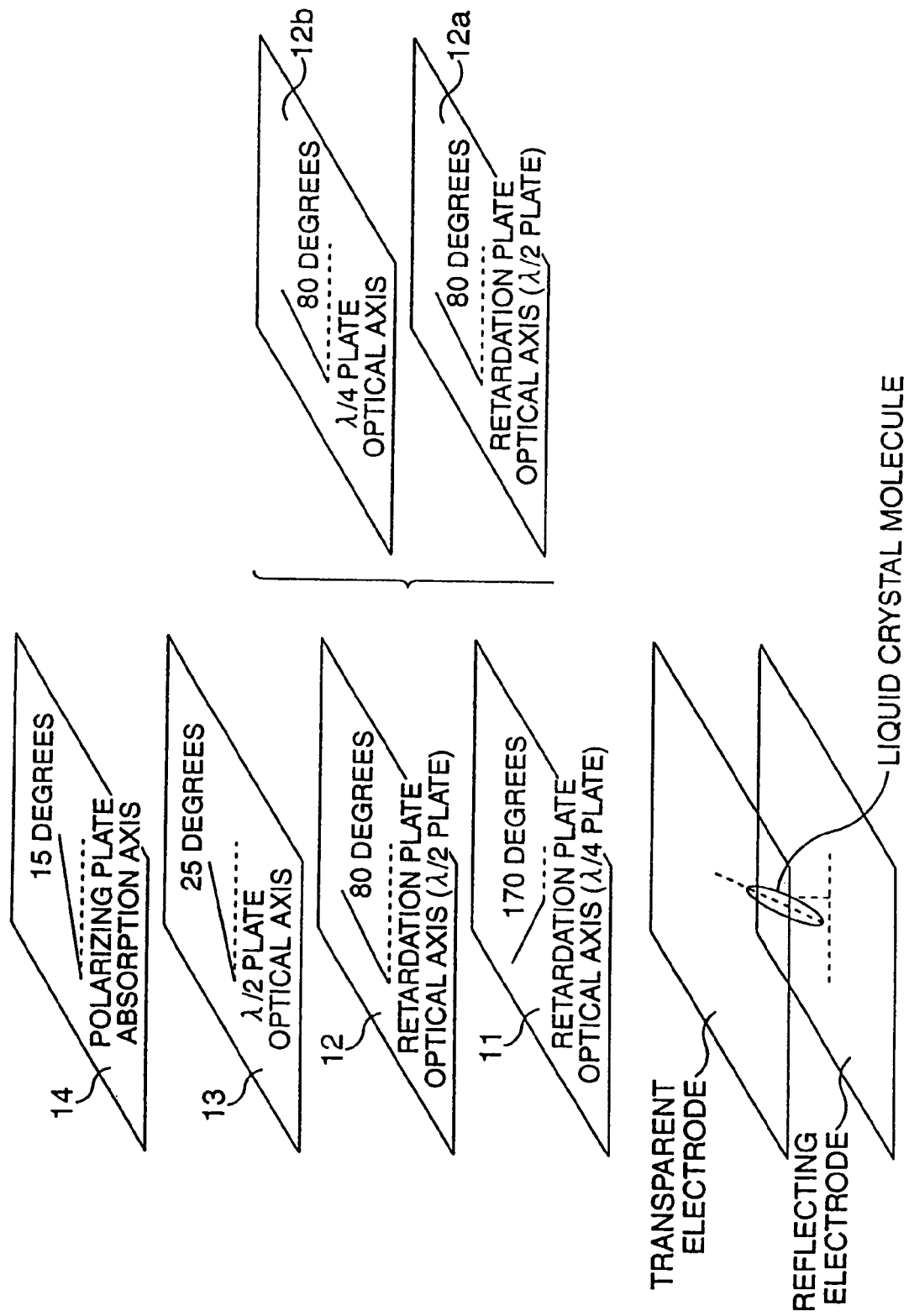

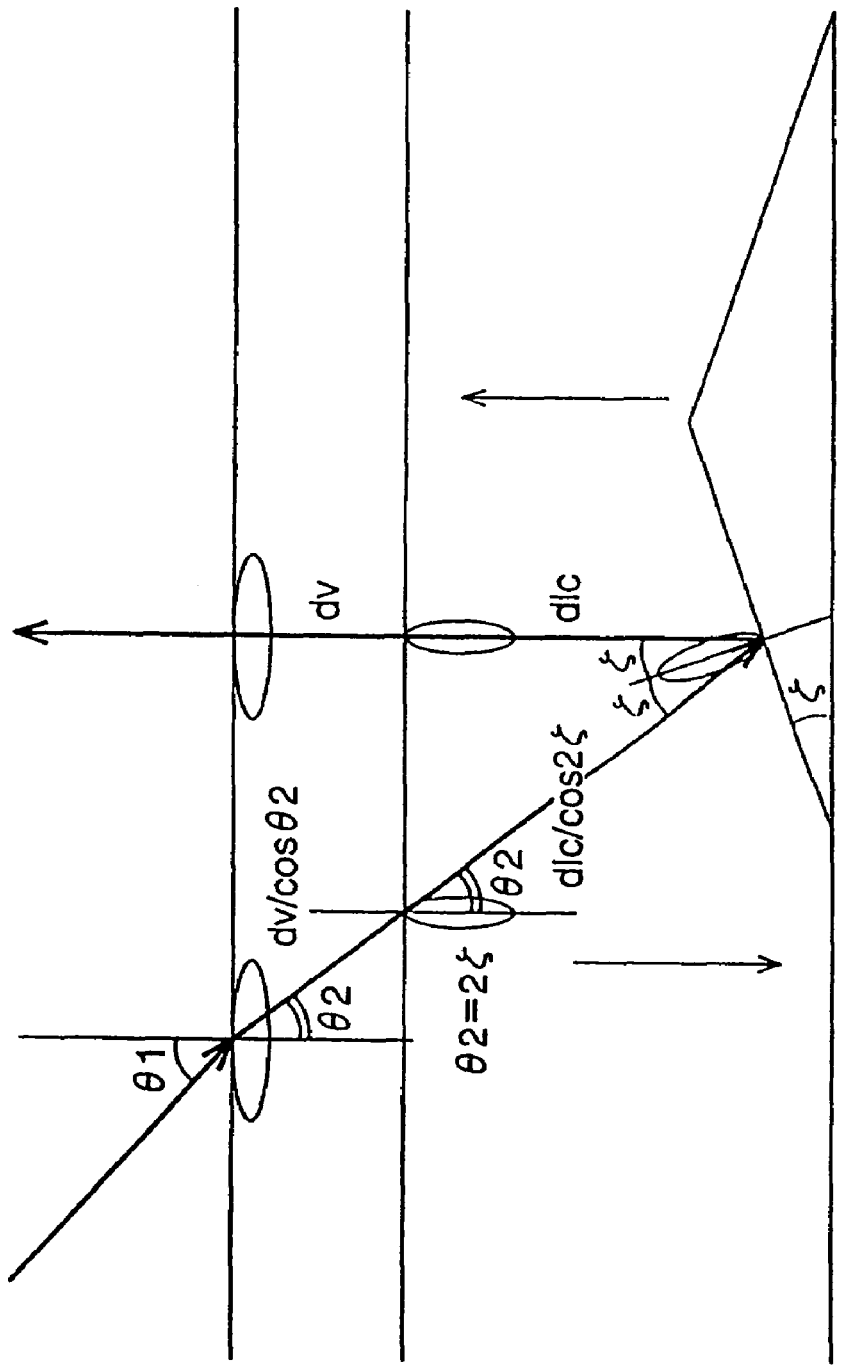

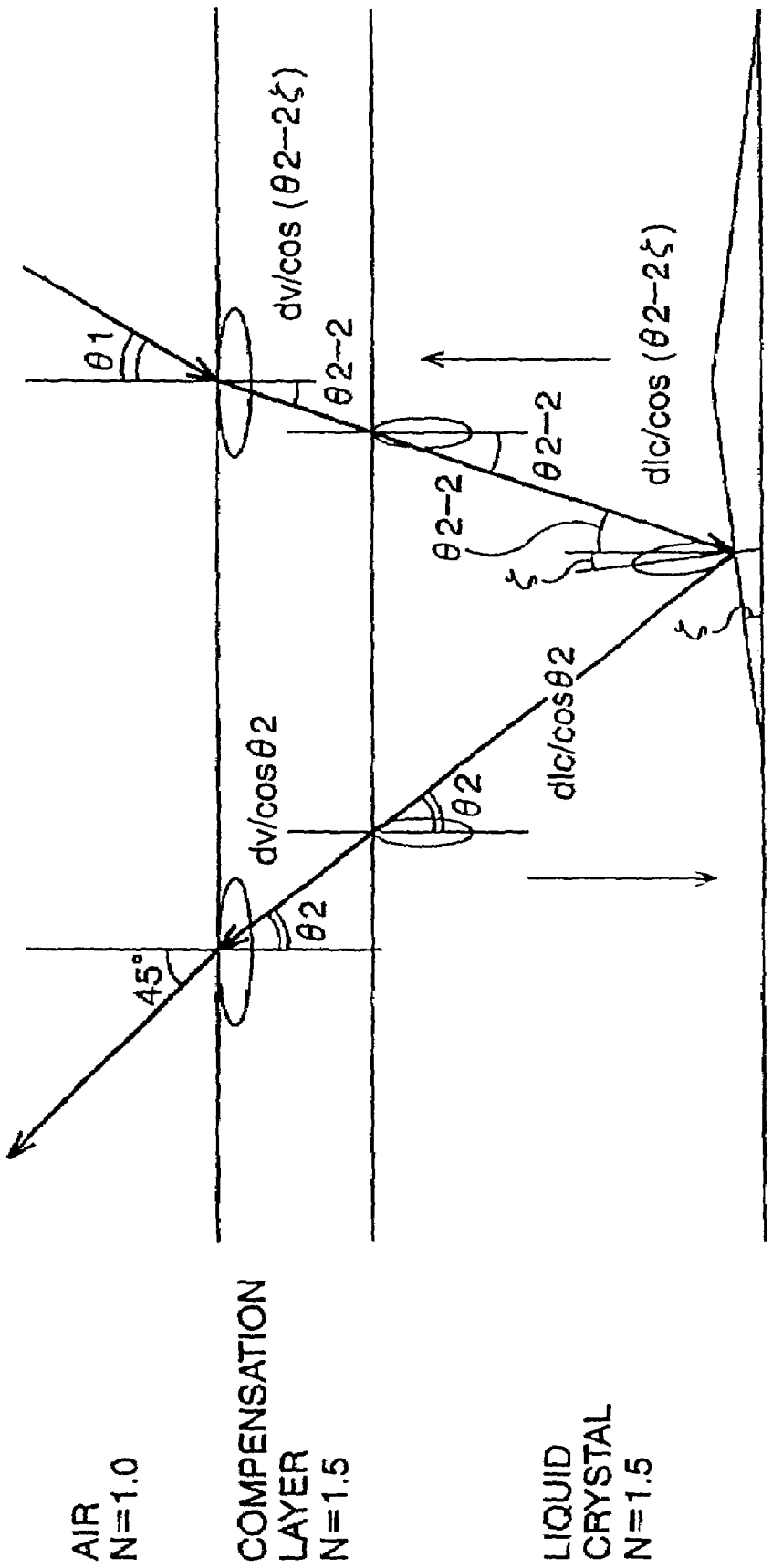

CONFIGURATION OF SINGLE POLARIZING PLATE AND MEASUREMENT METHOD

AZIMUTH ANGLE CHARACTERISTICS OF SINGLE POLARIZING PLATE (30° INCIDENCE)

CONFIGURATION OF POLARIZING PLATE + λ/4 AND MEASUREMENT METHOD

POLARIZING PLATE + λ/4 AZIMUTH ANGLE CHARACTERISTICS (1)
(30° INCIDENCE)

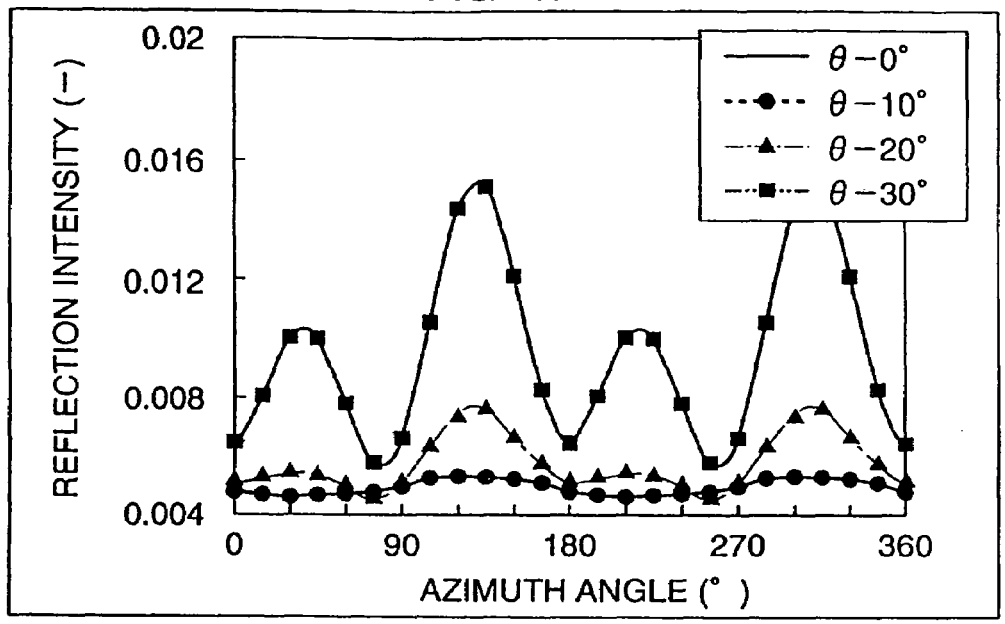
POLARIZING PLATE + λ/4 PLATE AZIMUTH ANGLE CHARACTERISTICS (2)
(0-30° INCIDENCE)
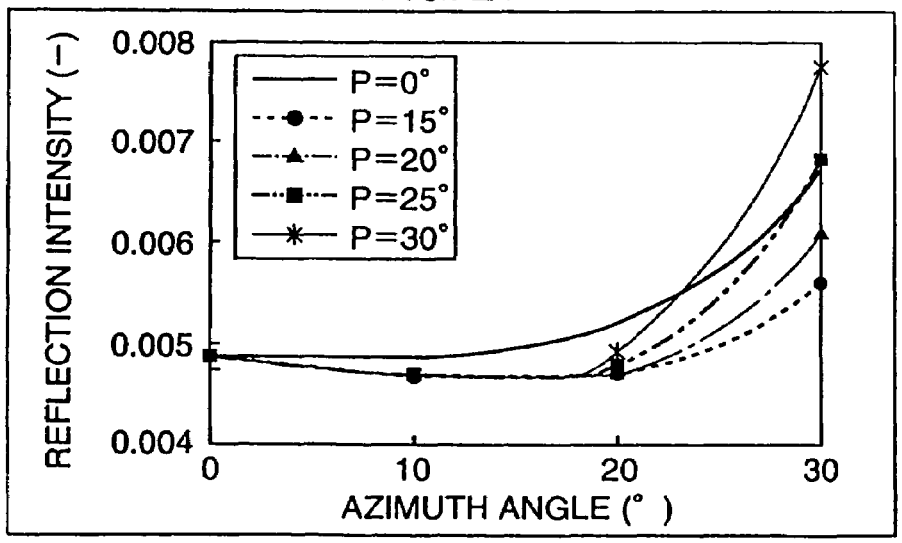
POLAEIZING PLATE + λ/4 PLATE INCIDENT ANGLE CHARACTERISTICS
(1) (270° AZIMUTH)

POLARIZING PLATE + λ/4 PLATE AZIMUTH ANGLE CHARACTERISTICS (3) (30° INCIDENCE)

POLARIZING PLATE + λ/4 PLATE AZIMUTH ANGLE CHARACTERISTICS (4) (30° INCIDENCE)

POLARIZING PLATE + λ/4 PLATE AZIMUTH ANGLE CHARACTERISTICS (5) (30° INCIDENCE)

POLARIZING PLATE + λ/4 PLATE INCIDENT ANGLE CHARACTERISTICS (2) (270° AZIMUTH)

CONFIGURATION OF POLARIZING PLATE +BROADBAND λ/4 AND MEASUREMENT METHOD

POLARIZING PLATE +BROADBAND λ/4 PLATE AXIAL CHARACTERISTICS (30° INCIDENCE, 270° AZIMUTH)

AXIS PLACEMENT OF UNIAXIALLY
STRETCHED FILMS
(ORTHOGONAL PLACEMENT)

CONFIGURATION OF POLARIZING PLATE+ λ/4+COMPENSATION PLATE AND MEASUREMENT METHOD

AZIMUTH ANGLE CHARACTERISTICS BY COMPENSATION PLATE (30° INCIDENCE)

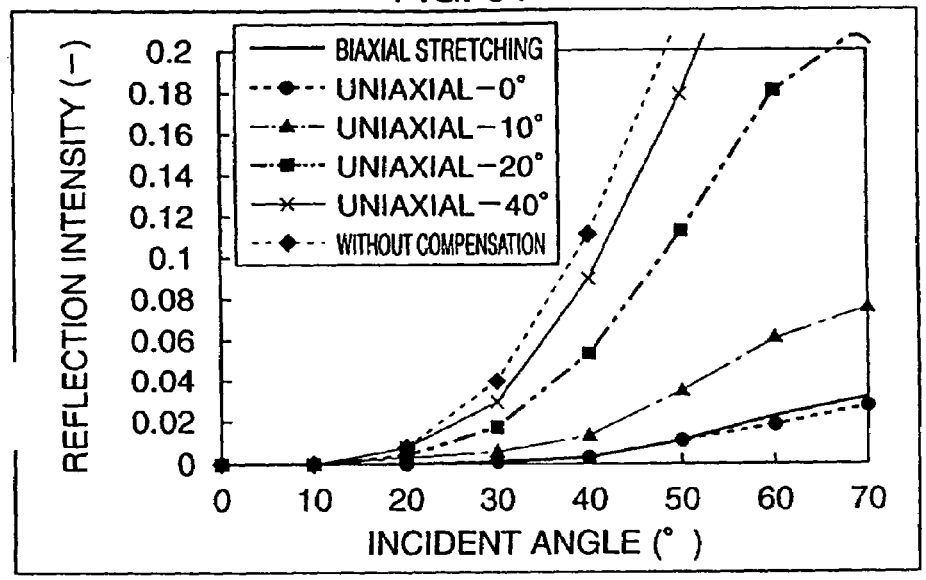
INCIDENT ANGLE CHARACTERISTICS BY COMPENSATION PLATE (270° AZIMUTH)
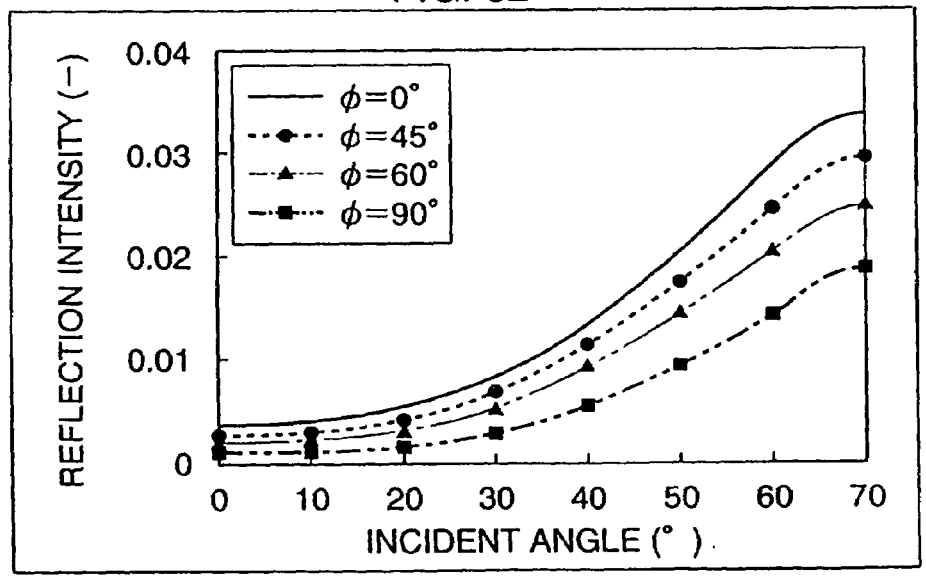
INCIDENT ANGLE CHARACTERISTICS BY ALIGNMENT AZIMUTH (DIRECTIONAL AZIMUTH)

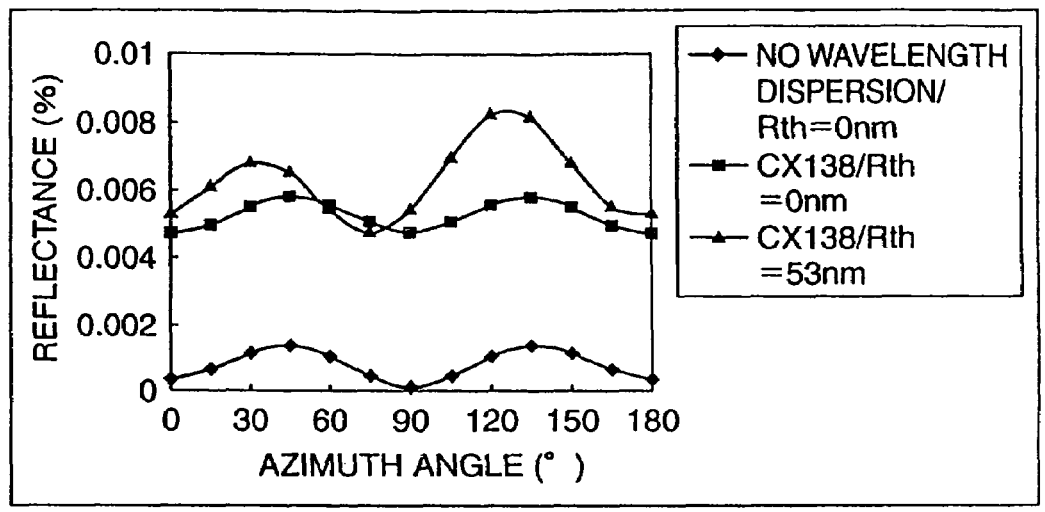
AZIMUTH DEPENDENCE OF REFLECTANCE OF
POLARIZING PLATE+λ/4 PLATE
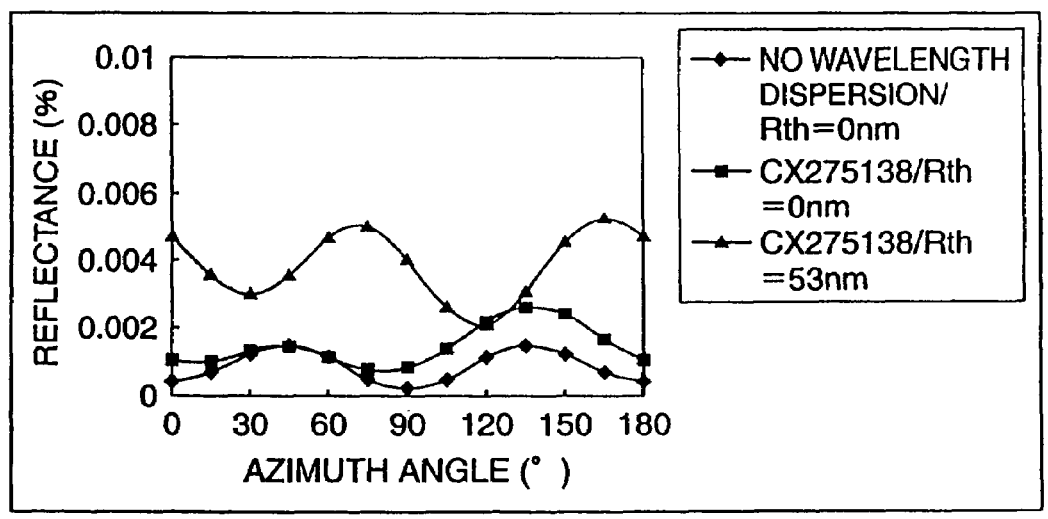
AZIMUTH DEPENDENCE OF REFLECTANCE OF
POLARIZING PLATE+BROADBAND λ/4 PLATE

NON-DIRECTIONAL REFLECTOR

DIRECTIONAL REFLECTOR

AZIMUTH DEPENDENCE OF REFLECTANCE OF
REFLECTANCE OF REFLECTOR

AZIMUTH DEPENDENCE OF REFLECTANCE OF POLARIZING PLATE + BROADBAND λ/4 PLATE+LIQUID CRYSTAL LAYER (NON-DIRECTIONAL+ λ/4 PLATE VARIABLE)

AZIMUTH DEPENDENCE OF REFLECTANCE OF POLARIZING PLATE + BROADBAND λ/4 PLATE+LIQUID CRYSTAL LAYER (DIRECTIONAL+ λ/4 PLATE VARIABLE)

AZIMUTH DEPENDENCE OF REFLECTANCE OF POLARIZING PLATE
+ BROADBAND λ/4 PLATE+LIQUID CRYSTAL LAYER
(NON-DIRECTIONAL+ λ/2 PLATE VARIABLE)

AZIMUTH DEPENDENCE OF REFLECTANCE OF POLARIZING PLATE
+ BROADBAND λ/4 PLATE+LIQUID CRYSTAL LAYER
(DIRECTIONAL+ λ/2 PLATE VARIABLE)

AZIMUTH DEPENDENCE OF REFLECTANCE OF POLARIZING PLATE
+ BROADBAND λ/4 PLATE+LIQUID CRYSTAL LAYER
(DIRECTIONAL, λ/4 PLATE VARIABLE, λ/2 PLATE VARIABLE)

AZIMUTH DEPENDENCE OF REFLECTANCE OF POLARIZING PLATE
(θ IS POLAR ANGLE)

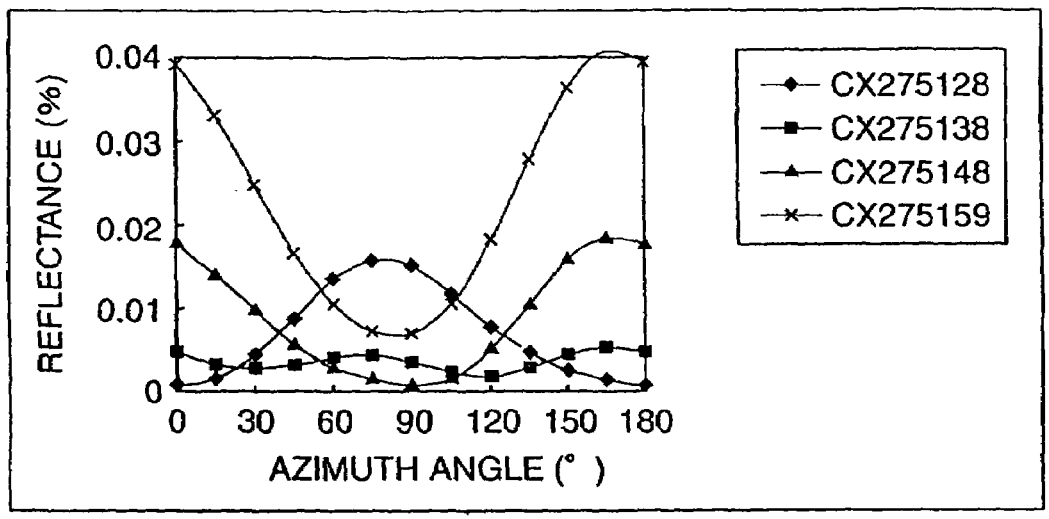

AZIMUTH DEPENDENCE OF REFLECTANCE OF POLARIZING PLATE
+ BROADBAND $\lambda/4$ PLATE + OPTICAL COMPENSATION PLATE
+ LIQUID CRYSTAL LAYER (NON-DIRECTIONAL+ $\lambda/4$ PLATE VARIABLE)

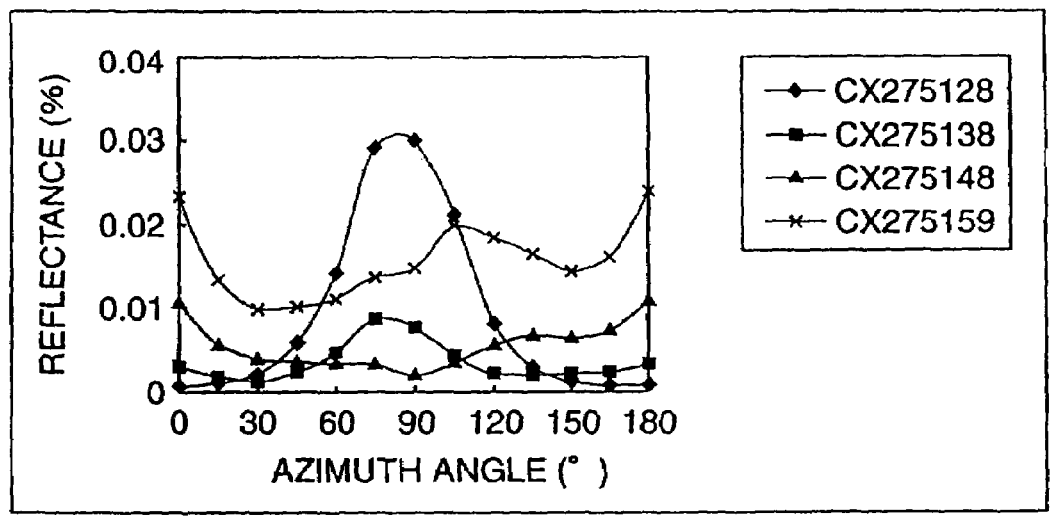

AZIMUTH DEPENDENCE OF REFLECTANCE OF POLARIZING PLATE
+ BROADBAND $\lambda/4$ PLATE + OPTICAL COMPENSATION PLATE
+ LIQUID CRYSTAL LAYER (DIRECTIONAL+ $\lambda/4$ PLATE VARIABLE)

AZIMUTH DEPENDENCE OF REFLECTANCE OF POLARIZING PLATE
+ BROADBAND λ/4 PLATE + OPTICAL COMPENSATION PLATE
+ LIQUID CRYSTAL LAYER (NON-DIRECTIONAL+ λ/2 PLATE VARIABLE)

AZIMUTH DEPENDENCE OF REFLECTANCE OF POLARIZING PLATE
+ BROADBAND λ/4 PLATE + OPTICAL COMPENSATION PLATE
+ LIQUID CRYSTAL LAYER (DIRECTIONAL+ λ/2 PLATE VARIABLE)

AZIMUTH DEPENDENCE OF REFLECTANCE OF POLARIZING PLATE
+ BROADBAND λ/4 PLATE + OPTICAL COMPENSATION PLATE
+ LIQUID CRYSTAL LAYER
(DIRECTIONAL, + λ/2 PLATE VARIABLE, λ/4 PLATE VARIABLE)

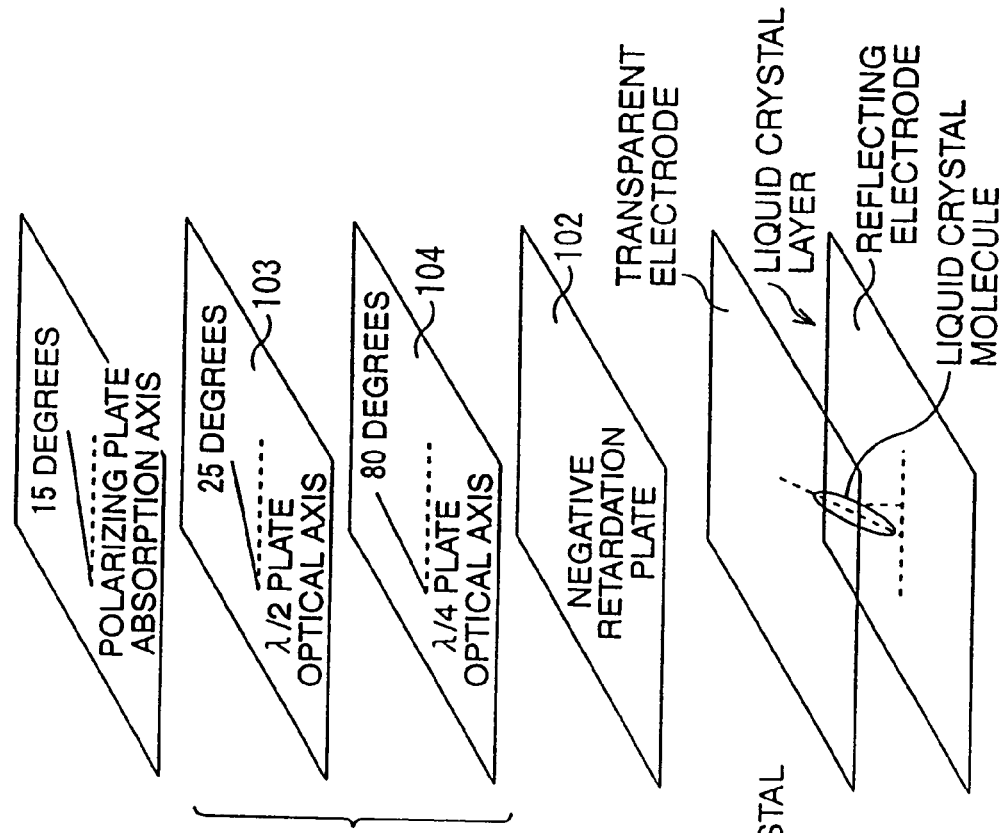
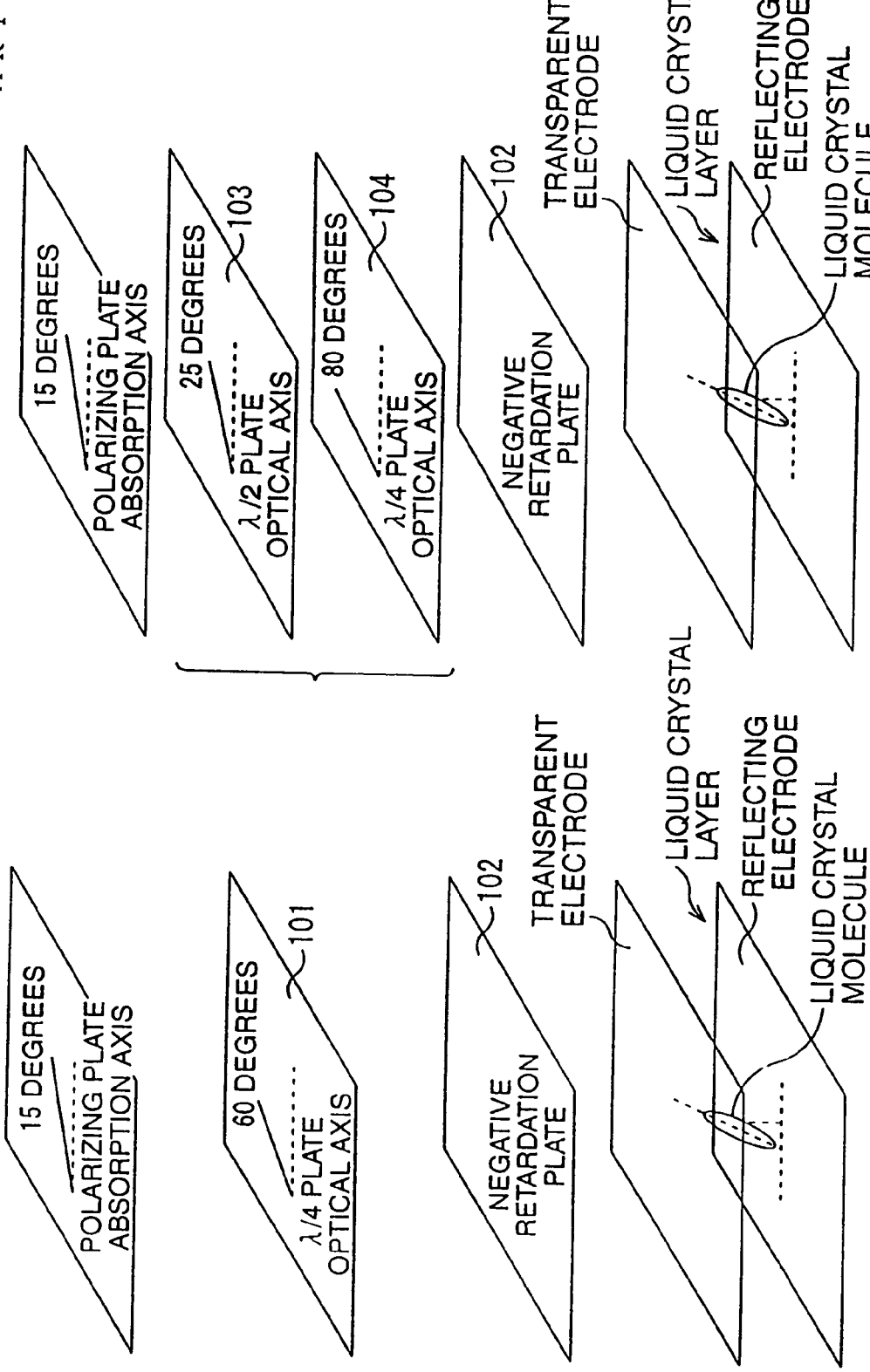

LIQUID CRYSTAL DISPLAY DEVICE

This is a Divisional of U.S. patent application Ser. No. 10/714,816, filed on Nov. 17, 2003.

CROSS-REFERENCE TO RELATED APPLICATIONS

This application is based upon and claims the benefit of priority from the prior Japanese Patent Application No. 2002-332601, filed on Nov. 15, 2002, the entire contents of which are incorporated herein by reference.

BACKGROUND OF THE INVENTION

1. Field of the Invention

The present invention relates to a reflection-type liquid crystal display device for use in low power consumption devices such as a portable terminal and the like.

2. Description of the Related Art

A reflection-type liquid crystal display device performs display by taking environmental light such as interior illumination or sunlight thereinto and reflecting it by a reflector to the observer side. This reflection-type liquid crystal display device has low power consumption because of no need for a backlight and is in wide use for a portable terminal, PDA, and so on. display through use of environmental light as described above, but tends to be relatively inferior in display characteristics such as a contrast ratio, viewing angle, and so on. Hence, the following measures are considered to improve the display characteristics.

(Measure 1)

A reflection-type liquid crystal display device is proposed which uses a vertical alignment-type liquid crystal display panel since it can realize a high contrast ratio and high reflection intensity. In these devices, vertically aligned liquid crystal molecules tilt in a O-degree azimuth where voltage is applied. As shown in FIG. 45A, a quarter-wave ($\lambda/4$) plate 101 is arranged here above a front surface of the vertical alignment-type liquid crystal display panel, and black display is performed where the application voltage is turned off.

Regarding this $\lambda/4$ plate 101, such a technique is also proposed that the plate is composed of two plates, that is, a half-wave ($\lambda/2$) plate 103 and a $\lambda/4$ plate 104 as shown in FIG. 45B to reduce wavelength dispersion of birefringence thereof. Note that only a reflecting electrode, a liquid crystal layer, and a transparent electrode are shown representing a liquid crystal panel in FIGS. 45A and B for convenience.

A liquid crystal molecule substantially vertically stands in a state where no voltage is applied to enable realization of ideal black display. Besides, in a state where voltage is applied, when a practical retardation of the liquid crystal layer becomes $\lambda/4$, white display is performed. In this reflection-type liquid crystal display device, it is effective to provide a negative retardation plate 102 between the liquid crystal panel and the $\lambda/4$ plate 101 in order to improve viewing angle characteristics. The existence of the negative retardation film compensates the retardation of the liquid crystal layer.

(Measure 2)

In the case in which environmental light is reflected by a reflector to the observer side, when the reflector is composed of a smooth mirror surface, display becomes bright in a regular reflection region and becomes dark in other regions, leading to great dependence on viewing angle, and the display in the regular reflection region may have metallic luster. Hence, such there is a known technique in which projections and depressions in dot-like plane shapes are formed on the surface of a reflector to disperse reflection light, thereby realizing display with less dependence on viewing angle and no metallic luster (see Patent Document 1).

Further, a twisted nematic (TN) mode using one polarizing plate (see Patent Document 2) is proposed as a display mode. TN mode is such a mode that liquid crystal having a positive dielectric constant anisotropy is twist-aligned in a horizontal direction, in which incident environmental light is converted into linearly polarized light by a polarizing plate for white display where no voltage is applied by rotating its polarization azimuth 180° by a retardation plate having a retardation of about a quarter of the visible light wavelength and a liquid crystal layer, and for black display where voltage is applied by rotating the polarization azimuth 90° by the retardation plate having a retardation of about a quarter of the visible light wavelength.

(Patent Document 1)
Japanese Patent Application Laid-Open No. Hei 6-175126
(Patent Document 2)
Japanese Patent Application Laid-Open No. Hei 6-11711
(Patent Document 3)
Japanese Patent Application Laid-Open No. Hei 11-311784
(Patent Document 4)
Japanese Patent Application Laid-Open No. Sho 60-256121
(Patent Document 5)
Japanese Patent Application Laid-Open No. Sho 62-210423
(Patent Document 6)
United Kingdom Patent Specification No. 1,462,978
(Patent Document 7)
Japanese Patent Application Laid-Open No. Hei 10-153802
(Patent Document 8)
Japanese Patent Application Laid-Open No. 2001-4999
(Patent Document 9)
Japanese Patent Application Laid-Open No. 2000-35570
(Patent Document 10)
Japanese Patent Application Laid-Open No. 2000-171799
(Patent Document 11)
Japanese Patent Application Laid-Open No. 2001-154190
(Patent Document 12)
Japanese Patent Application Laid-Open No. Hei 6-337421
(Non-Patent Document 1)
The journal of the Institute of Television Engineers of Japan Vol. 50, No. 8, pp 1091-1095, 1996

However, the above-described measures for improvement of display characteristics have problems as follows:

In the case of the measure 1, production of the negative retardation film requires a special and very advanced technique, such as, stretching of an optical film in two directions, or application of a special optical substance onto a film being a base, and thus the negative retardation plate is expensive.

A technique for easily realizing this negative retardation film is proposed by Tohoku University. This is produced by layering uniaxially stretched films each having a desired negative retardation and an in-plane retardation the same as the negative retardation which are orthogonal. This case, however, needs many films, leading to a problem that the display becomes thick or expensive.

In the case of the measure 2, liquid crystal anchoring to the interface of a substrate still remains without switching after application of voltage in the TN mode, leading to a problem that black luminance floats and thus a sufficient contrast ratio cannot be obtained. The visibility of display is defined by the brightness and contrast ratio, in which display is easy to view even at a low contrast ratio if it is bright, while display needs to have a high contrast ratio if it is dark (see Non-Patent Document 1). The reflection-type liquid crystal display device performs display by taking environmental light thereinto and reflecting it by a reflector to the observer side, and therefore the display is dark in an indoor environment and insufficient in contrast ratio to become hard to view.

As means for improving the contrast ratio, proposed is a technique for compensating black display by substantially matching a slow axis of a retardation plate with an anchoring azimuth of the liquid crystal layer, and decreasing the retardation of the retardation plate by a retardation remaining in the liquid crystal layer (residual retardation) (see Patent Document 3). The technique has, however, problems that a sufficient contrast ratio cannot be obtained because of colored black display due to wavelength dispersion of the liquid crystal layer greater than that of the retardation plate, and that since the retardation of the liquid crystal layer needs to be increased by the decreased retardation for white display, the driving voltage should be increased to obtain the same contrast ratio.

SUMMARY OF THE INVENTION

The present invention is made in consideration of the above problems, and its object is to improve display characteristics, that is, to realize bright display at a higher contrast ratio and in a wider viewing angle with less dependence on visual field, so as to provide an excellent reflection-type liquid crystal display device that is very easy to view even in a relatively dim place such as an indoor environment.

As a result of earnest studies, the present inventor has devised various aspects described below.

A liquid crystal display device of the present invention comprises: a reflecting layer for reflecting incident light; a liquid crystal layer provided on the reflecting layer; and an optical compensation plate provided on a front surface of the liquid crystal layer, wherein the optical compensation plate has a layer structure constituted of a first retardation plate, a second retardation plate, and a polarizing plate from a side close to the liquid crystal layer, and wherein the first and second retardation plates have uniaxial anisotropies respectively, and both are superposed to create, in a combined manner, a function of a quarter-wave plate and a function of a negative retardation plate.

A liquid crystal display device of the present invention comprises: a reflecting layer for reflecting incident light; a liquid crystal layer provided on the reflecting layer, in which alignment of liquid crystal molecules is vertical; and a retardation plate and a polarizing plate provided on a front surface of the liquid crystal layer, wherein the reflecting layer has projections and depressions formed on a surface thereof, an average tilt angle of the projections and depressions being a value of not less than about 4° nor greater than about 6°, and wherein the retardation plate has a negative refractive index anisotropy in a vertical direction to a surface thereof, a ratio between a retardation Rf thereof and a retardation Rlc of the liquid crystal layer, Rf/Rlc, being a value of 0.6 to 0.9.

In this case, in another aspect of the present invention, the reflecting layer has projections and depressions formed on a surface thereof, an average tilt angle of the projections and depressions being a value of not less than about 10° nor greater than about 15°, and the retardation plate has a negative refractive index anisotropy in a vertical direction to a surface thereof, a ratio between a retardation Rf thereof and a retardation Rlc of the liquid crystal layer, Rf/Rlc, being a value of not less than 0.4 nor greater than 0.7.

In this case, in another aspect of the present invention, the reflecting layer has projections and depressions formed on a surface thereof, an average tilt angle of the projections and depressions being a value of not less than about 7° nor greater than about 9°, and the retardation plate has a negative refractive index anisotropy in a vertical direction to a surface thereof, a ratio between a retardation Rf thereof and a retardation Rlc of the liquid crystal layer, Rf/Rlc, being a value of not less than 0.5 nor greater than 0.8.

Further, in still another aspect of the present invention, the retardation plate has a retardation of a quarter of a visible light wavelength in an in-plane direction thereof, and is arranged such that an angle formed between an azimuth φ in which the reflection intensity is maximum and an absorption axis P of the polarizing plate is a value of not less than about 65° nor greater than about 90°, and an angle formed between a slow axis $F_1$ of the retardation plate and the absorption axis P is about 45°.

Further, in still another aspect of the present invention, the retardation plate has a retardation of a quarter of a visible light wavelength in an in-plane direction thereof, and is arranged such that an angle formed between an azimuth φ in which the reflection intensity is maximum and an absorption axis P of the polarizing plate is a value of not less than about 90° nor greater than about 115°, and an angle formed between a slow axis $F_1$ of the retardation plate and the absorption axis P is about 135°.

Further, in still another aspect of the present invention, the liquid crystal molecules of the liquid crystal layer are aligned such that an angle formed between an azimuth φ in which the reflection intensity is maximum and a director azimuth L for the liquid crystal molecules is not less than about 45° nor greater than about 90°.

A liquid crystal display device of the present invention comprises: a reflecting layer with projections and depressions having azimuthal anisotropies on reflection intensity formed on a surface thereof, for reflecting incident light; a liquid crystal layer provided on the reflecting layer, in which alignment of liquid crystal molecules is vertical; and a quarter-wave plate, a half-wave plate, and a polarizing plate provided in order on a front surface of the liquid crystal layer, wherein respective applicable wavelengths of the quarter-wave plate and the half-wave plate are made different so that retardations caused by the quarter-wave plate, the half-wave plate, and the liquid crystal layer due to an oblique incidence or oblique emission in an azimuth in which the reflection intensity is maximum are made smaller than the retardations in an azimuth in which the reflection intensity is minimum. The applicable wavelength here refers to a wavelength that causes a retardation of λ/4 or λ/2 by a λ/4 plate or a λ/2 plate.

In another aspect of the present invention, the respective applicable wavelengths of the quarter-wave plate and the half-wave plate are made different by a value of not less than 20 nm nor greater than 200 nm.

Further, in still another aspect of the present invention, the applicable wavelength of the quarter-wave plate is made smaller than the applicable wavelength of the half-wave plate.

Further, in still another aspect of the present invention, there further provided is a negative retardation plate between the liquid crystal layer and the quarter-wave plate, wherein the applicable wavelength of the quarter-wave plate is made larger than the applicable wavelength of the half-wave plate.

Further, in still another aspect of the present invention, there further provided is another half-wave plate between the half-wave plate and the polarizing plate, wherein slow axes of the quarter-wave plate and the half-wave plate are substantially orthogonal, and the applicable wavelength of the half-wave plate is made larger than the applicable wavelength of the other half-wave plate.

According to the present invention, it becomes possible to improve display characteristics, that is, to perform bright display at a higher contrast ratio and in a wider viewing angle with less dependence on visual field, so as to realize an excellent reflection-type liquid crystal display device that is very easy to view even in a relatively dim place such as an indoor environment.

BRIEF DESCRIPTION OF THE DRAWINGS

FIG. 3 is a perspective view for explaining a principle configuration 2 in the main point 1 of the present invention;

FIG. 12 is a schematic diagram showing a method for estimating the retardation of a liquid crystal layer where no voltage is applied and the retardation of a retardation plate;

FIG. 13 is a schematic diagram showing a method for estimating the retardation of a liquid crystal layer where no voltage is applied and the retardation of a retardation plate;

FIG. 20 is a characteristic diagram showing azimuth angle characteristics, for every incident angle, of the reflection intensity measured with the incident angle and the azimuth angle varied;

FIG. 21 is a characteristic diagram showing incident angle characteristics of the reflection intensity measured when the observation azimuth was fixed to 90°, and the incident angle and the rotation angle of the axis placement were varied;

FIG. 31 is a characteristic diagram showing incident angle characteristics of the reflection intensity measured when the observation azimuth was fixed to 90°, and the incident angle and the angle formed between a slow axis of a uniaxially stretched film and a directional azimuth were varied;

FIG. 32 is a characteristic diagram showing incident angle characteristics of the reflection intensity measured when the observation azimuth was fixed to 270°, and the angle formed between an azimuth of liquid crystal alignment and a directional azimuth was varied;

FIG. 35A is a characteristic diagram showing azimuth dependence of the reflectance of a polarizing plate+a $\lambda/4$ plate;

FIG. 35B is a characteristic diagram showing azimuth dependence of the reflectance of a polarizing plate+a broadband $\lambda/4$ plate;

FIG. 42A is a characteristic diagram showing azimuth dependence of the reflectance (for a non-directional reflector) of a polarizing plate+a broadband λ/4 plate+an optical compensation plate+a liquid crystal layer when the in-plane retardation of a λ/4 plate can be changed between 128 nm and 159 nm;

FIG. 42B is a characteristic diagram showing azimuth dependence of the reflectance (for a directional reflector) of a polarizing plate+a broadband λ/4 plate+an optical compensation plate+a liquid crystal layer when the in-plane retardation of a λ/4 plate can be changed between 128 nm and 159 nm;

FIG. 45A and FIG. 45B are perspective views showing optical compensation plate configurations of conventional reflection-type liquid crystal display devices.

DETAILED DESCRIPTION OF THE PREFERRED EMBODIMENTS

Main Points of the Present Invention (Main Point 1)

To solve the above-described problems, the present invention aims to reduce the number of films while using general-purpose films, and to optimize the retardation of a liquid crystal panel in conformity thereto. Specifically, at least two retardation plates are used to create, in a combined manner, the function of a λ/4 plate and the function of a negative retardation plate. The λ/4 plate here is a film having a retardation of a quarter of the wavelength of assumed light, for example, visible light. Besides, the negative retardation Rm is defined by $Rm=((n_x+n_y)/2-n_z) \cdot d$ where the refractive indexes in an x direction, a y direction and a z direction are $n_x$, $n_y$, and $n_z$ respectively, and the optical path length is d.

[Principle Configuration 1]

Figure 1:
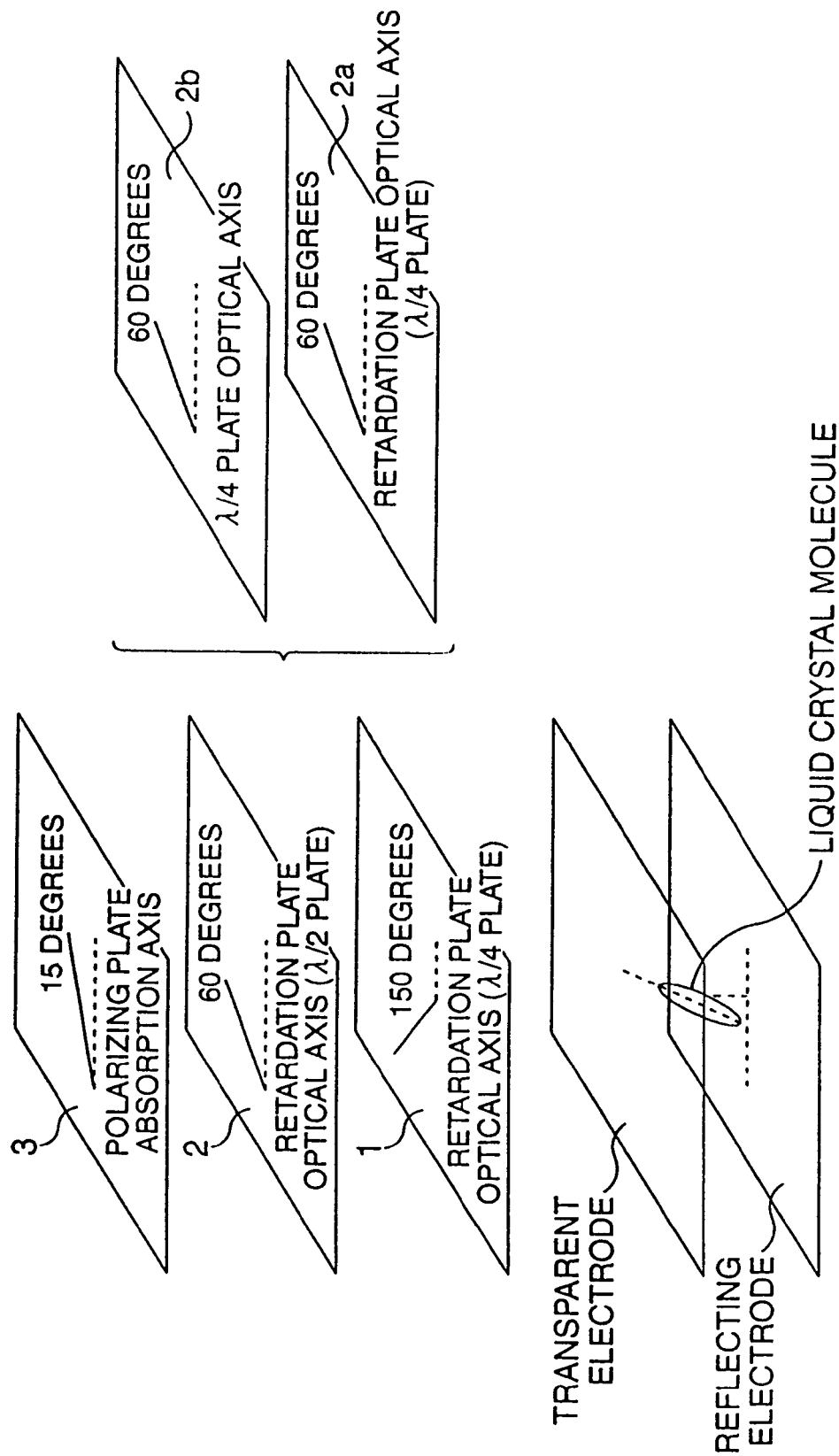
FIG. 1 is a perspective view for explaining a principle configuration 1 in a main point 1 of the present invention.

A specific principle configuration of the present invention is shown in FIG. 1.

A main configuration of a liquid crystal display device of the present invention is made by providing, for example, a liquid crystal layer in which vertically aligned liquid crystal molecules tilt in a 0° azimuth where voltage is applied, a λ/4 plate 1 being a first retardation plate, for example, a λ/2 plate 2 being a second retardation plate, and a polarizing plate 3, in this order from the side of a liquid crystal panel (only a reflecting electrode, a liquid crystal layer, and a transparent electrode are shown representing a liquid crystal panel for convenience in FIG. 1 and later-described FIG. 2 and FIG. 3). In this configuration, an angle formed between an absorption axis of the polarizing plate 3 and an absorption axis of the λ/2 plate 2 is about 45°, an in-plane retardation of the λ/2 plate 2 is set to a value obtained by adding λ/4 to an in-plane retardation of the retardation plate 1, desirably, the λ/4 plate 1 (For example, when the in-plane retardation of the retardation plate 1, desirably, the λ/4 plate 1 is λ/4+α, the in-plane retardation of the λ/2 plate 2 is λ/2+α. The retardation plate 1 is described as the λ/4 plate 1 hereinafter, but is not limited to the λ/4 plate.), and an optical axis of the λ/4 plate 1 and an optical axis of the λ/2 plate 2 are orthogonal to each other. In this configuration, the optical axis of the λ/4 plate 1 is placed at 150°, the optical axis of the λ/2 plate 2 is placed at 60°, and the absorption axis of the polarizing plate 3 is placed at 15°.

Note that the liquid crystal panel is shown in the form in which the liquid crystal layer is sandwiched between a lower substrate with a reflecting layer formed thereon and an upper substrate with a transparent electrode formed thereon, for convenience in the example shown in the drawing.

Figures 2A, 2B:
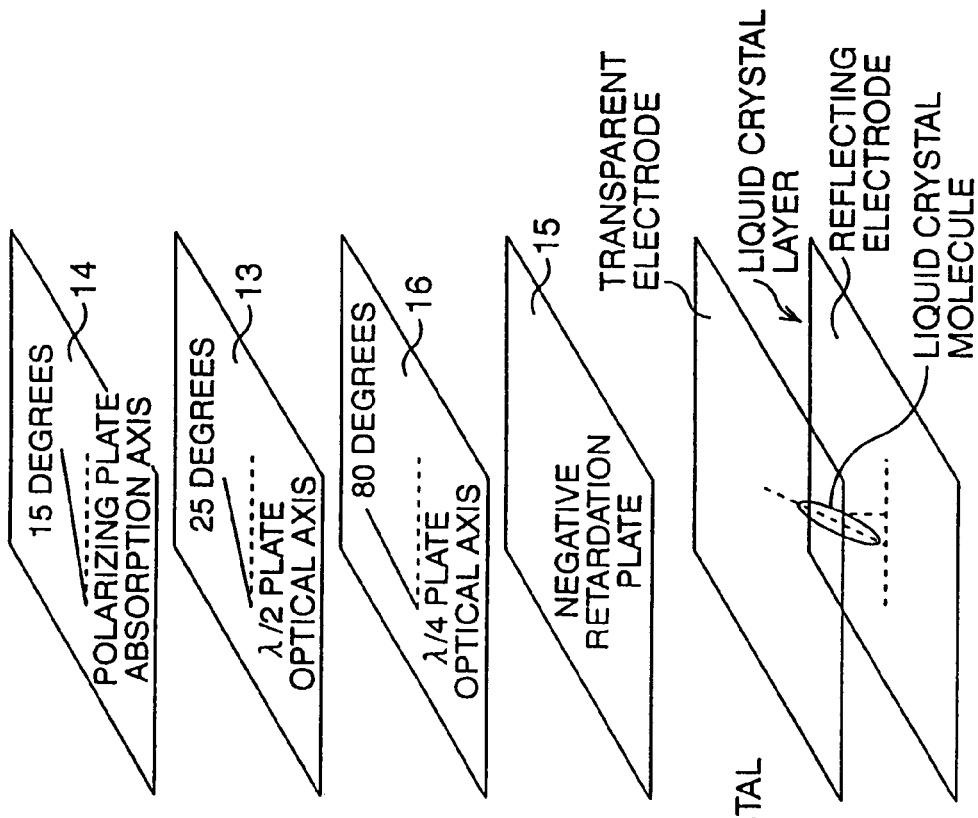
FIG. 2A and FIG. 2B are perspective views for explaining the principle configuration 1 in the main point 1 of the present invention.

The λ/2 plate 2 practically has a function obtained by superposing two retardation plates, that is, λ/4 plates 2a and 2b having optical axes both at angles of 60°. The retardation of plate 2 is obtained by adding λ/4 to the retardation of plate 2a. Further, the optical axes of the λ/4 plate 2a and λ/4 plate 1 are orthogonal to each other so that their in-plane retardations cancel each other out to be 0, and only the sum of negative retardations of them remains. In other words, the superposition of the λ/4 plate 1 and the λ/2 plate 2 provides the same function as that of a configuration provided with a negative retardation plate 4 and a λ/4 plate 5 as shown in FIG. 2A. In FIG. 2A, the vertically aligned liquid crystal molecule tilts in a 0° azimuth where voltage is applied.

Although the case in which each of the λ/4 plate 2a and the λ/4 plate 1 has an in-plane retardation of λ/4 is taken as an example here, the value of the negative retardation is determined by the relation between refractive indexes of the λ/4 plate here. For a completely uniaxial retardation plate, the negative retardation is 137 nm because $n_y$ and $n_z$ are equal. However, it is typical that a biaxial λ/4 plate is produced depending on the manufacturing method, and therefore the above value slightly varies. Here, especially when $n_z$ is greater than $n_y$, the viewing angle characteristics are better.

[Principle Configuration 2]

A specific principle configuration is shown in FIG. 3 as another example of the present invention. Only a reflecting electrode, a liquid crystal layer, and a transparent electrode are representatively illustrated here for convenience.

A main configuration of a liquid crystal display device of the present invention is made by providing, for example, a λ/4 plate 11 being a first retardation plate, for example, a λ/2 plate 12 being a second retardation plate, a λ/2 plate 13 being a third retardation plate, and a polarizing plate 14, in this order from the side of a liquid crystal panel. It should be noted that the λ/2 plate 12 and the λ/2 plate 13 may be described together as the second retardation plate. In this configuration, where the angle formed between an absorption axis of the polarizing plate 14 and an optical axis of the λ/2 plate 13 is θ, an angle formed between the optical axis of the λ/2 plate 13 and an optical axis of the λ/2 plate 12 is θ±45°, an in-plane retardation of the λ/2 plate 12 should be a value obtained by adding λ/4 to an in-plane retardation of the λ/4 plate 11 (For example, when the in-plane retardation of the λ/4 plate 11 is λ/4β, the in-plane retardation of the λ/2 plate 12 is λ/2+β.), and an optical axis of the λ/4 plate 11 and the optical axis of the λ/2 plate 12 are orthogonal to each other. Here, the optical axis of the λ/4 plate 11 is placed at 170°, the optical axis of the λ/2 plate 12 is placed at 80°, the optical axis of the λ/2 plate 13 is placed at 25°, and the absorption axis of the polarizing plate 14 is placed at 15°.

The λ/2 plate 12 practically has a function obtained by superposing two retardation plates, that is, λ/4 plates 12a and 12b having optical axes both at angles of 80°. The in-plane retardation of the λ/2 plate 12 is the sum of an in-plane retardation of the λ/4 plate 12a and λ/4, and the in-plane retardation of the λ/4 plate 12a is the same as the in-plane retardation of the λ/4 plate 11. In this case, the superposition of the λ/4 plate 12b and the λ/2 plate 13 creates a function of the λ/4 plate of reverse dispersion. Further, the optical axes of the λ/4 plate 12a and λ/4 plate 11 are orthogonal to each other so that their in-plane retardations cancel each other out to be 0, and only the sum of negative retardations of them remains. In other words, the superposition of the λ/4 plate 11 and the λ/2 plate 12 provides the same function as that of a configuration provided with a negative retardation plate 15 and a λ/4 plate 16 as shown in FIG. 2B. In FIG. 2B, the vertically aligned liquid crystal molecule tilts in a 0° azimuth where voltage is applied.

The value of the negative retardation is determined by the relation between refractive indexes of the retardation plate here. For a completely uniaxial retardation plate, the negative retardation is half the in-plane retardations of the retardation plate because $n_y$ and $n_z$ are equal. In this example, the negative retardation is the same as the in-plane retardations because of a combination of the two retardation plates. However, it is typical that a biaxial plate is produced depending on the manufacturing method, and therefore the above value slightly varies. Here, especially when $n_z$ is greater than $n_y$, the viewing angle characteristics are better.

(Main Point 2)

In the present invention, the vertical alignment (VA) mode using one polarizing plate is used as the display mode, in which a retardation plate having a specific retardation for every average tilt angle of reflecting projections and depressions is arranged between the polarizing plate and a liquid crystal layer. This can propose optimal compensation conditions for every average tilt angle and realize compensation using a less expensive retardation plate. The large and small average tilt angles are selectively used in such a manner that a small average tilt angle is used for a small panel and a large average tilt angle is used for a large panel. This is because it is assumed that the small panel is used in an environment closer to a light source because of its good portability, in which case light emitted in a vertical direction to the substrate is incident at a relatively shallow angle. On the other hand, it is assumed that the large panel is used in an environment rather far from a light source, such as on a desk or the like, because of its poor portability, in which case light emitted in a vertical direction to the substrate is incident at a relatively deep angle.

The VA mode is reverse to the TN mode in the switching, but is the same in performance of black display by converting incident environmental light into linearly polarized light by a polarizing plate, and rotating its polarization azimuth 90° by a retardation plate having a retardation of about a quarter of the visible light wavelength so as to cause a polarizing plate to absorb it. In the VA mode, however, since the black display is performed where no voltage is applied, it never happens that a liquid crystal layer anchoring to the interface of the substrate remains without switching as in the TN mode, resulting in improved contrast ratio in principle.

However, in the reflection-type liquid crystal display device with the reflecting projections and depressions, since light reflected to the observer side (in a substrate vertical direction) is an almost oblique incidence, and the liquid crystal on the substrate interface is also tilt-aligned due to the reflecting projections and depressions, the liquid crystal layer has a retardation even where no voltage is applied. It is possible to estimate this retardation since the incident and emitted angles of light with respect to the liquid crystal can be obtained if the observation angle (emitted angle) to the substrate surface and the tilt angle distribution of the reflecting projections and depressions are already known, and it is possible to obtain completely black display by canceling the retardation of a liquid crystal layer through use of a retardation plate having a negative refractive index anisotropy in a substrate vertical direction and having a retardation substantially equivalent to this retardation.

As the technique for compensating the retardation of a vertically aligned liquid crystal layer through use of the retardation plate having a negative refractive index anisotropy in the substrate vertical direction, there is a known method in which elliptically polarized light is generated from obliquely incident light, the long axis of the elliptically polarized light forming a fixed angle with respect to an observation surface, and a retardation plate is configured to erase this angle when the obliquely falling light has completely passed through the liquid crystal layer (see Patent Document 4). This technique is characterized in that the retardation plate is set so that the obliquely incident light becomes circularly polarized light when reaching a reflector.

However, in the reflection-type liquid crystal display device having the reflecting projections and depressions, since the liquid crystal is tilt-aligned due to the reflecting projections and depressions, the incident angle of light to the liquid crystal in an approach route differs from that in a return route, and retardations occurring therein are also different from each other. In the aforementioned technique, when the retardations occurring in the approach route and return route are equal, they are established as compensation conditions, but when the retardations are different from each other, they are not established as compensation conditions because of generation of discrepancy therebetween.

Further, there is another known method for performing compensation through use of a birefringence compensation medium (retardation plate) with one refractive index ($n_z$) lower than two other refractive indexes ($n_x$, $n_y$) (see Patent Document 5). This technique compensates the retardation which occurs when the liquid crystal display device is viewed from an oblique direction, through use of a retardation plate having a refractive index anisotropy of $n_x$, $n_y > n_z$, but such a retardation plate needs to be subjected to advanced stretching processing such as biaxial stretching in order to prevent occurrence of a large retardation in the substrate in-plane direction and is thus expensive as compared to a uniaxially stretched retardation plate.

[Principle Configuration 1]

This liquid crystal display device comprises a reflecting layer for reflecting incident light, a liquid crystal layer provided on the reflecting layer, in which alignment of liquid crystal molecules is vertical, and a retardation plate and a polarizing plate which are provided on a front surface of the liquid crystal layer. The reflecting layer has projections and depressions formed on a surface thereof, an average tilt angle of the projections and depressions being a value of not less than about 4° nor greater than about 6°, and the retardation plate has a negative refractive index anisotropy in a vertical direction to a surface thereof, a ratio between a retardation Rf thereof and a retardation Rlc of the liquid crystal layer, Rf/Rlc, being a value of not less than 0.6 nor greater than 0.9. It is possible to estimate the retardation of the liquid crystal layer where no voltage is applied from the observation angle (emitted angle) to the substrate surface and the tilt angle distribution of reflecting projections and depressions, but such a problem often happens that an optimal retardation at an observation angle is not optimal at another observation angle. This difference is conspicuous especially when the average tilt angle of the reflecting projections and depressions is small, and therefore light greatly leaks at a specific angle, leading to great loss of contrast characteristics, unless a retardation plate is selected in full consideration of at which observation angle the retardation is to be cancelled prior to others.

Specifically, when the average tilt angle of the reflecting projections and depressions is not less than about 4° nor greater than about 6°, light emitted at an observation angle of 0° (in the substrate vertical direction) is incident on/emitted from the liquid crystal layer at a shallow angle of not less than about 0° nor greater than about 12°, so that the optimal retardation is small, while light emitted at an observation angle of 45° is incident on/emitted from the liquid crystal layer at a deep angle of not less than about 16° nor greater than about 28°, so that the optimal retardation is large. When the optimal retardation greatly differs depending on the observation angle as described above, it is preferable to set a retardation plate in conformity to the larger retardation. This leads to excessive compensation at the observation angle of 0° to cause black floating, but the light emitted at the observation angle of 0° is incident on the liquid crystal layer at a shallow angle, so that the retardation due to the excessive compensation is also small, resulting in little influence. In this way, finding the optimal retardation Rf from the observation angle which causes a large retardation and the average tilt angle of the reflecting projections and depressions results in substantially $0.6 \leq Rf/Rlc \leq 0.9$. The reason why the tilt angle of the reflecting projections and depressions is shown not by the tilt angle distribution but by the average tilt angle is that the average tilt angle is the center of probability which can be obtained from the tilt angle distribution, and therefore the central value causes only a small error even if it is used for discussion of the tilt angle.

Besides, the reason why Rf is expressed through the ratio with respect to the retardation Rlc which is obtained from the cell thickness and the birefringence difference of the liquid crystal layer is that Rf of the retardation plate changes in proportion to the retardation Rlc of the liquid crystal layer. The reason why the observation angles are set to 0° and 45° is that about 0° is for the case in which an observer holds the reflection-type liquid crystal display device in hands and observes it in front of him or her, and about 45° is for the case in which the observer puts the reflection-type liquid crystal display device on a desk or the like and observes it in an oblique direction, and therefore if these two different observation angles are taken into consideration to estimate the optimal retardation, substantially excellent contrast characteristics can be expected within a practical observation range. On the contrary, an observation angle greater than this, even when regarded as one to be compensated, exceeds a practically required observation range and also undesirably causes a great trade off with front surface characteristics.

[Principle Configuration 2]

This liquid crystal display device comprises a reflecting layer for reflecting incident light, a liquid crystal layer provided on the reflecting layer, in which alignment of liquid crystal molecules is vertical, and a retardation plate and a polarizing plate provided on a front surface of the liquid crystal layer. The reflecting layer has projections and depressions formed on a surface thereof, an average tilt angle of the projections and depressions being a value of not less than about 7° nor greater than about 9°, and the retardation plate has a negative refractive index anisotropy in a vertical direction to a surface thereof, a ratio between a retardation Rf thereof and a retardation Rlc of the liquid crystal layer, Rf/Rlc, being a value of not less than 0.5 nor greater than 0.8. When the average tilt angle of the reflecting projections and depressions is not less than about 7° nor greater than about 9°, light emitted at an observation angle of 0° (in the substrate vertical direction) is incident on/emitted from the liquid crystal layer at not less than about 0° nor greater than about 18°, while light emitted at an observation angle of 45° is incident on/emitted from the liquid crystal layer at an angle of not less than about 10° nor greater than about 28°. When the average tilt angle is increased, incident angles on the liquid crystal partially overlap with each other, so that the difference in retardation depending on the observation angle decreases. Accordingly, finding the optimal retardation Rf results in substantially $0.5 \leq Rf/Rlc \leq 0.8$.

[Principle Configuration 3]

This liquid crystal display device comprises a reflecting layer for reflecting incident light, a liquid crystal layer provided on the reflecting layer, in which alignment of liquid crystal molecules is vertical, and a retardation plate and a polarizing plate provided on a front surface of the liquid crystal layer. The reflecting layer has projections and depressions formed on a surface thereof, an average tilt angle of the projections and depressions being a value of not less than about 10° nor greater than about 15°, and the retardation plate has a negative refractive index anisotropy in a vertical direction to a surface thereof, a ratio between a retardation Rf thereof and a retardation Rlc of the liquid crystal layer, Rf/Rlc, being a value of not less than 0.4 nor greater than 0.7. When the average tilt angle of the reflecting projections and depressions is not less than about 10° nor greater than about 15°, light emitted at an observation angle of 0° (in the substrate vertical direction) is incident on the liquid crystal layer at about 10° to about 30°, while light emitted at an observation angle of 45° is incident on the liquid crystal layer at an angle of not less than about 0° nor greater than about 28°. When the average tilt angle is further increased, incident angles on the liquid crystal substantially overlap with each other, so that retardations at the observation angles decrease in difference of magnitude or become substantially equal. In such a case, it is only required to perform arbitrary selection depending on at which observation angle the contrast ratio is given priority, and finding the optimal retardation Rf results in substantially $0.4 \leq Rf/Rlc \leq 0.7$.

In the principle configurations 1 to 3, the retardation plate preferably has an $N_z$ coefficient of 1 or less. The $N_z$ coefficient is expressed by $N_z=(n_x-n_z)/(n_x-n_y)$, so that for the $N_z$ coefficient to be 1 or less, $(n_x-n_z)$ needs to be smaller than $(n_x-n_y)$, that is, $n_y \leq n_z$. The retardation plate with $n_x$, $n_y > n_z$ needs to have the refractive index anisotropy in the substrate in-plane direction less than that in the substrate vertical direction and is therefore produced by an advanced technique such as biaxial stretching, but the retardation plate with $n_y \leq n_z$ may have a large refractive index anisotropy in the substrate in-plane direction and can therefore be produced by a simple technique such as uniaxial stretching. However, the VA mode requires extra compensation films as compared to the TN mode, and therefore the cost of the compensation film needs to be minimized.

In the principle configurations 1 to 3, it is preferable that the retardation plate is constituted of a plurality of uniaxially stretched films and arranged in layers such that the respective slow axes are substantially orthogonal to each other. The retardation plates produced by uniaxial stretching have retardations in the substrate in-plane direction, so that arrangement of them in layers such that the respective slow axes are substantially orthogonal to each other allows the retardations in the substrate in-plane direction to cancel each other and only the retardations in the substrate vertical direction to remain. Although there is no problem to use a single uniaxially stretched retardation plate, the uniaxially stretched retardation plate has a small retardation as compared to a biaxially stretched retardation plate to fail to perform sufficient compensation. The arrangement of uniaxially stretched retardation plates in layers such that the respective slow axes are substantially orthogonal to each other allows arbitrary setting of the retardations in the substrate vertical direction.

(Main Point 3)

The plane shapes of reflecting projections and depressions are changed from dot forms into geometrical forms in which reflecting surfaces are oriented toward a specific azimuth, and the forms are arbitrarily controlled, thereby making it possible to efficiently reflecting light incident from the specific azimuth to the observer side.

The present inventor proposes a technique for forming geometrical reflecting projections and depressions without pattern formation by using the difference in hardening shrinkage of a photosensitive resin. Besides, the display mode is changed from the TN mode to the vertical alignment (VA) mode in which liquid crystal having a negative dielectric constant anisotropy is vertically aligned, thereby eliminating liquid crystal anchoring to the substrate interface, so that the contrast ratio can be increased in principle. Efficient reflection of light incident from the specific azimuth to the observer side and use of the VA mode as the display mode can realize display that is easy to view even in an interior environment.

However, since the azimuthal anisotropy of the reflection intensity differs even depending on panel parameters such as the axis placement of the polarizing plate and the alignment azimuth of liquid crystal, the contrast ratio is reduced in an azimuth in which the reflection intensity is maximum when the parameters do not match the reflection characteristics created by the reflecting projections and depressions, resulting in display with poor visibility. Hence, the present inventor discovered that the technique shown below enables matching of the reflecting projections and depressions with the panel parameters to maximize the contrast ratio in the azimuth in which the reflection intensity is maximum due to the reflecting projections and depressions, thereby enabling the display to be easy to view.

[Principle Configuration 1]

This liquid crystal display device comprises a reflecting layer with projections and depressions having azimuthal anisotropies on reflection intensity formed on a surface thereof, for reflecting incident light, a liquid crystal layer provided on the reflecting layer, in which alignment of liquid crystal molecules is vertical, and a retardation plate and a polarizing plate provided on a front surface of the liquid crystal layer. The retardation plate has a retardation of a quarter of a visible light wavelength in an in-plane direction thereof, and is arranged such that an angle formed between an azimuth $\phi$ in which the reflection intensity is maximum and an absorption axis P of the polarizing plate is a value of not less than about 65° nor greater than about 90°, and an angle formed between a slow axis $F_1$ of the retardation plate and the absorption axis P is about 45°. The azimuthal anisotropy of the reflection intensity due to the axis placement of the polarizing plate is such that, in the case of a single polarizing plate, the reflection intensity is maximum in an azimuth of its transmission axis and the reflection intensity is minimum in an azimuth of the absorption axis, due to absorption characteristics of the polarizing plate. When the retardation plate having a retardation of about a quarter of the visible light wavelength is added to the above arrangement, the polarization azimuth is rotated, so that the reflection intensity is minimum in the azimuth of the transmission axis and the azimuth of the absorption axis.

More specifically, when light goes and returns through the retardation plate having a retardation of about a quarter of the visible light wavelength, the polarization azimuth is rotated 90° with the slow axis of the retardation plate as a symmetrical axis, but if arrangement is made such that the angle formed between the slow axis of the retardation plate and the absorption axis of the polarizing plate is about 45°, linearly polarized light in the azimuth of the transmission axis is rotated 90° to be parallel to the absorption axis of the polarizing plate, resulting in a minimum reflection intensity. In an azimuth other than 45°, however, the polarization azimuth is rotated to deviate from the absorption axis of the polarizing plate, causing leakage of light. Further, when a liquid crystal layer having a retardation of about a quarter of the visible light wavelength is added to the above arrangement, the polarization azimuth is rotated 180° to be parallel to the transmission axis of the polarizing plate, resulting in a maximum reflection intensity in the azimuth of the transmission axis as in the case of only the polarizing plate. Accordingly, if the polarizing plate and the retardation plate are arranged such that the angle formed between the azimuth $\phi$ in which the reflection intensity is maximum due to the reflecting projections and depressions and the absorption axis P of the polarizing plate is about 90°, and the angle formed between the slow axis $F_1$ of the retardation plate and P is about 45°, the contrast ratio will be maximum in the azimuth in which the reflection intensity is maximum due to the reflecting projections and depressions.

However, since obliquely incident light is mainly reflected to the observer side (in the substrate vertical direction) by the reflection-type liquid crystal display device having reflecting projections and depressions, the oblique incidence causes retardation to deviate the polarization azimuth, and the polarization azimuth deviates from the absorption axis of the polarizing plate also in the azimuth of the transmission axis, resulting in leakage of light (correctly, elliptically polarized light with polarization azimuth deviated). For correction of this, it is effective to rotate in a reverse direction the axis placement of the polarizing plate by the amount of deviation of the polarization azimuth to thereby give it offset, whereby the polarization azimuth becomes substantially parallel to the absorption axis of the polarizing plate.

Here, the retardation plate is configured having a first retardation plate having a retardation of a half of a visible light wavelength in an in-plane direction thereof and a second retardation plate having a retardation of a quarter of a visible light wavelength in an in-plane direction thereof, in which it is preferable that an angle formed between a slow axis $F_{11}$ of the first retardation plate and an absorption axis P is not less than about 0° nor greater than about 20°, and an angle formed between a slow axis $F_{12}$ of the second retardation plate and the slow axis $F_{11}$ is not less than about 45° nor greater than about 65°. The retardation plate is generally produced by stretching norbornene polymer films, but the polymer film has wavelength dispersion, and therefore if the retardation plate is designed to have a retardation of about a quarter of a specific wavelength, the retardation for other wavelengths deviates from about a quarter thereof. To relax the wavelength dispersion of the retardation plate so that the retardation plate has a retardation of about a quarter of almost all of the wavelengths of visible light, there is a method of using a material having wavelength dispersion less than that of norbornene films or of layering retardation plates such as to decrease the wavelength dispersion. As for the former, the material is more expensive than norbornene films, and as for the latter, a structure in which a retardation plate having a retardation of about a half of the visible light wavelength and a retardation plate having a retardation of about a quarter of the visible light wavelength are layered, is typical and in wide use as a broadband λ/4 plate (or a λ/4 plate). The broadband λ/4 plate is preferably arranged such that an angle formed between a slow axis of the broadband λ/4 plate and the absorption axis of the polarizing plate is also about 45° or 135°, and since the slow axis of the broadband λ/4 plate corresponds to a vector made by combining the slow axis of the first retardation plate and the slow axis of the second retardation plate, the respective retardation plates are preferably arranged such that the combined vector is substantially equivalent to the above-described slow axes of the retardation plates.

[Principle Configuration 2]

This liquid crystal display device comprises a reflecting layer with projections and depressions having azimuthal anisotropies on reflection intensity formed on a surface thereof, for reflecting incident light, a liquid crystal layer provided on the reflecting layer, and provided on the reflecting layer, and a retardation plate and a polarizing plate provided on a front surface of the liquid crystal layer. The retardation plate has a retardation of a quarter of a visible light wavelength in an in-plane direction thereof, and is arranged such that an angle formed between an azimuth φ in which the reflection intensity is maximum and an absorption axis P of the polarizing plate is a value of not less than about 90° nor greater than about 115°, and an angle formed between a slow axis $F_1$ of the retardation plate and the absorption axis P is about 135°. Even when the arrangement is made such that the angle formed between the slow axis of the retardation plate and the absorption axis of the polarizing plate is about 135°, the polarization azimuth of linearly polarized light incident from the azimuth of the transmission axis similarly deviates, the deviation being in the opposite direction to the case of 45°. Therefore, to correct the deviation of the polarization azimuth, it is preferable to rotate the axis placement of the polarizing plate in the opposite direction to the case of 45°.

Here, it is preferable that the retardation plate is configured having a first retardation plate having a retardation of a half of a visible light wavelength in an in-plane direction thereof and a second retardation plate having a retardation of a quarter of a visible light wavelength in an in-plane direction thereof, and an angle formed between a slow axis $F_{11}$ of the first retardation plate and the absorption axis P is not less than about 0° nor greater than about 20°, and an angle formed between a slow axis $F_{12}$ of the second retardation plate and the slow axis $F_{11}$ is not less than about 135° nor greater than about 155°. Since a slow axis of a broadband λ/4 plate corresponds to a vector made by combining the slow axis of the first retardation plate and the slow axis of the second retardation plate, the respective retardation plates are preferably arranged such that the combined vector is substantially equivalent to the above-described slow axes of the retardation plates.

Here, in the principle configurations 1 and 2, it is preferable that there is another retardation plate having retardations in a vertical direction to a surface thereof and an in-plane direction thereof respectively, and the other retardation plate is arranged on the liquid crystal layer side of the retardation plate such that an angle formed between an azimuth φ in which the reflection intensity is maximum and a slow axis $F_2$ of at least one of the retardation plate and the other retardation plate is not less than about 0° nor greater than about 30°. The deviation of the polarization azimuth due to an oblique incident occurs not only in the retardation plate but also in the liquid crystal layer. The retardation of the liquid crystal layer varies depending on the voltage, in which application of voltage causes the retardation of the liquid crystal layer to be about a quarter of the visible light wavelength, leading to white display in the VA mode. The deviation of the polarization azimuth is not so problematic in the white display because the rate of change in reflection intensity is low, while the rate is high in black display, that is, in a state in which no voltage is applied to the liquid crystal layer, leading to a great decrease in the contrast ratio. Although the deviation of the polarization azimuth in the retardation plate results from deviation from the retardation of about a quarter of the visible light wavelength caused by a negative retardation occurring due to an oblique incidence, the deviation of the polarization azimuth in the liquid crystal layer in the state where no voltage is applied, namely, which is vertically aligned results from new occurrence of a positive retardation due to the oblique incidence. Accordingly, to correct the deviation of the polarization azimuth in the liquid crystal layer due to the oblique incidence, it is necessary to cancel the positive retardation by the negative retardation, and therefore proposed is means for canceling the retardation of the liquid crystal layer through use of a retardation plate having a negative retardation in the substrate vertical direction (see Patent Documents 6 and 7). The refractive index anisotropy of the vertically aligned liquid crystal layer is in a substantially ellipsoid which is longer than is wide, and therefore by using a retardation plate having a refractive index anisotropy opposite thereto, that is, a retardation plate having a negative retardation in the substrate vertical direction, the respective refractive index anisotropies cancel each other out, so that retardation due to the oblique incidence no longer occurs.

To give such a retardation to a retardation plate made of a polymer film, advanced stretching processing such as biaxial stretching is required to prevent occurrence of excessive retardation in the substrate in-plane direction, leading to a rise in price. However, a retardation plate uniaxially stretched for the purpose of giving a retardation in the substrate in-plane direction also has a negative retardation in the substrate vertical direction, and therefore such retardation plates are layered such that slow axes thereof are orthogonal to each other, whereby only the retardation of the vertically aligned liquid crystal layer can be canceled without occurrence of excessive retardation in the substrate in-plane direction. For example, a retardation plate having a retardation of about a quarter of the visible light wavelength in the substrate in-plane direction also has a negative retardation from about 1/10 to 1/6 the visible light wavelength in the substrate vertical direction, and therefore such retardation plates are layered such that slow axes thereof are orthogonal to each other, whereby the retardation of the liquid crystal layer can be canceled through use of inexpensive retardation plates.

However, in the structure in which the uniaxially stretched retardation plates are layered such that the slow axes thereof are orthogonal to each other, deviation occurs in the polarization azimuth because the two slow axes exhibit different behaviors at the time of tilt in an azimuth different from the slow axes. More specifically, the refractive index anisotropy for an oblique incidence corresponds to the shape of a cross section made by cutting an ellipsoid at an incidence surface, and when apparent slow axes change due to exhibition of the different behaviors of the two slow axes, the shapes of the cross sections also change to cause deviation between retardations, leading to occurrence of deviation in polarization azimuth. Accordingly, the retardation plates are arranged in layers such that the angle formed between the azimuth in which the reflection intensity is maximum and the slow axis of at least one of the retardation plates is not less than about 0° nor greater than about 30°, thereby eliminating the exhibition of different behaviors of the two slow axes at the time of tilt in the azimuth in which the reflection intensity is maximum to enable effective cancellation of the retardation of the liquid crystal layer caused by the oblique incidence in the azimuth in which the reflection intensity is maximum due to the reflecting projections and depressions.

[Principle Configuration 3]

This liquid crystal display device comprises a reflecting layer with projections and depressions having azimuthal anisotropies on reflection intensity formed on a surface thereof, for reflecting incident light, and a liquid crystal layer provided on the reflecting layer, in which liquid crystal molecules of the liquid crystal layer are aligned such that an angle formed between an azimuth $\phi$ in which the reflection intensity is maximum and a director azimuth L for the liquid crystal molecules is not less than about 45° nor greater than about 90°. When the plane shapes of the reflecting projections and depressions are in geometrical forms in which tilt surfaces are oriented toward the azimuth in which the reflection intensity is high, the liquid crystal molecules on the substrate interface initially tilt in the azimuth in which the reflection intensity is high. Further, the liquid crystal on the substrate interface initially tilts even by alignment control such as rubbing processing. When the liquid crystal molecules initially tilt, the reflection intensity increases in black display to decrease the contrast ratio, but when the angle formed between the azimuth in which the liquid crystal initially tilts due to the reflecting projections and depressions and the azimuth in which the liquid crystal initially tilts by the alignment control differ from each other within a range not less than about 45° nor greater than about 90°, preferably at about 90°, the retardation of the initially tilted liquid crystal is canceled so that the contrast ratio can be improved.

Here, it is preferable to use the reflecting projections and depressions having azimuthal anisotropies on reflection intensity so as to align the liquid crystal in the applicable azimuth. Since the reflecting projections and depressions function as conductive protrusions, the liquid crystal near the reflecting projections and depressions is aligned in the azimuth substantially parallel to the tilt surfaces. This is because when the azimuth in which the liquid crystal initially tilts differs from the azimuth in which the liquid crystal is tilt-aligned due to an oblique electric field, the liquid crystal on the tilt surfaces becomes hard to be aligned in the tilt azimuth, and as a result, the liquid crystal near the reflecting projections and depressions is drawn in the alignment azimuth on the protrusions and aligned in the azimuth substantially parallel to the tilt surfaces. Hence, the reflecting projections and depressions are densely arranged such that the tilt surfaces of the reflecting projections and depressions are substantially parallel to the azimuth in which the reflection intensity is maximum, whereby the reflecting projections and depressions can align the liquid crystal in the applicable azimuth. The tilt angle of the liquid crystal by the alignment control through use of the reflecting projections and depressions is not too large, unlike that by the rubbing processing, so that the contrast ratio is not reduced even with alignment control means provided on upper and lower substrates, and the alignment stability also improves.

Besides, it is preferable to use slits formed on pixel electrodes so as to align the liquid crystal in the applicable azimuth. Since the slits function as an insulator, the liquid crystal near the slits is aligned in an azimuth substantially parallel to long sides of the slits where voltage is applied, if the width of the slit is made small to a degree at which the region where the oblique electrical field occurs is decreased. This is because the liquid crystal molecules at slit edge portions become hard to be tilt-aligned in the azimuth of the oblique electric field because the region where the oblique electric field occurs is decreased, and as a result, the liquid crystal molecules near the slits are drawn in the alignment azimuth on the slits and aligned substantially parallel to the long sides of the slits. Hence, the slits are arranged such that the long sides of the slits are substantially parallel to the azimuth in which the reflection intensity is maximum, whereby the slits can align the liquid crystal in the applicable azimuth. The alignment control through use of the slits can realize a transflective-type liquid crystal display device by making the portions above the slits transmission regions, in addition to the alignment stability.

(Main Point 4)

Here, in the configuration of the main point 3 in the VA mode (configuration with reflecting projections and depressions having azimuthal anisotropies on reflection intensity), the azimuth dependence of the retardation in a direction of the thickness of the liquid crystal display device is controlled to increase the contrast ratio in the azimuth in which the reflection intensity is maximum.

[Principle Configuration 1]

Figure 4:
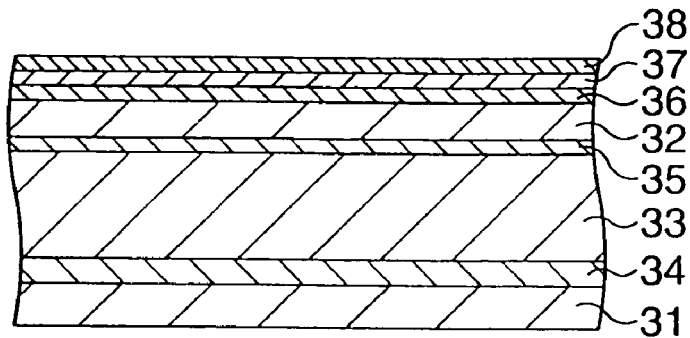
FIG. 4 is a perspective view for explaining a principle configuration 1 in a main point 4 of the present invention.

In this liquid crystal display device, as shown in FIG. 4, a lower glass substrate 31 and an upper glass substrate 32 hold a liquid crystal layer 33, which is composed of liquid crystal molecules with negative dielectric constant anisotropies, sandwiched therebetween, a wrinkled reflecting electrode 34 with projections and depressions having azimuthal anisotropies on reflection intensity formed on the surface is provided between the lower glass substrate 31 and the liquid crystal layer 33, and a transparent electrode 35 is provided between the upper glass substrate 32 and the liquid crystal layer 33 respectively. Further, a $\lambda/4$ plate 36, a $\lambda/2$ plate 37, and a polarizing plate 38 are provided on (a front surface of) the upper glass substrate 32, and configured such that the $\lambda/4$ plate 36 and $\lambda/2$ plate 37 are different in applicable wavelength, and the retardations caused by the $\lambda/4$ plate 36, the $\lambda/2$ plate 37, and the liquid crystal layer 33 due to an oblique incidence or oblique emission in an azimuth in which the reflection intensity is maximum are smaller than the retardations in an azimuth in which the reflection intensity is minimum.

The combination of the $\lambda/4$ plate and $\lambda/2$ plate is in wide use as a broadband $\lambda/4$ plate, and the broadband $\lambda/4$ plate also has a negative retardation in the thickness direction like an optical compensation plate. Their applicable wavelengths are made different from 550 nm that is a visibility peak wavelength, that is, the in-plane retardations are deviated from 137.5 nm in the λ/4 plate and 275 nm in the λ/2 plate to thereby control the azimuth dependency of the retardation in the thickness direction so that the retardation caused by the liquid crystal layer 33, the λ/4 plate 36, and the λ/2 plate 37 due to an oblique incidence or oblique emission in the azimuth in which the reflection intensity is maximum is smaller than that in the azimuth in which the reflection intensity is low, whereby the contrast ratio can be increased. Although the contrast ratio is decreased in the azimuth in which the reflection intensity is low because the retardation in the thickness direction shifts in the opposite direction, leakage of light can be reduced to a low degree at which no problem is caused in terms of display by application of the reflecting projections and depressions having azimuthal anisotropies on the reflection intensity like the wrinkled reflecting electrode 34.

In this point, a technique is proposed also in the prior art for improving the contrast ratio by reducing the retardation of the λ/4 plate, that is, decreasing the applicable wavelength, but the prior art is for compensating the retardation of the liquid crystal layer anchoring to the substrate interface where voltage is applied, and is thus different from the present invention in that the slow axis of the λ/4 plate is made substantially coincident with the anchoring (alignment) azimuth of the liquid crystal layer, and the applicable wavelength is adjusted so that the sum of the in-plane retardation of the liquid crystal layer and the in-plane retardation of the λ/4 plate is about 137.5 nm.

The present invention is for compensating the retardation of the liquid crystal layer caused by an oblique incidence where no voltage is applied, in which each of applicable wavelengths of the λ/4 plate and the λ/2 plate is adjusted so that the difference between the retardation occurring in the liquid crystal layer and the retardation occurring in an optical compensation plate is small in the applicable azimuth. In addition, the contrast ratio is improved irrespective of the alignment azimuth of the liquid crystal layer in the present invention, while the contrast ratio is not improved if the slow axis of the λ/4 plate is greatly deviated from the alignment azimuth of the liquid crystal layer in the prior art.

It is preferable to make the applicable wavelengths of the λ/4 plate 36 and the λ/2 plate 37 different by a value of not less than 20 nm nor greater than 200 nm. The reason why the lower limit is set to 20 nm is that a difference of less than 20 nm is not very effective in improving the contrast ratio and is difficult to control the in-plane retardation. The reason why the upper limit is set to 200 nm is that a difference of 200 nm or greater significantly decreases the contrast ratio in the azimuth in which the reflection intensity is minimum, so that leakage of light cannot be prevented any longer even by application of the reflecting projections and depressions having azimuthal anisotropies on the reflection intensity.

Further, it is preferable to make the applicable wavelength of the λ/4 plate 36 smaller than the applicable wavelength of the λ/2 plate 37. The λ/4 plate 36 and the λ/2 plate 37 have negative retardations in the thickness direction respectively, but practical negative retardations decrease depending on the azimuth in which linearly polarized light is incident, and as a result, most of the retardation of the liquid crystal layer 33 remains. Accordingly, the applicable wavelength of the λ/4 plate 36 is made small and the applicable wavelength of the λ/2 plate 37 is made large so that the negative retardation occurring in the broadband λ/4 plate due to an oblique incidence or oblique emission increases in the azimuth in which the reflection intensity is maximum.

[Principle Configuration 2]

Figure 5:
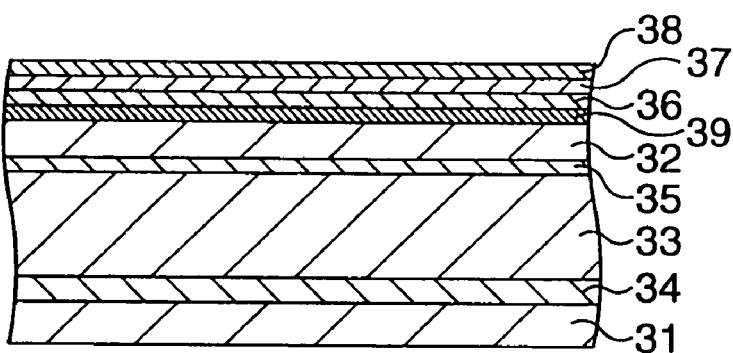
FIG. 5 is a perspective view for explaining a principle configuration 2 in the main point 4 of the present invention.

This liquid crystal display device is configured having, as shown in FIG. 5, a negative retardation plate 39 between the upper glass substrate 32 and the λ/4 plate 36 of the principle configuration 1, in which the applicable wavelength of the λ/4 plate 36 is made larger than the applicable wavelength of the λ/2 plate 37.

When the negative retardation plate 39 having a negative retardation in the thickness direction, that is, an optical compensation plate exists, the retardation of the negative retardation plate 39 or the retardation of the liquid crystal layer 33 is set so that almost all the retardation of the liquid crystal layer 33 is canceled, and therefore the applicable wavelength of the λ/4 plate 36 is made large and the applicable wavelength of the λ/2 plate 37 is made small so that the retardations occurring in these retardation plates due to an oblique incidence or oblique emission decrease in an azimuth in which the reflection intensity is maximum.

[Principle Configuration 3]

Figure 6:
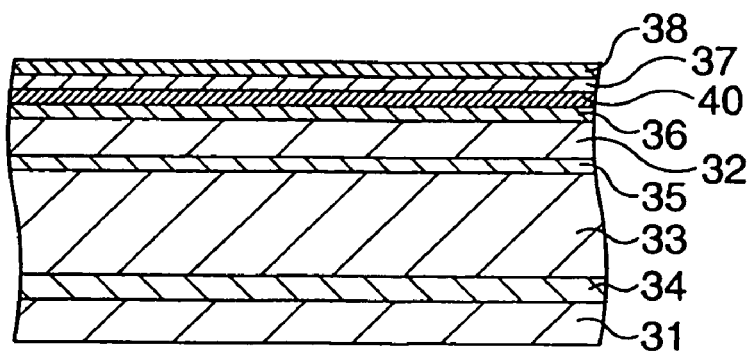
FIG. 6 is a perspective view for explaining a principle configuration 3 in the main point 4 of the present invention.

This liquid crystal display device is configured having, as shown in FIG. 6, another λ/2 plate 40 between the λ/2 plate 37 and the polarizing plate 38 of the principle configuration 1, in which slow axes of the λ/4 plate 36 and the λ/2 plate 37 are substantially orthogonal to each other and the applicable wavelength of the λ/2 plate 37 is made larger than the applicable wavelength of the other λ/2 plate 40.

In this case, as in the principle configuration 2, it is only required that the applicable wavelength of the λ/4 plate 36 is made large and the applicable wavelength of the λ/2 plate 37 is made small so that the retardations occurring in these retardation plates due to an oblique incidence or oblique emission decrease in an azimuth in which the reflection intensity is maximum. However, this applies only to the case of the λ/4 plate and the λ/2 plate which constitute the broadband λ/4 plate, and therefore, in the principle configuration 3, the applicable wavelength of a portion forming the broadband λ/4 plate, that is, the λ/2 plate 37 is made large and the applicable wavelength of the λ/2 plate 40 is made small.

Specific Embodiments

Based on the above-described main points of the present invention, specific embodiments to which the present invention is applied will be described.

First Embodiment

Figure 7:
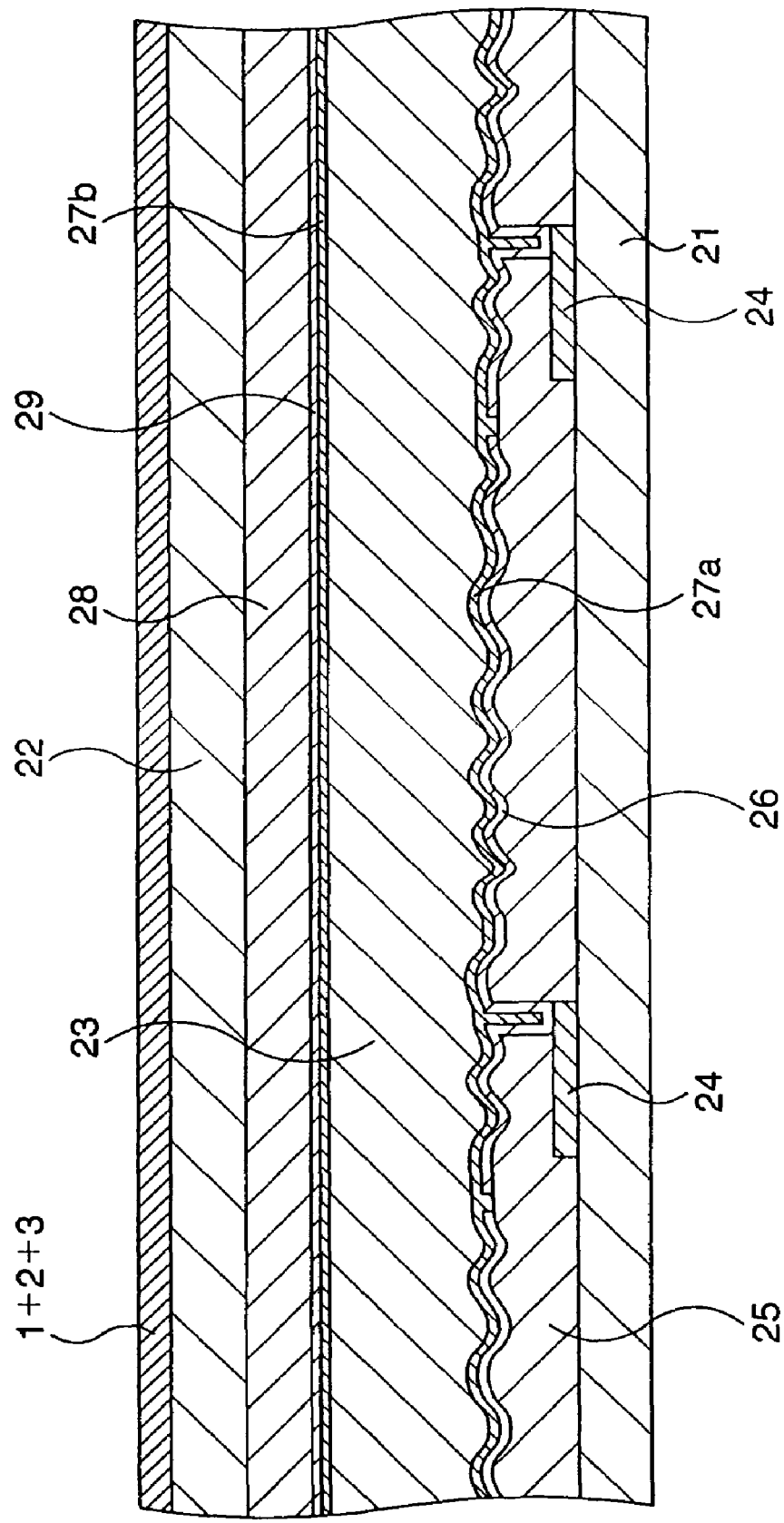
FIG. 7 is a cross-sectional view showing a schematic configuration of a reflection-type liquid crystal display device of a first embodiment.
Figure 8A:
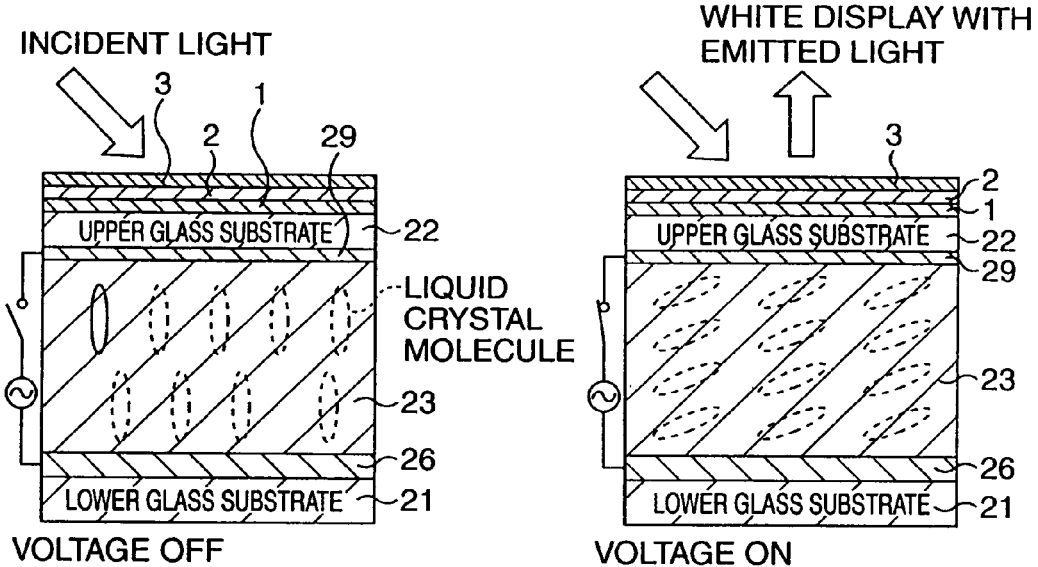
FIG. 8A and FIG. 8B are cross-sectional views showing schematic configurations of the reflection-type liquid crystal display device of the first embodiment.

FIG. 7 and FIG. 8A are cross-sectional views showing a schematic configuration of a reflection-type liquid crystal display device of this embodiment. For convenience here, a λ/4 plate+a λ/2 plate+a polarizing plate are integrally shown in FIG. 7, and a reflecting electrode is simplified and the illustrations of a resin layer and so on are omitted in FIG. 8A.

This liquid crystal display device is constituted such that a lower glass substrate 21 and an upper glass substrate 22 hold a liquid crystal layer 23, which is composed of liquid crystal molecules having negative dielectric constant anisotropies, sandwiched therebetween, and an optical compensation plate having a layer structure of a λ/4 plate 1 being a first retardation plate, a λ/2 plate 2 being a second retardation plate, and a polarizing plate 3 (similar to that in FIG. 1) is provided on (a front surface of) the upper glass substrate 22. Note that the λ/4 plate is a film having a retardation corresponding to a quarter of the wavelength of assumed light (visible light), and the λ/2 plate is a film having a retardation corresponding to a half of the wavelength of assumed light (visible light). For example, when the wavelength of the assumed light is 550 nm, the retardation by the λ/4 plate is 550/4=137.5 nm, and when the wavelength of the assumed light is 600 nm, the retardation by the λ/2 plate is 600/2=300 nm.

The lower glass substrate 21 comprises a TFT element 24 as a switching element for each pixel, and a wrinkled reflecting electrode 26 is formed on the surface of the lower glass substrate 21 by forming a pattern in the shape of projections and depressions or creases using a resin layer 25 made of a ultraviolet curing resin or a resist and then covering the surface with an aluminum layer, and further an alignment film 27a having a vertical alignment property is formed to cover the reflection-type electrode 26. The resin layer 25 is formed in the shape to cover the TFT elements 24 and the lower glass substrate 21, and partially patterned for establishing connection for signals from the TFT elements 24. The average tilt angle of the projections and depressions of the wrinkled reflecting electrode 26 is appropriately set to not less than 5° nor greater than 15°.

On the other hand, on the surface of the upper glass substrate 22, an ITO transparent electrode 29 is formed through a color filter (CF) layer 28, and an alignment film 27b having a vertical alignment property is formed to cover this transparent electrode 29. Liquid crystal molecules of the liquid crystal layer 23 are vertically aligned by the alignment films 27a and 27b which are in contact with the liquid crystal layer 23 at the top and bottom.

Note that a material commercially available from JSR Corp. or Nissan Chemical Industries, Ltd. is used as the alignment films 27a and 27b. Besides, a material commercially available from Merck KGaA is used as the liquid crystal layer 23. Further, the liquid crystal layer 23 should be vertically aligned where voltage is off, and tilt-aligned where voltage is on. In the configuration of FIG. 7, black display is realized where voltage is off, and white display is realized where voltage is on.

Films made by stretching polycarbonate, polystyrene, norbornene resins are commercialized by several companies, and these are used as materials for the λ/4 plate 1 and the λ/2 plate 2 being the retardation plates. For example, films made by stretching the product named Escena Film manufactured by Sumitomo Chemical Co., Ltd. and the product named ARTON Film manufacture by JSR Corp. are commercially available from Sumitomo Chemical Co., Ltd. or Nitto Denko Corp.

These films are layered in the axial relation shown in FIG. 1, that is, in such a manner that optical axes of both of them are orthogonal to each other here. The retardation of the λ/2 plate 2 is set to a value obtained by adding λ/4 to the retardation of the λ/4 plate 1. The λ/2 plate 2 and the polarizing plate are layered such that the optical axis of the λ/2 plate 2 and the absorption axis of the polarizing plate form an angle of 45° therebetween.

(Modification)

A modification of the first embodiment will be described now.

Figure 8B:
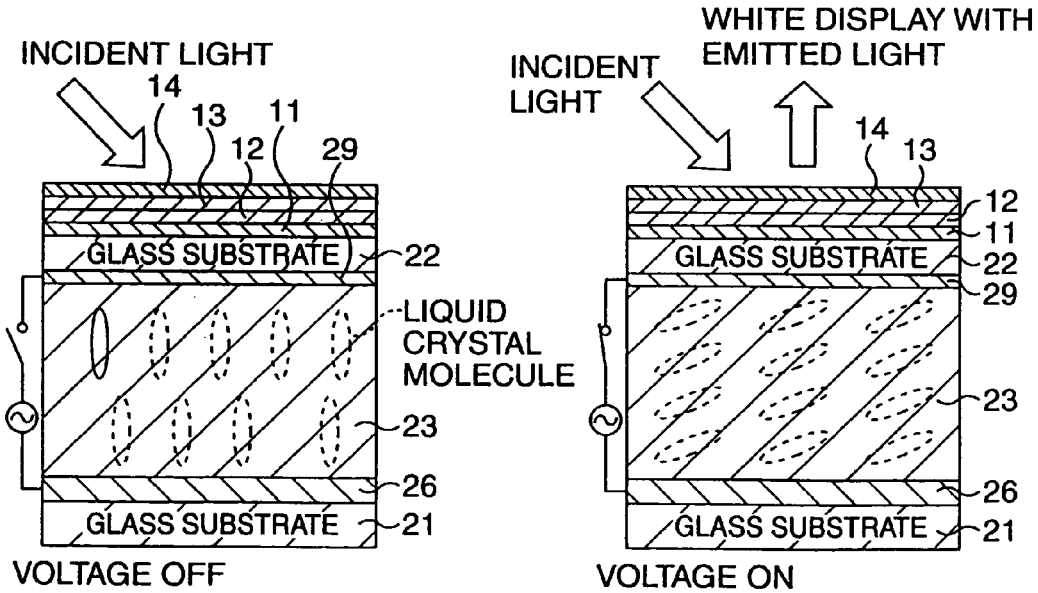

FIG. 8B is a cross-sectional view showing a schematic configuration of a reflection-type liquid crystal display device of this modification.

In this modification, an optical compensation plate comprises a λ/4 plate 11, a λ/2 plate 12, a λ/2 plate 13, and a polarizing plate 14, which are layered in this order as in FIG. 3. The angle between an absorption axis of the polarizing plate 14 and an optical axis of the λ/2 plate 13 can be changed as a design element, and where this angle is defined as θ, the angle formed between the optical axis of the λ/2 plate 13 and an optical axis of the λ/2 plate 12 is set to θ±45. In FIG. 3, θ is 10° (=25°−15°), so that the angle formed between the optical axis of the λ/2 plate 13 and the optical axis of the λ/2 plate 12 is set to 55°=10°+45°. Here, the optical axis of the λ/2 plate 12 is set to 80° (=25°+55°).

Further, the optical axis of the λ/2 plate 12 and the optical axis of the λ/4 plate 11 are made orthogonal to each other. Here, the optical axis of the λ/4 plate 11 is set to 170° (=80°+90°). Combination of the λ/2 plate 13 and the λ/2 plate 12 realizes a λ/4 plate with reverse wavelength dispersion. Here, the λ/4 plate and the λ/2 plate are in mass production to realize the λ/4 with reverse wavelength dispersion and is thus low in cost.

The description until now is made focusing attention only to the in-plane retardation of each retardation plate, while the retardation in a direction of the film thickness is important to realize a wide viewing angle.

The retardation in the thickness direction is expressed by $$((n_x+n_y)/2-n_z) \cdot d$$

where the refractive indexes within a plane are $n_x$, $n_y$ ($n_x \geq n_y$), the refractive index in the thickness direction is $n_z$, and the thickness of the film is d.

For a completely uniaxial film ($n_y=n_z$), the negative retardation is a half of the in-plane retardation. In the configuration of FIG. 3, the λ/4 plate 11 and the λ/4 plate 12a realize the negative retardation as a principle configuration, but the absolute value of the negative retardation is expressed by the sum of negative retardations of individual λ/4 plates 11 and 12a. For this reason, the negative retardation when using uniaxial films is limited to, for example, λ/4 (=λ/4−2×2). We positively employed a biaxial film to optimize the negative retardation. It was set that 0 nm<A−B<300 nm where Δnd of the liquid crystal layer is A, and the sum of the negative retardations of the λ/2 plate 12 and the λ/4 plate 11 is B. Specifically, the design is made such that A is 300 nm and B is 220 nm ±50 nm, whereby excellent characteristics can be realized. This excellent range can also be established by introducing other indexes.

Excellent characteristics can be obtained when the difference between the retardation of the λ/4 plate 1 in a direction vertical to its plane and the retardation of the liquid crystal molecule is not less than 0 nm nor greater than 200 nm. Similarly, excellent characteristics can be obtained when the difference between the retardations of the λ/2 plate 12 and the λ/4 plate 11 in a direction vertical to their planes and the retardation of the liquid crystal molecule is not less than 0 nm nor greater than 200 nm.

The retardations of the λ/4 plate and the λ/2 plate affect the contrast of the liquid crystal display device. Generally, human eyes react to green light, especially light around 550 nm. For this reason, it is desirable that the retardation of the λ/2 plate is 550 nm/2=275 nm, and the retardation of the λ/4 plate is 550 nm/4=137.5 nm. However, the plates, if out of these conditions, seldom cause a problem of decrease in contrast.

Figure 9:
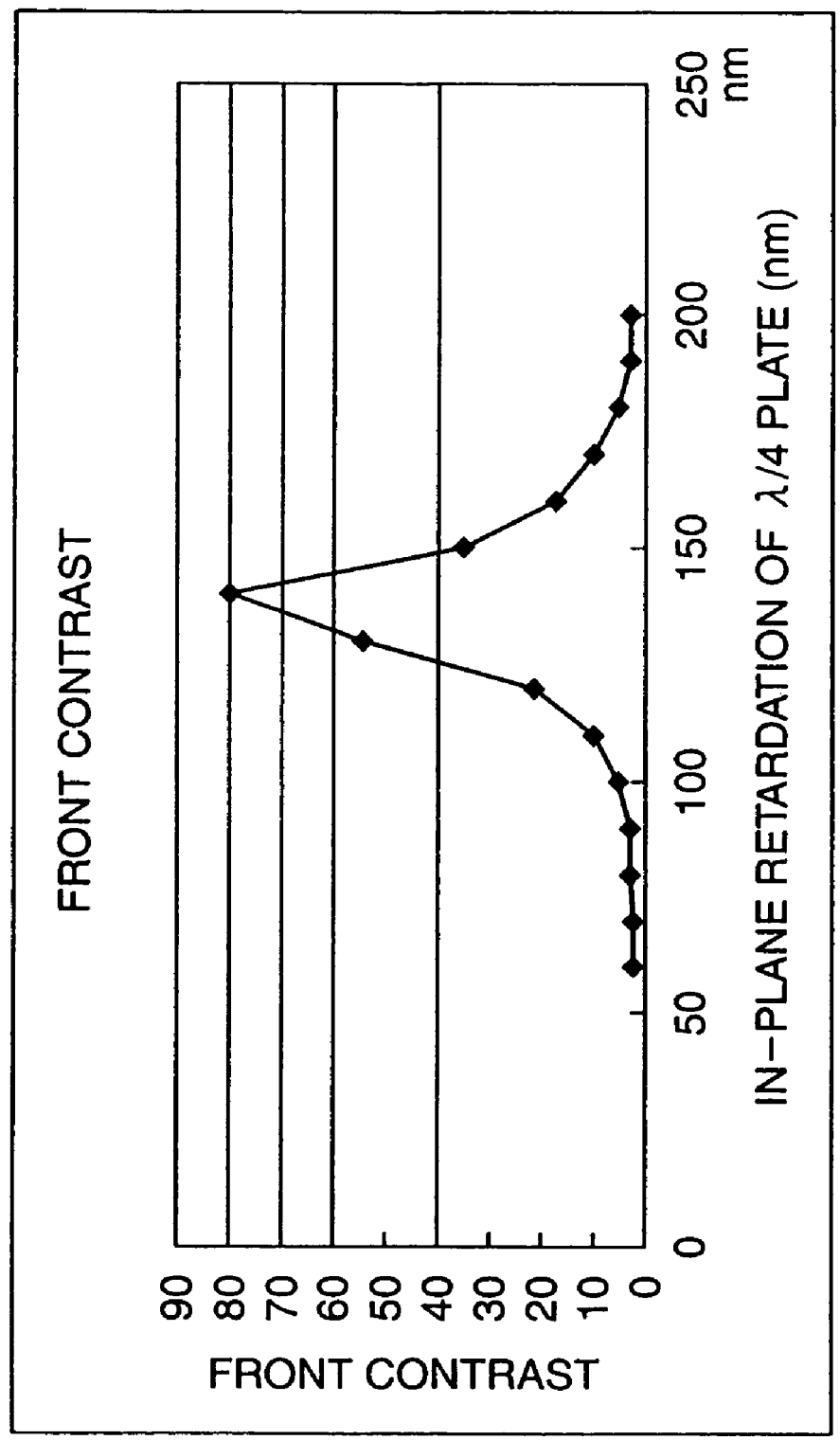
FIG. 9 is a characteristic diagram showing front contrast dependence when the in-plane retardation of a $\lambda/4$ plate deviates from a predetermined value.

FIG. 9 is a characteristic diagram showing front contrast dependence when the in-plane retardation of the λ/4 plate deviates from this 137.5 nm.

A front contrast of about 5 or greater is realized within a range of not less than 100 nm nor greater than 180 nm. It can be said that, for the reflection-type liquid crystal display device, a contrast of 5 or greater causes no problem in practical use. From this fact, the range of the in-plane retardation was set to a range of not less than 100 nm nor greater than 180 nm. In this embodiment, that principle is common to the range of the value of λ/4, and therefore when the λ/4 plate was employed, substantially excellent characteristics could be obtained in this range in common.

Figure 10:
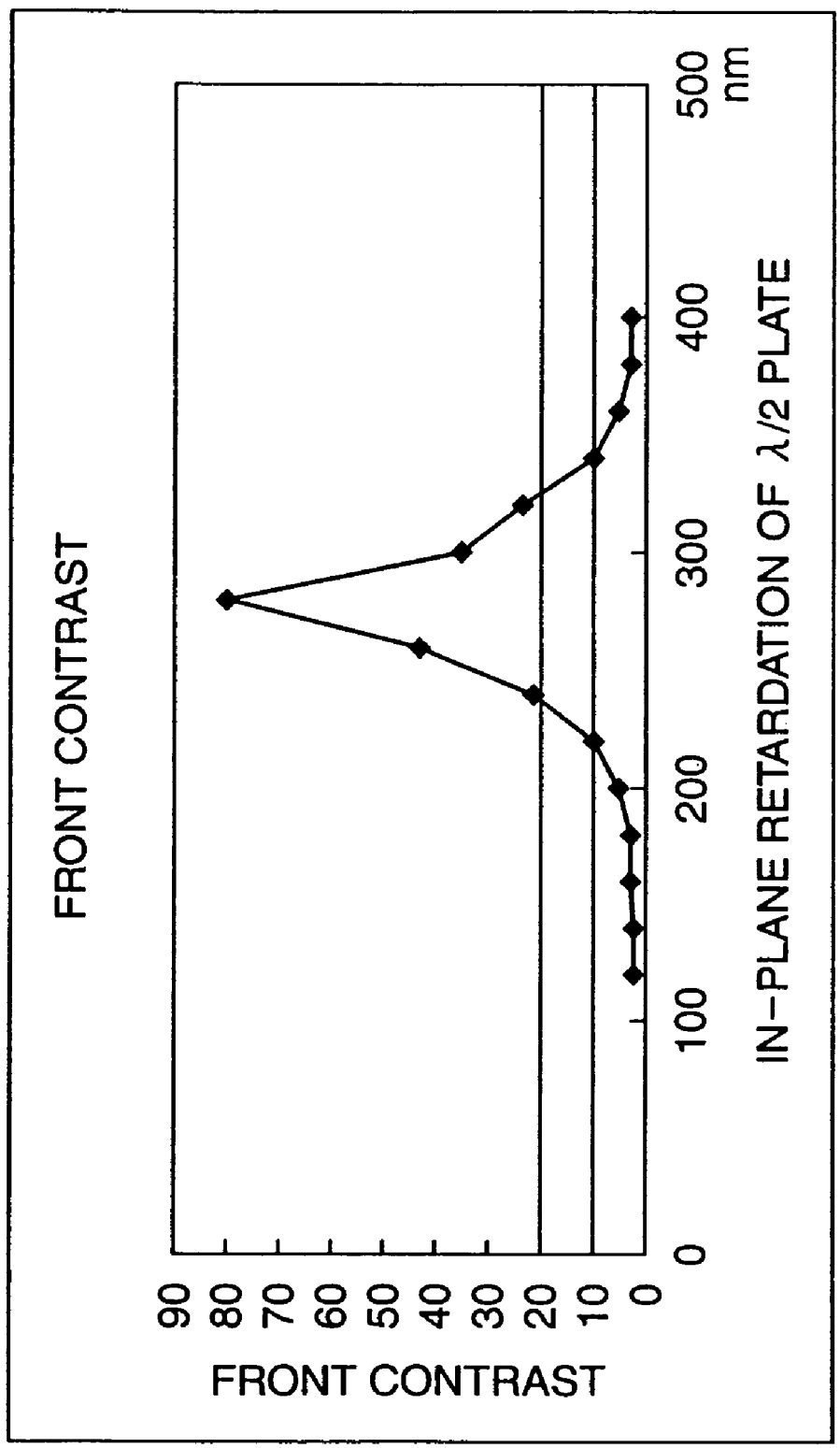
FIG. 10 is a characteristic diagram showing front contrast dependence when the in-plane retardation of a $\lambda/2$ plate deviates from a predetermined value.

Similarly, the result of verification of the λ/2 plate is shown in FIG. 10.

Although an ideal retardation of the λ/2 plate is 275 nm, the contrast when out of this value is shown. A front contrast of about 5 or greater is realized where the retardation is within a range of not less than 200 nm nor greater than 360 nm. It can be said that, for the reflection-type liquid crystal display device, a contrast of not less than 5 causes no problem in practical use. From this fact, the range of the in-plane retardation is set to a range of not less than 200 nm nor greater than 360 nm. In this embodiment, that principle is common to the range of the value of λ/2, and therefore when the λ/2 plate is employed, substantially excellent characteristics can be obtained in this range in common.

This value as the retardation is also in common to the value of each of λ/4 and λ/2 as a difference between the retardations of films. For example, it is described in this description that the difference in retardation between the λ/4 plate and the λ/2 plate is λ/4, and the same discussion as above also applies to this value.

Figure 11:
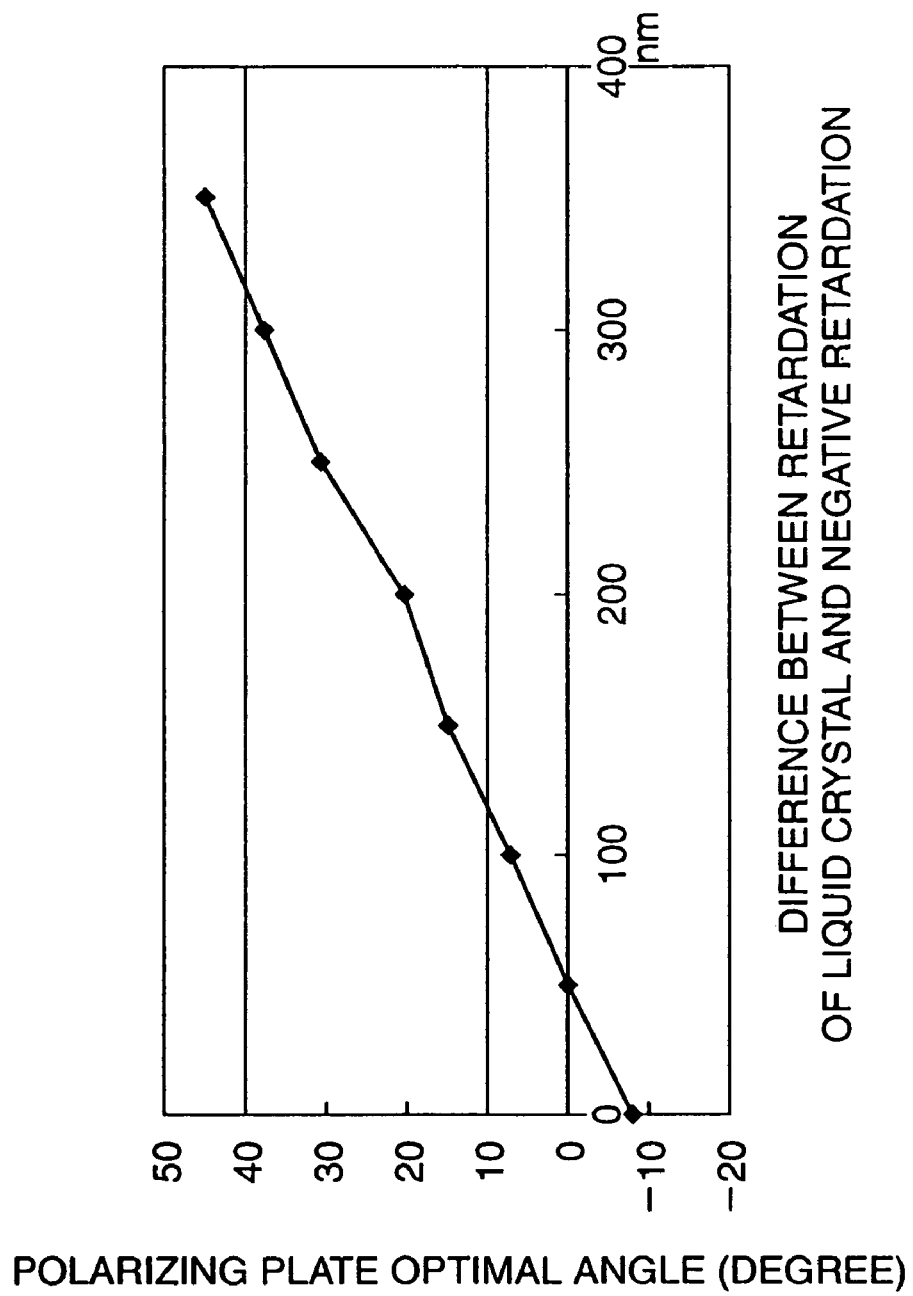
FIG. 11 is a characteristic diagram showing an optimal angle of a polarizing plate to allow visual angle characteristics vertically and laterally symmetrical.

The relation between the absorption axis of the polarizing plate and the alignment direction of the liquid crystal layer affects the viewing angle characteristics of the liquid crystal display. The viewing angle characteristics depend on the Δnd of the liquid crystal layer, the in-plane retardations of films, especially, the retardations of the λ/4 plate 1 and the λ/4 plate 11 as negative retardation plates. The optimal angle of the polarizing plate to allow the viewing angle characteristics vertically and laterally symmetrical where the alignment direction of the liquid crystal layer is the lateral direction is shown in FIG. 11. The Δnd of the liquid crystal layer is X, the negative retardation of the film taken as the prior art example is Y, and the difference between X and Y is set as the horizontal axis. Here, as for the negative retardation, the negative retardation composed from the λ/4 plate 1 and the λ/4 plate 2a, or that from the λ/4 plate 11 and the λ/4 12a plate also functions as Y which is a base of this index.

The relation between this difference in retardation and the optimal angle of the polarizing plate is shown in FIG. 11. It is shown that the optimal angle is almost on a line expressed by Optimal angle (°)=(retardation of liquid crystal layer (nm)−negative retardation of film (nm))·22.5/ 300−7.5.

Here, to perform white display, the retardation of the liquid crystal layer needs to have about λ/4=137.5 nm or greater. In this case, the calculation in consideration of no negative retardation given by a film results in about 2°. This shows that the set angle of the polarizing plate is desirably 0 degrees or greater. Further, it is advantageous that the retardation of the liquid crystal layer is large in order to perform white display. Where the retardation is 500 nm, the device can be driven at a low voltage of about 3V. Here, suppose that the negative retardation of the film is 0, the angle of the polarizing plate is 30°. From these verification results, the angle of the polarizing plate is set to a range of not less than 0° nor greater than 30° in this embodiment.

Besides, when the difference between the values of the retardation (nm) of the liquid crystal layer and the negative retardation (nm) of the film is too large, the contrast at an oblique viewing angle decreases, leading to poor viewing angle characteristics. This difference is set to 200 nm or less, whereby the range of a tilt angle where the contrast is 3 or greater in all azimuths can be set to ±40°.

As has been described, according to this embodiment, it becomes possible to realize bright display and a liquid crystal display device with a wide viewing angle.

Second Embodiment

Projections and depressions having reflecting ability on the surface are formed on a substrate surface as described below. First, a photosensitive resin (manufactured by Shipley Far East Ltd.) is applied by spin coating in a thickness of about 1 µm onto a TFT substrate (lower glass substrate). After prebake, ultraviolet irradiation, first bake, and second bake are sequentially performed to form projections and depressions with average tilt angles of 4.5° (Sample 1, Comparative Example 1), 7.5° (Sample 2, Comparative Example 2), 11.5° (Sample 3, Comparative Example 3), and 14.5° (Sample 4, Comparative Example 4). It should be noted that the control of the tilt angle of the projections and depressions is conducted by changing the period of the first bake, and the average tilt angle is measured through use of an atom force microscope (AFM). Thereafter, Al is deposited onto the projections and depressions to form reflecting projections and depressions.

Next, a vertical alignment film (manufactured by JSR Corp.) is applied to the surface of the TFT substrate and a CF substrate (upper glass substrate), spacers with a diameter of 3 µm (Manufactured by Sekisui Fine Chemical Co., Ltd.) are scattered, and bonding is performed. Into this vacant panel, liquid crystal (manufactured by Merck Japan Ltd.), which has a negative dielectric constant anisotropy and a refractive index difference Δn between abnormal light and normal light of 0.0995, is injected to obtain a reflection-type liquid crystal display device in the VA mode.

FIG. 12 and FIG. 13 show a method for estimating the retardation of the liquid crystal layer where no voltage is applied and the retardation of the retardation plate, shown from an observation angle of 0° in FIG. 12, and an observation angle of 45° in FIG. 13. In FIGS. 12 and 13, an incident angle θ on the liquid crystal decreases by 0→ξ as the entering light approaches from the upper substrate toward the lower substrate (see the arrow to the left of the optical path), and the incident angle θ on the liquid crystal decreases by 0→ξ as the reflected light travels from the lower substrate toward the upper substrate to the right of the optical path (see the arrow to the right of the optical path). In FIG. 12, the optical path length of the entering light along path VAC (vacuum air compensation layer) is dv/cos θ2=dv/cos 2ξ, and the optical path length in the liquid crystal is dlc/cos 2ξ. The reflected light passes through a return route in which the optical path length through the compensation layer, air and vacuum is dv, and the optical path length through the liquid crystal is dlc. In FIG. 13, the optical path length of the entering light along path VAC is dv/cos θ2, and the optical path length in the liquid crystal is =dlc/cos θ2. The reflected light passes through a return route in which the optical path length through the compensation layer air and vacuum is dv/cos(θ2−2ξ), and the optical path length through the liquid crystal is dlc/cos (θ2− 2ξ). FIGS. 14A-14D show a method for finding a refractive index anisotropy when light is incident, tilting θ from a Z axis, on the liquid crystal and retardation plate.

The incident angles of light emitted at observation angles of 0° and 45° are defined by the average tilt angle, and liquid crystal molecules are tilt-aligned at the average tilt angle as approaching from the upper substrate toward the lower substrate (reflector side), so that the incident angle of light on the liquid crystal decreases by the average tilt angle as approaching from the upper glass substrate toward the lower glass substrate in an approach route, and decreases by the average tilt angle as approaching from the lower glass substrate toward the upper glass substrate in a return route. Further, assuming that the liquid crystal is an index ellipsoid having a positive refractive index anisotropy in the substrate vertical direction, the retardation of the liquid crystal layer where no voltage was applied was obtained from the refractive index anisotropy when light was incident tilting by the incident angle from the Z-axis direction.

Figure 14A:
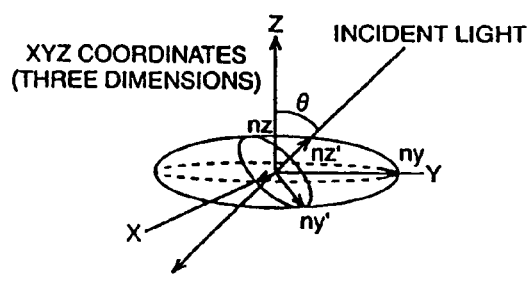
FIGS. 14A, 14B, 14C and 14D are schematic diagrams showing a method for finding a refractive index anisotropy when light is incident, tilting θ from a Z-axis, on a liquid crystal and a retardation plate.
Figure 14C:
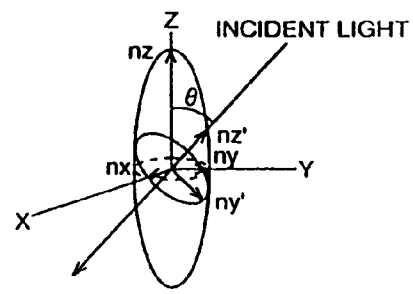
Figure 14B:
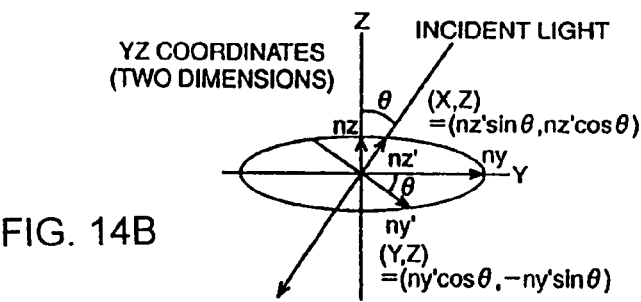
Figure 14D:
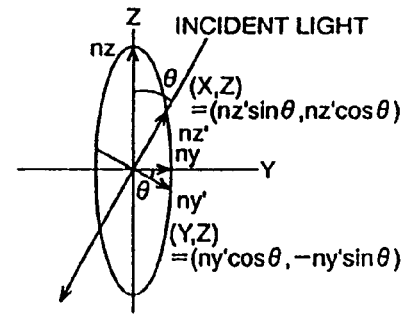

FIGS. 14A and 14B assume that the retardation plate has characteristics of an index ellipsoid having negative refractive index anisotropy in the substrate vertical direction, FIG. 14A showing the incident light in a three-dimensional configuration, and FIG. 14B showing the incident light in two-dimensions. FIGS. 14C and 14D assume that the liquid crystal has characteristics of an index ellipsoid having positive refractive index anisotropy in the substrate vertical direction, FIG. 14C showing the incident light in a three-dimensional space, and FIG. 14D showing the incident light in two dimensions. The apparent refractive indices nx', nxy, nz' when light is incident, at in incident angle of θ on the xy plane, correspond to the cut surface of an ellipsoid rotated minus θ from the axis. Accordingly, nx=nx, ny', nz' can be found by the following equations:

$$\frac{Y^2}{Ny^2} + \frac{Z^2}{Nz^2} = 1$$

$$\frac{Ny'^2\cos^2\theta}{Ny^2} + \frac{Ny'^2\sin^2\theta}{Nz^2} = 1$$

$$Ny^{2\prime} = \frac{1}{\frac{\cos^2\theta}{Ny^2} + \frac{\sin^2\theta}{Nz^2}}$$

$$Ny' = \frac{NyNz}{\sqrt{Nz^2\cos^2\theta + Ny^2\sin^2\theta}}$$

$$= \frac{Nz}{\sqrt{\frac{Nz^2}{Ny^2}\cos^2\theta + (1 - \cos^2\theta)}}$$

$$= \frac{Nz}{\sqrt{1 - v\cos^2\theta}}$$

However, $v = \frac{Ny^2 - Nz^2}{Ny^2}$

When Nz' is similarly found $$\frac{Y^2}{Ny^2} + \frac{Z^2}{Nz^2} = 1$$

$$\frac{Ny'^2\sin^2\theta}{Ny^2} + \frac{Ny'^2\cos^2\theta}{Nz^2} = 1$$

$$Ny^{2\prime} = \frac{1}{\frac{\sin^2\theta}{Ny^2} + \frac{\cos^2\theta}{Nz^2}}$$

$$Ny' = \frac{NyNz}{\sqrt{Nz^2\sin^2\theta + Ny^2\cos^2\theta}}$$

$$= \frac{Nz}{\sqrt{\frac{Nz^2}{Ny^2}(1 - \cos^2\theta) + \cos^2\theta}}$$

$$= \frac{Nz}{\sqrt{\frac{Nz^2}{Ny^2} + v\cos^2\theta}}$$

Table 1 shows the retardations in the substrate vertical direction of the retardation plates used in this embodiment, and Table 2 and Table 3 show results of calculation for every observation angle of the retardations of the liquid crystal layers where no voltage is applied when the reflecting projections and depressions with the average tilt angles of not less than 3.5° nor greater than 15.5° are applied, and the retardations of the retardation plates. The retardations of the liquid crystal layers where no voltage is applied are 4.5 nm at the average tilt angle of 4.5°, 12.6 nm at 7.5°, 30.5 nm at 11.5°, and 50.1 nm at 14.5° for the observation angle of 0°, and are 98.3 nm at the average tilt angle of 4.5°, 77,4 nm at 7.5°, 56.5 nm at 11.5°, and 45.5 nm at 14.5° for the observation angle of 45°.

TABLE 1

Retardations in substrate vertical direction of retardation plates ① to ⑧ (nm)

|  | Retardation ① | Retardation ② | Retardation ③ | Retardation ④ | Retardation ⑤ | Retardation ⑥ | Retardation ⑦ | Retardation ⑧ |
|---|---|---|---|---|---|---|---|---|
| Rf | 47.5 | 103.6 | 132.8 | 154.3 | 175.1 | 195.1 | 248.1 | 288.4 |
| Rf/Rlc | 0.16 | 0.35 | 0.44 | 0.52 | 0.59 | 0.65 | 0.83 | 0.97 |

TABLE 2

Estimation results of retardations of liquid crystal layers where no voltage is applied and retardations of retardation plates (at observation angle of 0°)

|  | Average tilt | Liquid crystal layer | Retardation ① | Retardation ② | Retardation ③ | Retardation ④ | Retardation ⑤ | Retardation ⑥ | Retardation ⑦ | Retardation ⑧ |
|---|---|---|---|---|---|---|---|---|---|---|
| Sample 1 | 3.5 | 2.7 | 3.9 | 4.9 | 4.6 | 4.9 | 5.3 | 4.7 | 6.5 | 7.2 |
|  | 4.5 | 4.5 | 4.4 | 5.9 | 5.9 | 6.5 | 7.0 | 6.6 | 8.9 | 10.0 |
|  | 5.5 | 6.7 | 4.9 | 7.2 | 7.5 | 8.4 | 9.2 | 9.0 | 12.0 | 13.6 |
|  | 6.5 | 9.4 | 5.6 | 8.7 | 9.5 | 10.7 | 11.8 | 11.9 | 15.7 | 17.9 |
| Sample 2 | 7.5 | 12.6 | 6.5 | 10.5 | 11.8 | 13.3 | 14.8 | 15.3 | 20.0 | 22.9 |
|  | 8.5 | 16.3 | 7.4 | 12.6 | 14.5 | 16.4 | 18.3 | 19.3 | 25.0 | 28.7 |
|  | 9.5 | 20.5 | 8.5 | 15.0 | 17.5 | 20.0 | 22.3 | 23.7 | 30.7 | 35.3 |
| Sample 3 | 10.5 | 25.2 | 9.7 | 17.6 | 20.9 | 23.9 | 26.8 | 28.7 | 37.0 | 42.6 |
|  | 11.5 | 30.5 | 11.1 | 20.5 | 24.7 | 28.3 | 31.7 | 34.2 | 44.0 | 50.8 |
|  | 12.5 | 36.4 | 12.6 | 23.8 | 28.8 | 33.1 | 37.2 | 40.3 | 51.8 | 59.8 |
| Sample 4 | 13.5 | 42.9 | 14.2 | 27.3 | 33.4 | 38.4 | 43.2 | 47.0 | 60.3 | 69.7 |
|  | 14.5 | 50.1 | 16.0 | 31.2 | 38.3 | 44.2 | 49.8 | 54.3 | 69.6 | 80.5 |
|  | 15.5 | 57.9 | 17.9 | 35.5 | 43.8 | 50.5 | 56.9 | 62.3 | 79.7 | 92.3 |

TABLE 3

Estimation results of retardations of liquid crystal layers where no voltage is applied and retardations of retardation plates (at observation angle of 45°)

|  | Average tilt | Liquid crystal layer | Retardation ① | Retardation ② | Retardation ③ | Retardation ④ | Retardation ⑤ | Retardation ⑥ | Retardation ⑦ | Retardation ⑧ |
|---|---|---|---|---|---|---|---|---|---|---|
| Sample 1 | 3.5 | 106.4 | 25.0 | 47.3 | 64.1 | 73.7 | 83.0 | 90.2 | 104.6 | 123.6 |
|  | 4.5 | 98.3 | 23.8 | 44.6 | 62.0 | 71.3 | 80.3 | 87.1 | 101.8 | 119.0 |
|  | 5.5 | 90.8 | 22.7 | 42.2 | 60.1 | 69.0 | 77.6 | 84.2 | 98.6 | 114.7 |
|  | 6.5 | 83.9 | 21.7 | 40.1 | 58.2 | 66.8 | 75.2 | 81.4 | 95.8 | 110.6 |
| Sample 2 | 7.5 | 77.4 | 20.9 | 38.3 | 56.4 | 64.7 | 72.8 | 78.8 | 93.2 | 106.7 |
|  | 8.5 | 71.5 | 20.2 | 36.8 | 54.7 | 62.7 | 70.5 | 76.3 | 90.7 | 103.0 |
|  | 9.5 | 66.0 | 19.6 | 35.5 | 53.0 | 60.8 | 68.4 | 73.9 | 88.3 | 99.4 |
| Sample 3 | 10.5 | 61.0 | 19.1 | 34.4 | 51.5 | 59.1 | 66.4 | 71.7 | 86.1 | 96.1 |
|  | 11.5 | 56.5 | 18.7 | 33.6 | 50.1 | 57.4 | 64.5 | 69.6 | 84.0 | 93.0 |
|  | 12.5 | 52.4 | 18.5 | 33.1 | 48.7 | 55.9 | 62.7 | 67.6 | 82.0 | 90.1 |
| Sample 4 | 13.5 | 48.7 | 18.4 | 32.9 | 47.5 | 54.4 | 61.1 | 65.7 | 84.6 | 87.4 |
|  | 14.5 | 45.5 | 18.4 | 32.8 | 46.3 | 53.0 | 59.5 | 64.0 | 82.4 | 84.8 |
|  | 15.5 | 42.8 | 18.5 | 33.1 | 45.2 | 51.8 | 58.1 | 62.4 | 80.4 | 82.5 |

Further, assuming that the retardation plate is an index ellipsoid having a negative refractive index anisotropy in the substrate vertical direction, the retardation was obtained, in a similar manner to that of the liquid crystal, from the refractive index anisotropy when light was incident tilting by the incident angle from the Z-axis direction. The incident angles of light emitted at observation angles of 0° and 45° are defined by the average tilt angle, but since the retardation plate is not tilt-aligned unlike the liquid crystal, the values of the incident angles can be used as they are.

It should be noted that the retardation plates have retardations in the substrate vertical direction of ① 47 nm, ② 104 nm, ③ 133 nm, ④ 154 nm, ⑤ 175 nm, ⑥ 195 nm, ⑦ 248 nm, and ⑧ 288 nm respectively. The retardation plates ① to ⑧ have retardations as shown in Table 1, and, for the observation angle of 0°, the optimal retardation plate is ① at the average tilt angle of 4.5°, ④ at 7.5°, ⑤ at 11.5°, and ⑤ at 14.5°. On the other hand, for the observation angle of 45°, the optimal retardation plate is ⑦ at the average tilt angle of 4.5°, ⑥ at 7.5°, ④ at 11.5°, and ③ at 14.5°. The application of optimal retardation plates at the respective average tilt angles for the observation angle of 0° leads to deviation in compensation conditions at the observation angle of 45°, and the retardation is 74.5 nm at the average tilt angle of 4.5°, 12.7 nm at 7.5°, 8.0 nm at 11.5°, and 14.0 nm at 14.5°. On the other hand, the application of optimal retardation plates at the respective average tilt angles for the observation angle of 45° leads to deviation in compensation conditions at the observation angle of 0°, and the retardation is 4.4 nm at the average tilt angle of 4.5°, 2.7 nm at 7.5°, 2.2 nm at 11.5°, and 11.8 nm at 14.5°.

In the case in which the optimal retardation greatly differs depending on the observation angle, light greatly leaks at a specific angle unless a retardation plate is selected with priority given to a larger retardation of the liquid crystal layer where no voltage is applied, resulting in a great loss of contrast characteristics. Accordingly, it is preferable to determine that the optimal retardation plate is ⑦ at the average tilt angle of 4.5°, ⑥ at 7.5°, ④ at 11.5°, ③ or ⑤ at 14.5°.

Accordingly, the optimal retardation necessary for compensation shown by the ratio between the cell thickness of the liquid crystal layer and the retardation Rlc obtained from birefringence difference is 0.83 at the average tilt angle of 4.5°, 0.65 at 7.5°, 0.52 at 11.5°, and 0.44 or 0.59 at 14.5°. The value of Rf/Rlc varies with the average tilt angle of the reflecting projections and depressions, and sufficient compensation effect can be expected even with deviation of about 10% from the optimal retardation, resulting in $0.6 \leq Rf/Rlc \leq 0.9$ for the average tilt angle of not less than about 4° nor greater than about 6°, 0.5≦Rf/Rlc≦0.8 for not less than about 7° nor greater than about 9°, and 0.4≦Rf/Rlc≦0.7 for not less than about 10° nor greater than about 15°.

Here, the average tilt angle is expressed by integral numbers, but when there is a decimal fraction, it only needs to be rounded off so that the description of the average tilt angle of not less than 4° nor greater than 6° equals the average tilt angle of not less than 3.5° nor greater than 6.5°. Suppose that the deviation up to ±10% from the optimal retardation is within the optimal retardation range, the retardation is not less than about 225 nm nor greater than about 275 nm (not less than 0.75 nor greater than 0.92) at the average tilt angle of 3.5° and is not less than about 180 nm nor greater than about 220 nm (not less than 0.60 nor greater than 0.74) at 6.5°, and as a result, the optimal retardation range is 0.6≦Rf/Rlc≦0.9 for the average tilt angle of not less than about 4° nor greater than about 6°.

Here, the Rf/Rlc is expressed by values at a first decimal place, but a value at a second decimal place or lower only needs to be rounded off so that the range of 0.6≦Rf/Rlc≦0.9 is equal to the range of 0.55≦Rf/Rlc≦0.94.

Similarly, the optimal retardation range is not less than about 140 nm nor greater than about 195 nm (not less than 0.47 nor greater than 0.65) at the average tilt angle of 9.5°, and the optimal retardation range is 0.5≦Rf/Rlc≦0.8 at the average tilt angle of not less than about 7° nor greater than about 9°. Similarly the optimal retardation range is not less than about 120 nm nor greater than about 195 nm (not less than 0.40 nor greater than 0.65) at the average tilt angle of 15.50 and the optimal retardation range is 0.4≦Rf/Rlc≦0.7 for the average tilt angle of about 10° to about 15°.

Configuration is made such that the retardation plate uniaxially stretched to have thus obtained retardation is layered, in an orthogonal placement, between a polarizing plate and a liquid crystal display element. More specifically, it is only required to layer, in an orthogonal placement, between the polarizing plate and the liquid crystal display element, a retardation plate having a retardation of 260 nm in the substrate in-plane direction and a retardation of 125 nm in the substrate vertical direction (manufactured by Sumitomo Chemical Co., Ltd., $n_z$ coefficient=0.94) in Sample 1 since the optimal retardation is about 248 nm at the average tilt angle of 4.5°, a retardation plate having a retardation of 220 nm in the substrate in-plane direction and a retardation of 97.9 nm in the substrate vertical direction (manufactured by Sumitomo Chemical Co., Ltd., $n_z$ coefficient=0.94) in Sample 2 since the optimal retardation is about 195 nm at the average tilt angle of 7.5°, a retardation plate having a retardation of 165 nm in the substrate in-plane direction and a retardation of 75.1 nm in the substrate vertical direction (manufactured by Sumitomo Chemical Co., Ltd., $n_z$ coefficient=0.96) in Sample 3 since the optimal retardation is about 154 nm at the average tilt angle of 11.5°, and a retardation plate having a retardation of 150 nm in the substrate in-plane direction and a retardation of 66.4 nm in the substrate vertical direction (manufactured by Sumitomo Chemical Co., Ltd., $n_z$ coefficient=0.94) in Sample 4 since the optimal retardation is about 133 nm at the average tilt angle of 14.5°, respectively.

Figure 15:
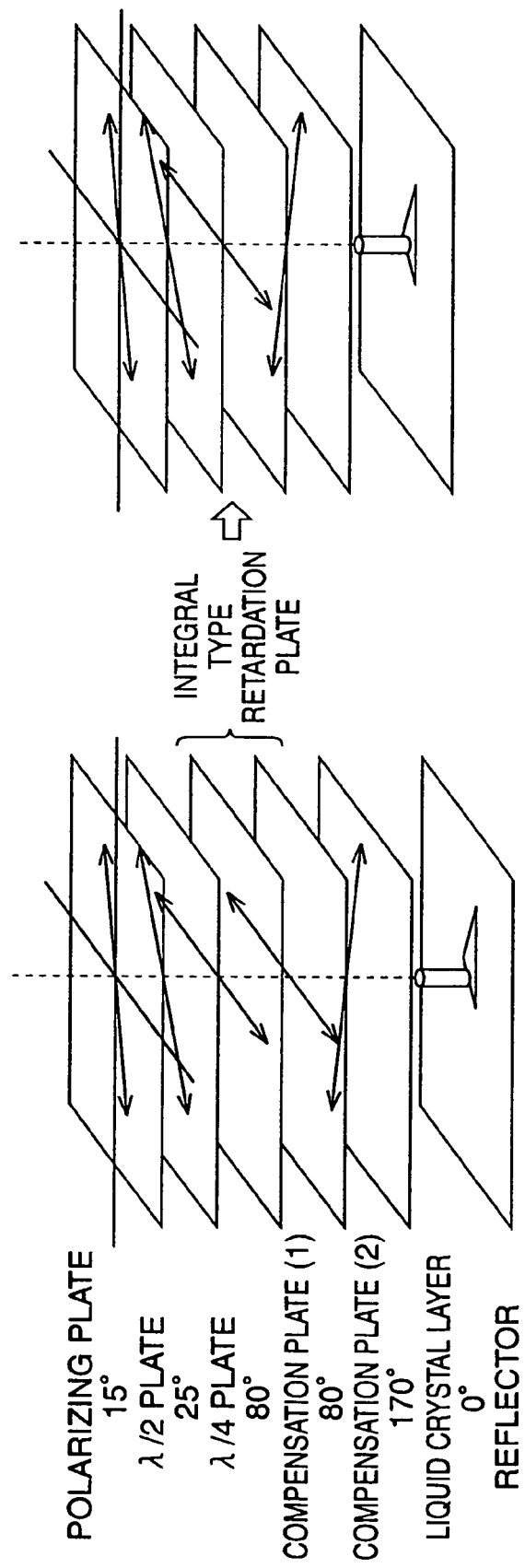
FIG. 15 is a perspective view schematically showing a configuration of an optical compensation plate used in a second embodiment.

However, as shown in FIG. 15, necessary retardation plates, in addition to this retardation plate, for use in the reflection-type liquid crystal display device are a retardation plate (λ/2 plate) having a retardation of about a half of the visible light wavelength in the substrate in-plane direction and a retardation plate (λ/4 plate) having a retardation of about a quarter of the same which are as a broadband λ/4 plate, and consequently four retardation plates altogether including compensation plates (1) and (2) which are layered in an orthogonal placement are required. A larger number of layered retardation plates reduces the advantage of use of inexpensive ones, and thus the λ/4 plate and the compensation plate (1) are integrated to form a configuration with three retardation plates in the embodiment. Here, the liquid crystal layer is regarded as existing between the reflector and the compensation plate (2), and the illustration thereof is omitted in FIG. 15 for convenience.

In other words, the retardation in the substrate in-plane direction of the λ/4 plate is about 135 nm, to which the retardation of one compensation plate is added to enable the integration, resulting in 395 nm at the average tilt angle of 4.5°, 355 nm at 7.5°, 300 nm at 11.5°, and 285 nm at 14.5°. As the integrated retardation plates, a retardation plate having retardations of 400 nm in the substrate in-plane direction and 178 nm in the substrate vertical direction (Sample 1, manufactured by Sumitomo Chemical Co., Ltd., $n_z$ coefficient=0.94) at the average tilt angle of 4.5°, a retardation plate having retardations of 350 nm in the substrate in-plane direction and 155 nm in the substrate vertical direction (Sample 2, manufactured by Sumitomo Chemical Co., Ltd., $n_z$ coefficient=0.94) at 7.5°, a retardation plate having retardations of 300 nm in the substrate in-plane direction and 133 nm in the substrate vertical direction (Sample 3, manufactured by Sumitomo Chemical Co., Ltd., $n_z$ coefficient=0.94) at 11.5°, and a retardation plate having retardations of 288 nm in the substrate in-plane direction and 128 nm in the substrate vertical direction (Sample 4, manufactured by Sumitomo Chemical Co., Ltd., $n_z$ coefficient=0.94) at 14.5°, are used respectively.

Here, the integrated retardation plate has a retardation in the substrate vertical direction, but the retardation effective in compensating the retardation of the liquid crystal layer where no voltage is applied is the retardation substantially corresponding to that of the compensation plate. This is because light incident on the broadband λ/4 plate is incident in linearly polarized light from an azimuth of about 45° with respect to its slow axis, while light incident on the compensation plate is incident in a circularly polarized light with no azimuth dependence on the slow axis. In other words, the retardation in the substrate vertical direction of the uniaxially stretched retardation plate has azimuth dependence and thus effectively acts in the azimuth of the slow axis, but does not act so effectively in an azimuth greatly deviated from that of the slow axis. The films and plates are arranged in layers in order such that the absorption axis of the polarizing plate is in an azimuth of 15°, the slow axis of the λ/2 plate is in an azimuth of 25°, the slow axis of the integral type retardation plate (λ/4 plate+compensation plate (1)) is in an azimuth of 80°, the compensation plate (2) is in an azimuth of 170°, and the rubbing angle of the liquid crystal is in an azimuth of 0°, thereby obtaining a reflection-type liquid crystal display device.

Besides, as a comparative example, a compensation plate is constituted of a biaxially stretched retardation plate to produce a reflection-type liquid crystal display device in which the retardation is set so that obliquely incident light becomes circularly polarized light when reaching the reflector, that is, retardations occurring in the retardation plate and the liquid crystal layer in an approach route are equal to each other. Table 4 and Table 5 show results of calculation for every observation angle of the retardations of the liquid crystal layers in the approach route when the reflecting projections and depressions with the average tilt angles of not less than 3.5° nor greater than 15.5° are applied, and the retardations of the retardation plates.

TABLE 4

Estimation results of retardations of liquid crystal
layers in approach route and retardations of
retardation plates (at observation angle of 0°)

| | Average tilt | Liquid crystal layer | Retardation ① | Retardation ② | Retardation ③ | Retardation ④ | Retardation ⑤ | Retardation ⑥ | Retardation ⑦ | Retardation ⑧ |
|---|---|---|---|---|---|---|---|---|---|---|
| Comparative Example 1 | 3.5 | 2.3 | 3.9 | 4.9 | 4.6 | 4.9 | 5.3 | 4.7 | 6.5 | 7.2 |
| | 4.5 | 3.9 | 4.4 | 5.9 | 5.9 | 6.5 | 7.0 | 6.6 | 8.9 | 10.0 |
| | 5.5 | 5.8 | 4.9 | 7.2 | 7.5 | 8.4 | 9.2 | 9.0 | 12.0 | 13.6 |
| | 6.5 | 8.2 | 5.6 | 8.7 | 9.5 | 10.7 | 11.8 | 11.9 | 15.7 | 17.9 |
| Comparative Example 2 | 7.5 | 11.0 | 6.5 | 10.5 | 11.8 | 13.3 | 14.8 | 15.3 | 20.0 | 22.9 |
| | 8.5 | 14.2 | 7.4 | 12.6 | 14.5 | 16.4 | 18.3 | 19.3 | 25.0 | 28.7 |
| | 9.5 | 18.0 | 8.5 | 15.0 | 17.5 | 20.0 | 22.3 | 23.7 | 30.7 | 35.3 |
| Comparative | 10.5 | 22.1 | 9.7 | 17.6 | 20.9 | 23.9 | 26.8 | 28.7 | 37.0 | 42.6 |
| ative | 11.5 | 26.8 | 11.1 | 20.5 | 24.7 | 28.3 | 31.7 | 34.2 | 44.0 | 50.8 |
| Example 3 | 12.5 | 32.0 | 12.6 | 23.8 | 28.8 | 33.1 | 37.2 | 40.3 | 51.8 | 59.8 |
| Comparative | 13.5 | 37.8 | 14.2 | 27.3 | 33.4 | 38.4 | 43.2 | 47.0 | 60.3 | 69.7 |
| ative | 14.5 | 44.2 | 16.0 | 31.2 | 38.3 | 44.2 | 49.8 | 54.3 | 69.6 | 80.5 |
| Example 4 | 15.5 | 51.3 | 17.9 | 35.5 | 43.8 | 50.5 | 56.9 | 62.3 | 79.7 | 92.3 |

TABLE 5

Estimation results of retardations of liquid crystal
layers in approach route and retardations of
retardation plates (at observation angle of 45°)

| | Average tilt | Liquid crystal layer | Retardation ① | Retardation ② | Retardation ③ | Retardation ④ | Retardation ⑤ | Retardation ⑥ | Retardation ⑦ | Retardation ⑧ |
|---|---|---|---|---|---|---|---|---|---|---|
| Comparative | 3.5 | 44.8 | 9.8 | 17.8 | 28.0 | 32.2 | 36.2 | 39.1 | 50.3 | 58.1 |
| ative | 4.5 | 38.9 | 8.6 | 15.1 | 25.9 | 29.7 | 33.4 | 36.1 | 46.4 | 53.6 |
| Example 1 | 5.5 | 33.5 | 7.5 | 12.7 | 23.9 | 27.4 | 30.8 | 33.2 | 42.7 | 49.2 |
| | 6.5 | 28.6 | 6.5 | 10.6 | 22.0 | 25.2 | 28.3 | 30.4 | 39.1 | 45.1 |
| Comparative | 7.5 | 24.1 | 5.7 | 8.8 | 20.2 | 23.1 | 25.9 | 27.7 | 35.8 | 41.2 |
| ative | 8.5 | 20.1 | 5.0 | 7.3 | 18.5 | 21.1 | 23.7 | 25.2 | 32.6 | 37.5 |
| Example 2 | 9.5 | 16.6 | 4.4 | 6.0 | 16.9 | 19.3 | 21.5 | 22.8 | 29.6 | 34.0 |
| Comparative | 10.5 | 13.4 | 3.9 | 4.9 | 15.4 | 17.5 | 19.5 | 20.6 | 26.7 | 30.7 |
| ative | 11.5 | 10.7 | 3.6 | 4.2 | 14.0 | 15.8 | 17.6 | 18.5 | 24.0 | 27.6 |
| Example 3 | 12.5 | 8.4 | 3.3 | 3.6 | 12.6 | 14.3 | 15.9 | 16.5 | 21.5 | 24.6 |
| Comparative | 10.5 | 6.4 | 3.2 | 3.4 | 11.4 | 12.8 | 14.2 | 14.7 | 19.2 | 21.9 |
| ative | 11.5 | 4.9 | 3.2 | 3.3 | 10.2 | 11.5 | 12.7 | 13.0 | 17.0 | 19.4 |
| Example 4 | 12.5 | 3.7 | 3.3 | 3.6 | 9.1 | 10.2 | 11.2 | 11.4 | 15.0 | 17.0 |

The retardations occurring in the liquid crystal layers in the approach route are 3.9 nm at the average tilt angle of 4.5°, 11.0 nm at 7.5°, 26.8 nm at 11.5°, and 44.2 nm at 14.50 for the observation angle of 0°, and 38.9 nm at the average tilt angle of 4.5°, 24.1 nm at 7.5°, 10.7 nm at 11.5°, and 4.9 nm at 14.5° for the observation angle of 45°. Accordingly, for the observation angle of 0°, the optimal retardation plate is ① at the average tilt angle of 4.5°, ② at 7.5°, ④ at 11.5°, and ④ at 14.5°. On the other hand, for the observation angle of 45°, the optimal retardation plate is ⑥ at the average tilt angle of 4.5°, ④ at 7.5°, ③ at 11.5°, and ② at 14.5°.

In the case in which the optimal retardation greatly differs depending on the observation angle, light greatly leaks at a specific angle unless a retardation plate is selected with priority given to a larger retardation of the liquid crystal layer where no voltage is applied, resulting in a great loss of contrast characteristics. Accordingly, it is preferable to determine that the optimal retardation plate is ⑥ at the average tilt angle of 4.5°, ④ at 7.5°, ③ at 11.5°, and ④ at 14.5°. The optimal retardation plate is ⑦ at the average tilt angle of 4.5°, ⑥ at 7.5°, ④ at 11.5°, and ③ or ⑤ at 14.5° in the embodiment, which shows that the optimal retardation plates are different from the above respectively.

Accordingly, a retardation plate having retardations of 3 nm in the substrate in-plane direction and 195 nm in the substrate vertical direction (Comparative Example 1, manufactured by Sumitomo Chemical Co., Ltd., $n_z$ coefficient=102) at the average tilt angle of 4.5°, a retardation plate having retardations of 3 nm in the substrate in-plane direction and 155 nm in the substrate vertical direction (Comparative Examples 2 and 4, manufactured by Sumitomo Chemical Co., Ltd., $n_z$ coefficient=102) at 7.5° and 14.5°, and a retardation plate having retardations of 3 nm in the substrate in-plane direction and 133 nm in the substrate vertical direction (Comparative Example 3, manufactured by Sumitomo Chemical Co., Ltd., $n_z$ coefficient=102) at 11.5°, are used as compensation plates respectively.

The contrast ratio in all white/all black display of the reflection-type liquid crystal display device produced in each of Samples and Comparative Examples was measured at an observation azimuth of 90° and observation angles of 0° and 45° using a diffused light source. Their results are shown in Table 6 and Table 7. The contrast ratios of Samples 1 to 4 are about 25 or greater at both observation angles (however, the contrast ratio at the observation angle of 0° is 20 at the average tilt angle of 14.5° because priority is given to the observation angle of 45°), exhibiting excellent contrast characteristics at almost all angles. On the other hand, the contrast ratios of Comparative Examples 1 to 4 are about 22 or less at the observation angle of 45°, so that the contrast ratio is decreased by about 15% as compared to the examples. This is because the estimation of the optimal retardation deviates by about 15% in Comparative Examples.

TABLE 6

Contrast ratios of Samples 1 to 4

| Observation Angle | Example 1 4.5° | Example 2 7.5° | Example 3 11.5° | Example 4 14.5° |
|---|---|---|---|---|
| 0° | 27 | 25 | 25 | 20 |
| 45° | 26 | 25 | 25 | 26 |

TABLE 7

Contrast ratios of Comparative Examples 1 to 4

| Observation Angle | Conventional Example 1 4.5° | Conventional Example 2 7.5° | Conventional Example 3 11.5° | Conventional Example 4 14.5° |
|---|---|---|---|---|
| 0° | 27 | 25 | 25 | 22 |
| 45° | 22 | 21 | 21 | 22 |

As has been described, according to this embodiment, display with less viewing angle dependence and a high contrast ratio can be obtained, so that display becomes easy to view even in a relatively dim place such as an indoor environment. This leads to wider application of the reflection-type liquid crystal display device and greatly contributes to market expansion.

Third Embodiment

Figure 16:
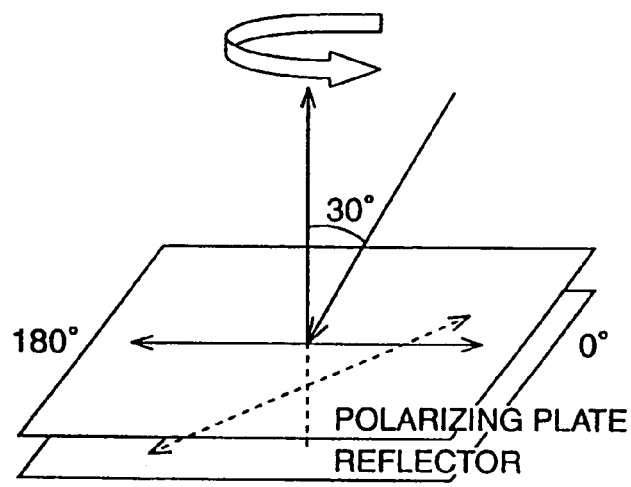
FIG. 16 is a perspective view showing a configuration of a single polarizing plate and a measurement method.

FIG. 16 is a perspective view showing a configuration of a single polarizing plate and a measurement method. Here, only a reflector and a polarizing plate are shown in FIG. 16 for convenience.

The polarizing plate (manufactured by Sumitomo Chemical Co., Ltd.) was arranged above the reflector such that its absorption axis was in a 0° azimuth (its transmission axis in a 90° azimuth), and the reflection intensity was measured with the azimuth angle of a 30° incidence varied. Here, the reflector is made by forming projections and depressions using a resist (manufactured by Shipley Ltd.) on a glass substrate, and depositing an aluminum film on their surfaces. Note that the reflector in use was a non-directional reflector in which tilt surfaces of the reflecting projections and depressions are oriented toward random azimuths to check the azimuth characteristics due to the polarizing plate.

Figure 17:
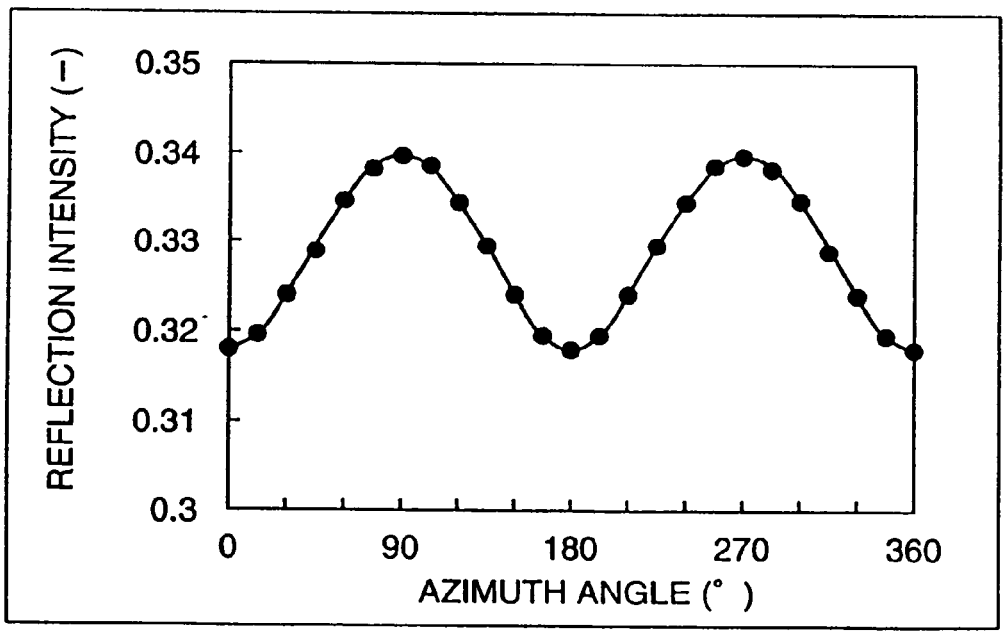
FIG. 17 is a characteristic diagram showing azimuth angle characteristics of the single polarizing plate.

FIG. 17 is a characteristic diagram showing azimuth angle characteristics of the single polarizing plate (30° incidence).

The reflection intensity is minimum in the azimuth of the absorption axis (0°, 180°) and the reflection intensity is maximum in the azimuth of the transmission axis (90°, 270°) due to the absorption characteristics of the polarizing plate.

Figure 18:
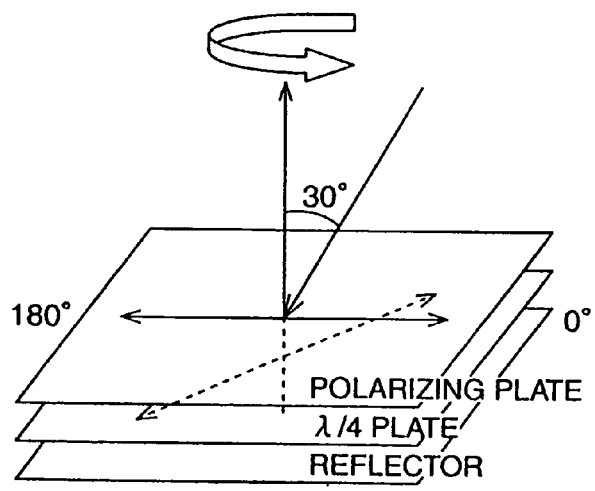
FIG. 18 is a perspective view showing a configuration of a polarizing plate+$\lambda/4$ and a measurement method.

On the other hand, FIG. 18 is a perspective view showing a configuration of a polarizing plate+λ/4 and a measurement method. Here, only the reflector, λ/4 plate, and polarizing plate are shown in FIG. 18 for convenience.

A retardation plate having a wavelength of a quarter of the visible light wavelength (manufactured by Sumitomo Chemical Co., Ltd., low wavelength dispersion film, in-plane retardation of 138 nm) was arranged between the polarizing plate and the reflector such that the angle formed between its slow axis and absorption axis was 45°, and the reflection intensity was measured with the azimuth angle of a 30° incidence and a 0° light-reception varied.

Figure 19:
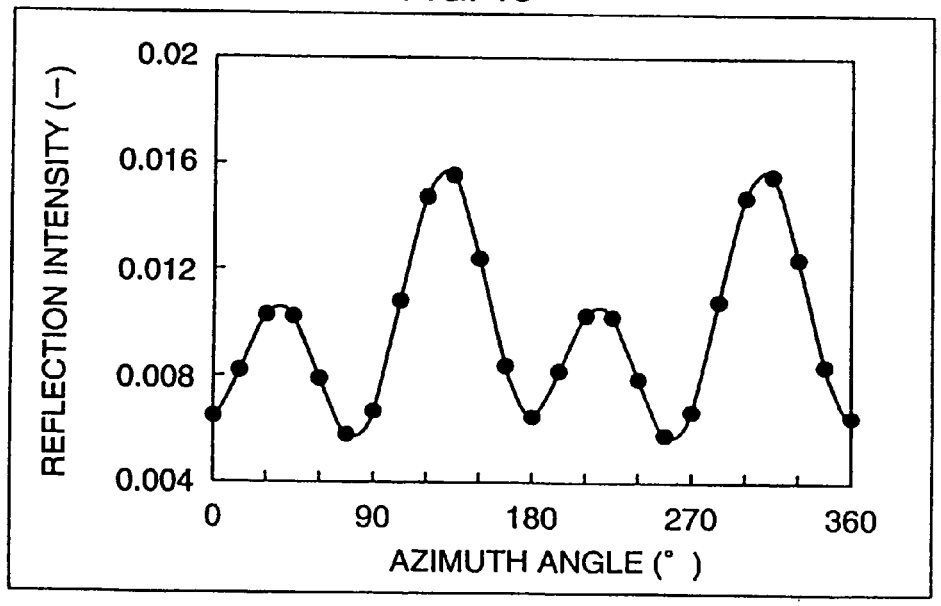
FIG. 19 is a characteristic diagram showing azimuth angle characteristics of the polarizing plate +$\lambda/4$.

FIG. 19 is a characteristic diagram showing azimuth angle characteristics of the polarizing plate+λ/4 (30° incidene).

Originally, when arrangement is made such that the angle formed between the slow axis of the retardation plate and the absorption axis of the polarizing plate is 45°, the reflection intensity should be minimum in the azimuth of the transmission axis and the azimuth of the absorption axis since linearly polarized light incident from the azimuth of the transmission axis is rotated 90° to be parallel to the absorption axis of the polarizing plate. However, the reflection intensity is actually minimum in the azimuths deviated by about −15° from the respective azimuths.

FIG. 20 is a characteristic diagram showing azimuth angle characteristics of λ/4 polarizing plate, for every incident angle (0-30° incidence), of the reflection intensity measured with the incident angle and the azimuth angle varied in the same configuration as in FIG. 18. With an increase in incident angle, the azimuth in which the reflection intensity is minimal increasingly deviates to a minus azimuth.

The increase in the reflection intensity due to azimuth deviation up to θ1=10° is small, but when θ1 is greater than that, the increase in the reflection intensity due to azimuth deviation becomes large, leading to a decrease in CR. This is because the deviation of retardation increases with an increase in incident angle so that the polarization azimuth increasingly deviates from 90° rotation.

FIG. 21 is a characteristic diagram showing incident angle characteristics of the reflection intensity measured when the observation azimuth was fixed to 270°, and the incident angle and the rotation angle of the axis placement were varied in the same configuration as in FIG. 18.

The reason why the observation azimuth is fixed to 270° here is that the observation azimuth, that is, the azimuth in which the reflection intensity due to the reflecting projections and depressions is high (directional azimuth) is set to 90° and 270°, and the rotation angle of the axis placement by which the reflection intensity becomes minimum in the azimuths is found. On the other hand, when the axis placement is rotated +15° in an azimuth opposite to the deviation of the polarization azimuth, the polarization azimuth becomes substantially parallel to the absorption axis of the polarizing plate because of offset by the amount of deviation of the polarization azimuth, so that the reflection intensity becomes minimum within the whole incident angle range. However, the reflection intensity is low as compared with that before rotation within the range of not less than 0° nor greater than 25°, and therefore improvement effects can be expected.

Figure 22:
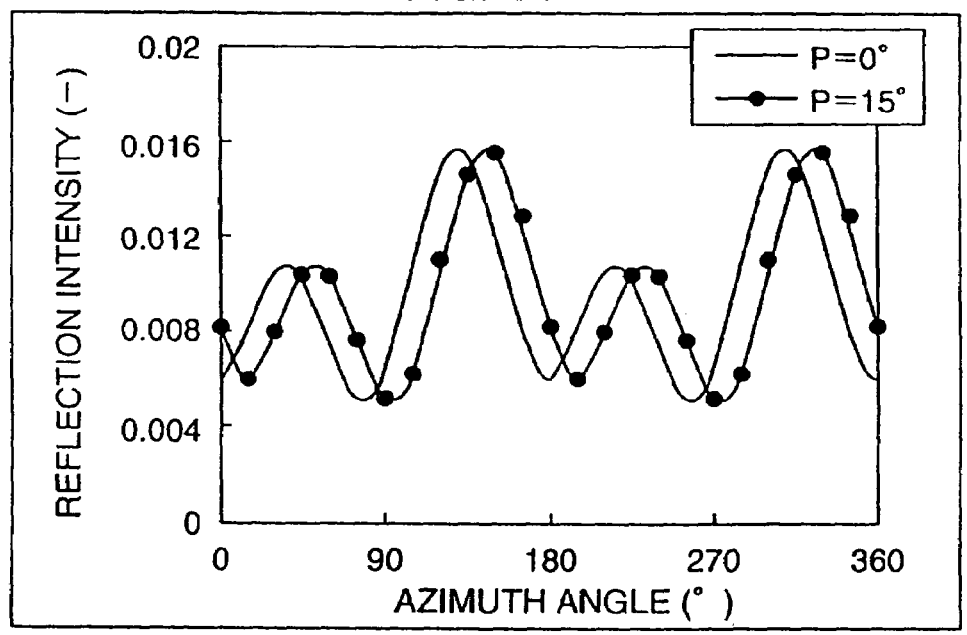
FIG. 22 is a characteristic diagram showing azimuth angle characteristics of the reflection intensity measured when the axis placement was rotated +15°, and the azimuth angle of a 30° incidence was varied.

FIG. 22 is a characteristic diagram showing λ/4 polarizing plate azimuth angle characteristics (30° incidence) of the reflection intensity measured when the axis placement was rotated +15° from the configuration in FIG. 18, and the azimuth angle of a 30° incidence was varied.

Here, when the axis placement is rotated +15° in an azimuth opposite to the deviation, the reflection intensity becomes minimum in the directional azimuth (90°, 270°) by rotating the axis placement +15°.

Figure 23:
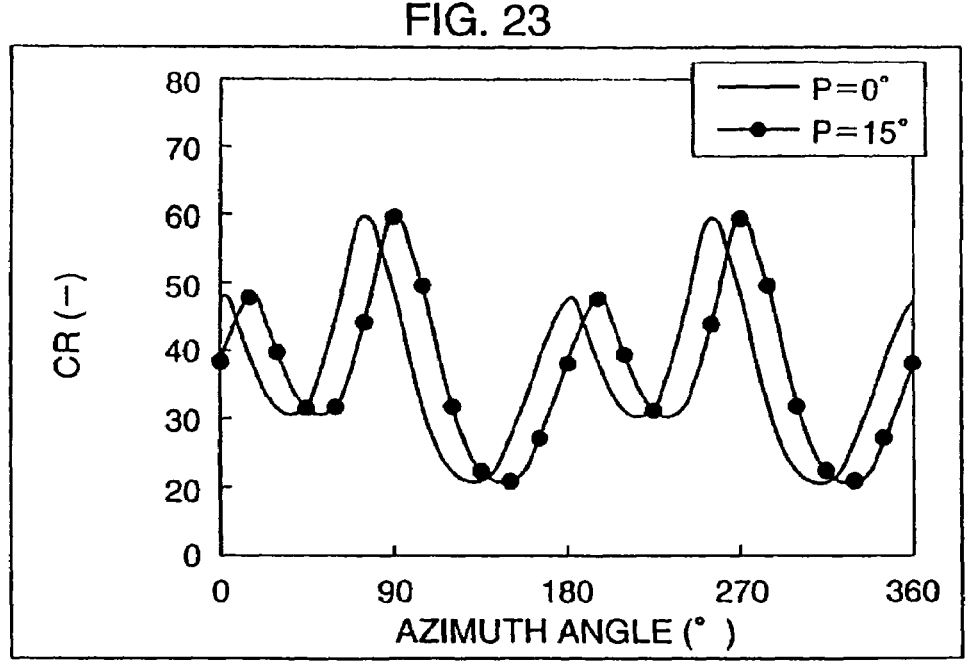
FIG. 23 is a characteristic diagram showing azimuth angle characteristics of measured contrast ratio (CR)

FIG. 23 is a characteristic diagram showing λ/4 polarizing plate azimuth angle characteristics (30° incidence) of measured contrast ratio (CR) as in FIG. 22.

When the axis placement is rotated +15° in an azimuth opposite to the deviation, the azimuth of the transmission axis deviates by +15° from the directional azimuth to slightly decrease the reflection intensity of white display, but the decreased rate is very small, and as a result, the contrast ratio is maximum in the directional azimuth (90°, 270°). Accordingly, a polarizing plate and a retardation plate having a retardation of about a quarter of the visible light wavelength in the substrate in-plane direction are arranged such that the angle formed between an azimuth φ in which the reflection intensity is maximum and an absorption axis P of the polarizing plate is not less than about 65° nor greater than about 90°, and the angle formed between a slow axis F1 of the retardation plate and P is about 45°, whereby the contrast ratio can be improved in the directional azimuth to realize display that is easy to view. The reason why the angle formed between φ and P is set here to not less than 65° nor greater than 90° is that although an angle of 75° is optimal as the embodiment, an angle within this range allows the reflection intensity to be low as compared to that before the rotation, so that improvement effects can be expected.

Figure 24:
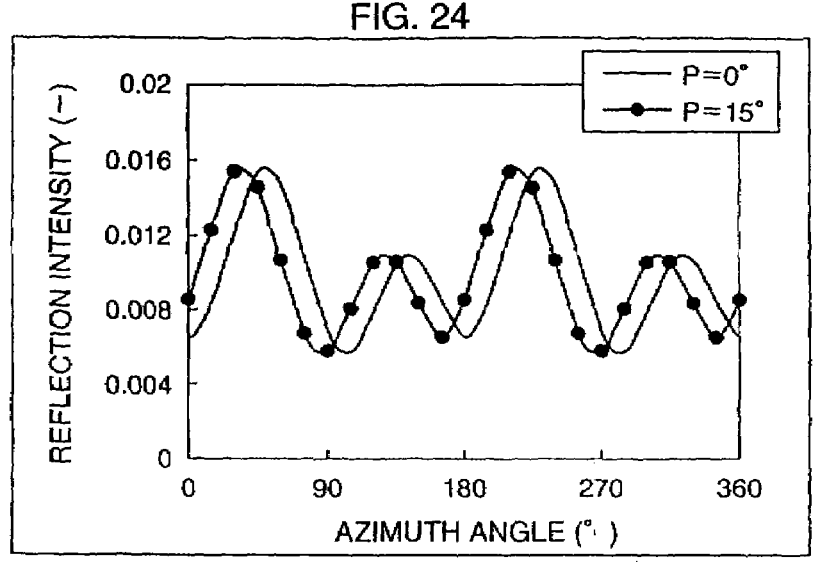
FIG. 24 is a characteristic diagram showing azimuth angle characteristics of the reflection intensity measured when a retardation plate having $\lambda/4$ of the visible light wavelength was arranged between a polarizing plate and a reflector such that an angle formed between its slow axis and absorption axis was 135°, and the azimuth angle of a 30° incidence was varied.

FIG. 24 is a characteristic diagram showing azimuth angle characteristics of the reflection intensity measured when a retardation plate having λ/4 of the visible light wavelength was arranged between a polarizing plate and a reflector such that the angle formed between its slow axis and absorption axis was 135°, and the azimuth angle of a 30° incidence and 0° light-reception was varied.

When the angle formed between the slow axis and absorption axis is 135°, the polarization azimuth deviates in the opposite direction to the case of 45°, so that the reflection intensity is minimum in azimuths deviating by +15° from the respective azimuths. Hence, the axis placement is rotated −15°, whereby the reflection intensity becomes minimum in the directional azimuth.

Figure 25:
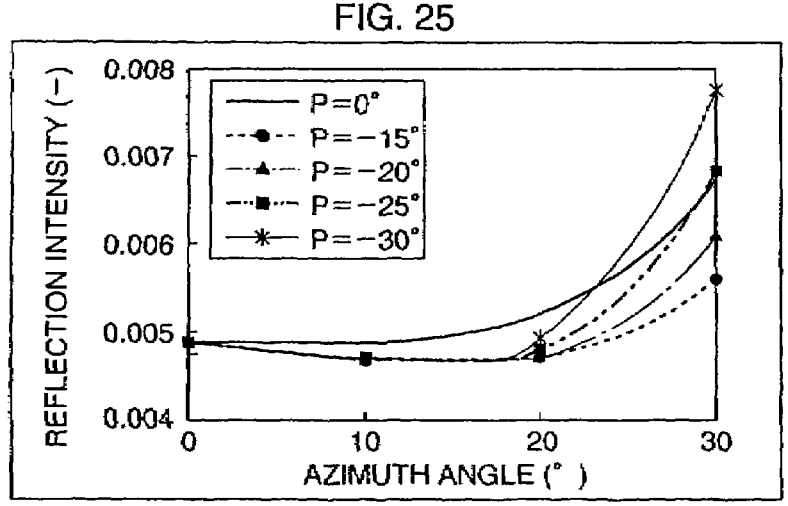
FIG. 25 is a characteristic diagram showing incident angle characteristics of the reflection intensity measured when the observation azimuth was fixed to 90°, and the incident angle and the rotation angle of the axis placement were varied.

FIG. 25 is a characteristic diagram showing incident angle characteristics of the reflection intensity measured when the observation azimuth was fixed to 270°, and the incident angle and the rotation angle of the axis placement were varied.

When the axis placement is rotated −15° in the opposite direction to deviation, leaking light is minimized, and when the rotation is within a range not less than −25° nor greater than 0°, the reflection intensity becomes low as compared to that before the rotation so that improvement effects can be expected. Accordingly, a polarizing plate and a retardation plate having a retardation of about a quarter of the visible light wavelength in the substrate in-plane direction are arranged such that the angle formed between an azimuth φ in which the reflection intensity is maximum and an absorption axis P of the polarizing plate is not less than about 90° nor greater than about 115°, and the angle formed between a slow axis $F_1$ of the retardation plate and P is about 135°, whereby the contrast ratio is improved in the directional azimuth, so that display becomes easy to view. The reason why the angle formed between φ and P is set here to not less than 90° nor greater than 135° is that although an angle of 105° is optimal as the embodiment, an angle within this range allows the reflection intensity to be low as compared to that before the rotation, so that improvement effects can be expected.

Figure 26:
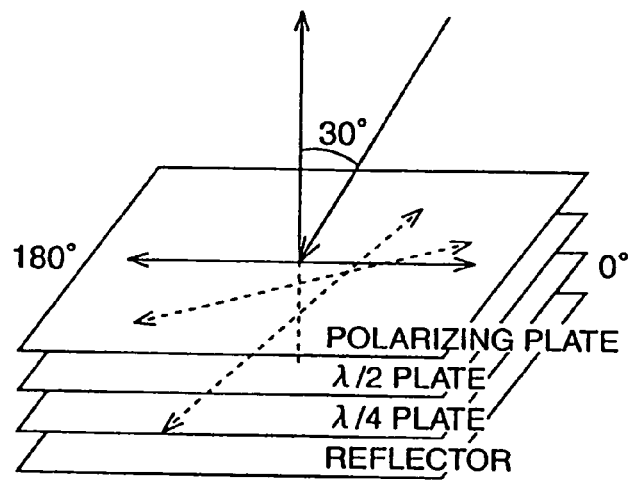
FIG. 26 is a perspective view showing a configuration of a polarizing plate+broadband $\lambda/4$ and a measurement method.

FIG. 26 is a perspective view showing a configuration of a polarizing plate+broadband λ/4 and a measurement method. Here, only a reflector, a λ/4 plate, a λ/2 plate, and the polarizing plate are shown in FIG. 26 for convenience.

The λ/2 plate and the polarizing plate were arranged such that the angle formed between a slow axis of the λ/2 plate and an absorption axis of polarizing plate was 0° to 25°, and the reflection intensity was measured with the azimuth angle of a 30° incidence varied. Here, the broadband λ/4 is made by layering a first retardation plate having a retardation of about λ/4 (Sumitomo Chemical Co., Ltd., in-plane retardation of 128 nm to 138 nm) and a second retardation plate having a retardation of about λ/2 of the visible light wavelength (Sumitomo Chemical Co., Ltd., in-plane retardation of 265 nm to 280 nm).

Figure 27:
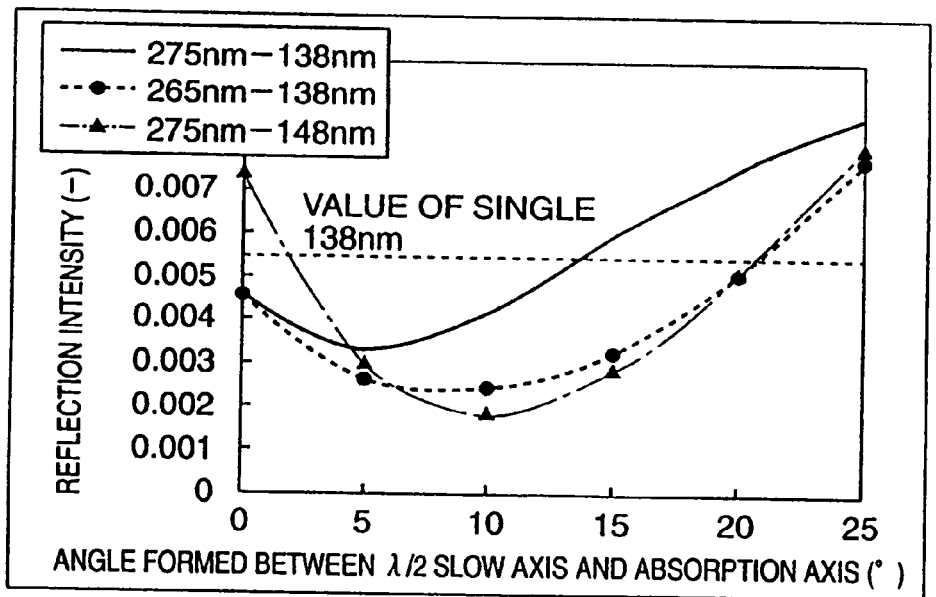
FIG. 27 is a characteristic diagram showing how the reflection intensity changes in a directional azimuth with the angle formed between a slow axis of a $\lambda/2$ plate and an absorption axis of a retardation plate changed for every combination of the $\lambda/2$ plate and a $\lambda/4$ plate.

FIG. 27 is a characteristic diagram showing how the reflection intensity changes in a 270° azimuth with the angle formed between a slow axis of a λ/2 plate and an absorption axis of a polarizing plate changed for every combination of the λ/2 plate and a λ/4 plate.

In a combination of 275 nm and 138 nm, the reflection intensity becomes minimum in the directional azimuth by setting the angle formed between the slow axis of the λ/2 plate and the absorption axis of the polarizing plate to 5°. Though the axis placement of the λ/4 plate is not mentioned here, it is only required to place the λ/4 plate such that the polarization azimuth of linearly polarized light incident from the azimuth of the transmission axis is rotated with the λ/2 plate as a symmetrical axis and the resultant azimuth is 45° or 135° with respect to the slow axis of the λ/4 plate. For example, where the angle formed between the slow axis of the λ/2 plate and the absorption axis of the polarizing plate is 10°, the angle formed between the slow axis of the λ/4 plate and the absorption axis of the polarizing plate becomes 65° or 155°. On the other hand, in combinations of 265 nm and 138 nm, and 275 nm and 148 nm, the reflection intensity becomes minimum where the angle formed between the slow axis of the λ/2 plate and the absorption axis of the polarizing plate is 10°, and accordingly the optimal angle differs depending on the combination of retardation plates in use. However, an angle of 0° to 20° allows the reflection intensity to be low as compared to that of the single λ/4 plate, so that improvement effects can be expected.

Accordingly, this retardation plate is constituted of a first retardation plate having a retardation of about a quarter of the visible light wavelength and a second retardation plate having a retardation of about a half of the visible light wavelength, and arrangement is made such that the angle formed between a slow axis $F_{12}$ of the second retardation plate and the absorption axis P of the polarizing plate is not less than about 0° nor greater than about 20°, the angle formed between a slow axis $F_{11}$ of the first retardation plate and $F_{12}$ is not less than about 45° nor greater than about 65° (when the slow axis of the combined vector is at about 45°, or not less than about 135° nor greater than about 155° (when the slow axis of the combined vector is at about 135°, whereby the contrast ratio is improved in the directional azimuth, so that display becomes easy to view. The reason why the angle formed between $F_{12}$ and the absorption axis P is set to 0° to 20° is that when the retardation of the retardation plate in use deviates by about 10 nm, the optimal angle range deviates by about 5°, and an angle within this range allows the reflection intensity to be low as compared to that of the single λ/4 plate, so that improvement effects can be expected.

Figure 28:
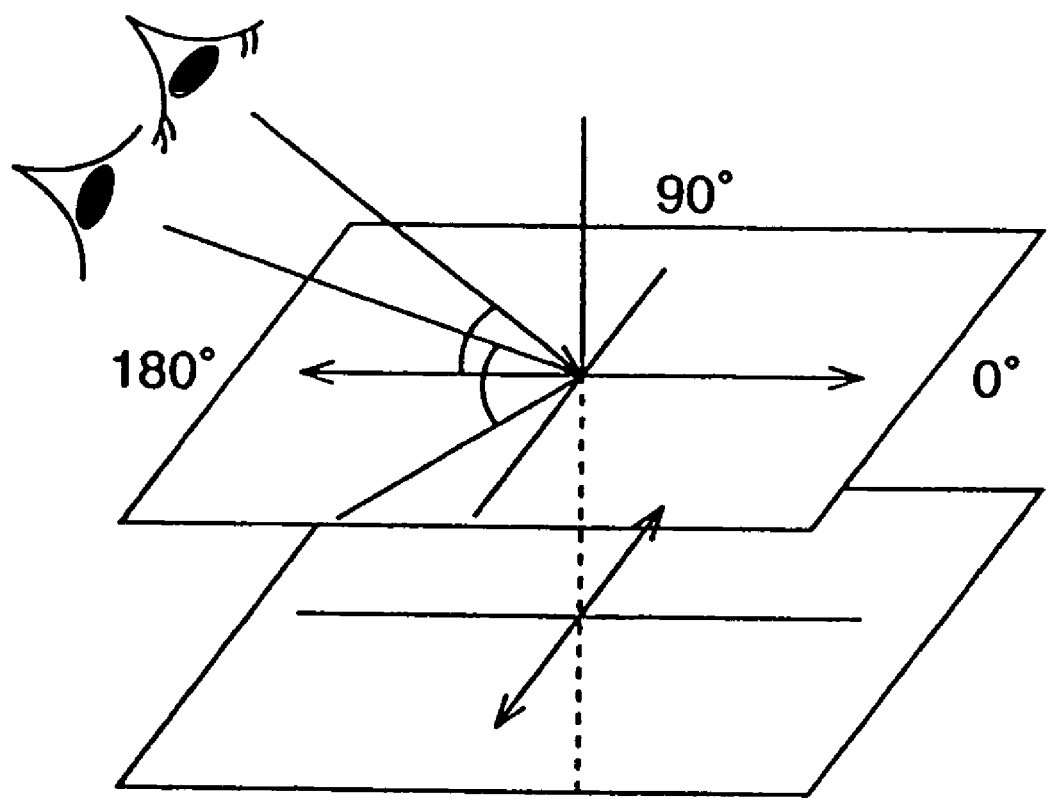
FIG. 28 is a perspective view showing an axis placement when uniaxially stretched films are layered.

FIG. 28 is a perspective view showing an axis placement when uniaxially stretched films are layered.

The uniaxially stretched film in use here is a λ/4 plate having an in-plane retardation of 138 nm (manufactured by Sumitomo Chemical Co., Ltd.) and has a retardation of 60 nm to 90 nm in the substrate vertical direction. Light leakage occurs in azimuths different from those of the slow axes of the uniaxial films.

Figure 29:
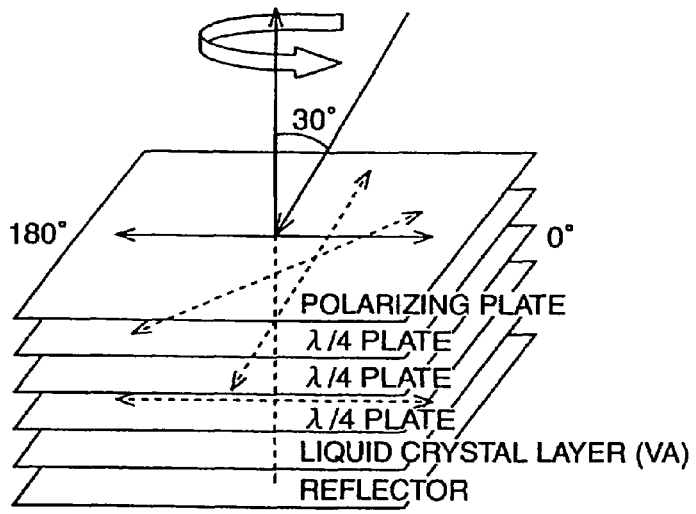
FIG. 29 is a perspective view showing a configuration of a polarizing plate+$\lambda/4$+a compensation plate and a measurement method.

FIG. 29 is a perspective view showing a configuration of a polarizing plate+λ/4+a compensation plate and a measurement method.

The λ/4 plates as a compensation plate were arranged in layers such that their slow axes were at 0° and 90°, and the reflection intensity was measured with the azimuth angle of a 30° incidence varied. Besides, the intensities of configurations, as comparative examples, with and without using as a compensation plate a biaxially stretched film having an in-plane retardation of 2 nm to 3 nm and a retardation in the substrate vertical direction of 150 nm (manufactured by Sumitomo Chemical Co., Ltd.) were similarly measured. In this arrangement, the angle formed between the directional azimuth and the slow axis of the uniaxially stretched film was 0 to 40°, and the reflection intensity was measured with an azimuth angle of a 30° incidence.

Figure 30:
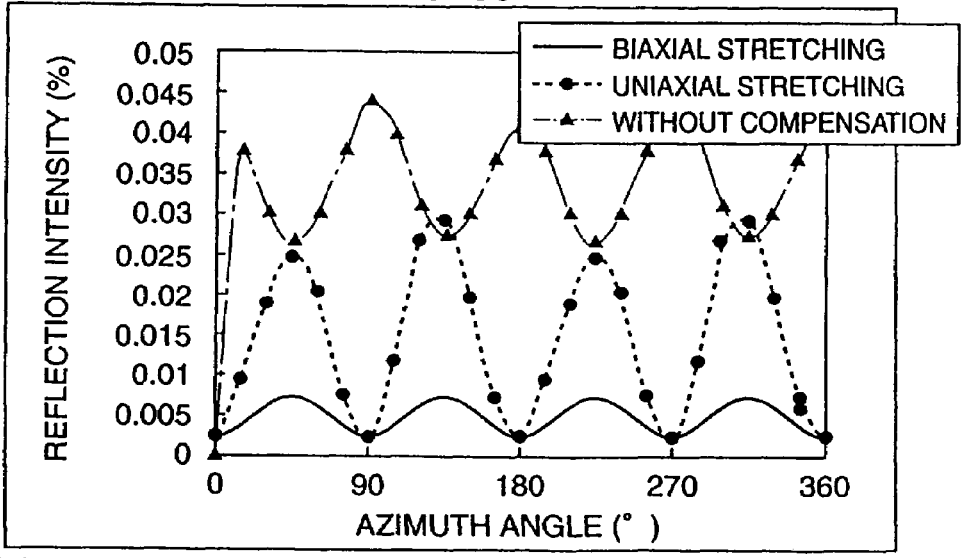
FIG. 30 is a characteristic diagram showing azimuth angle characteristics of every compensation plate.

FIG. 30 is a characteristic diagram showing azimuth angle characteristics of every compensation plate.

When the uniaxially stretched film is used as a compensation plate, light greatly leaks in azimuths different from that of the slow axis, and the reflection intensity is minimum in the azimuths of the slow axes, that is, the directional azimuths, thus showing compensation effects equivalent to that by a biaxially stretched retardation plate. The leaking light becomes less prominent by decreasing the reflection intensity in azimuths other than the directional azimuths by the reflecting projections and depressions. In this case, uniaxial stretching shows compensation effects equivalent to that of biaxial stretching in the directional azimuths. Reflection intensity in azimuths other than the directional azimuths decreases by reflecting projections and depressions, so that azimuth dependence can be decreased.

FIG. 31 is a characteristic diagram showing incident angle characteristics of the reflection intensity measured when the observation azimuth was fixed to 270°, and the incident angle and the angle formed between a slow axis of a uniaxially stretched film and a directional azimuth were varied.

The reflection intensity is minimum at a formed angle of 0°, but where the angle is up to 30°, improvement effects can be expected as compared to the case without compensation. Accordingly, another retardation plate having retardations in the substrate vertical direction and the substrate in-plane direction is arranged in layers on the liquid crystal layer side of the aforesaid retardation plate such that the angle formed between an azimuth φ in which the reflection intensity is maximum and a slow axis $F_2$ of at least one of the retardation plates is not less than about 0° nor greater than about 30°, whereby the retardation of the liquid crystal layer due to an oblique incidence can be canceled to improve the contrast ratio in the directional azimuth, so that the display becomes easy to view. The reason why the retardation plate is arranged on the liquid crystal layer side here is to cancel the retardation of the liquid crystal layer without being affected by the other retardation plate, and the reason why the angle formed between φ and $F_2$ is set to not less than 0° nor greater than 30° is that an angle of 0° is optimal as the embodiment, but where the angle is within the range of not less than 0° nor greater than 30°, improvement in the contrast ratio in the directional azimuth can be expected.

FIG. 32 is a characteristic diagram showing results of the reflection intensity in polar angle directions measured, as in FIG. 31, when the liquid crystal alignment on the substrate side where no reflecting projections and depressions were formed was varied within a range 0° to 90° with respect to the directional azimuth.

The reflection intensity is minimum at an angle formed between the alignment azimuth of the liquid crystal and the directional azimuth of 90°, but where the angle is 45° or greater, sufficient improvement effects as compared to the case of parallel alignment can be expected.

Figure 33:
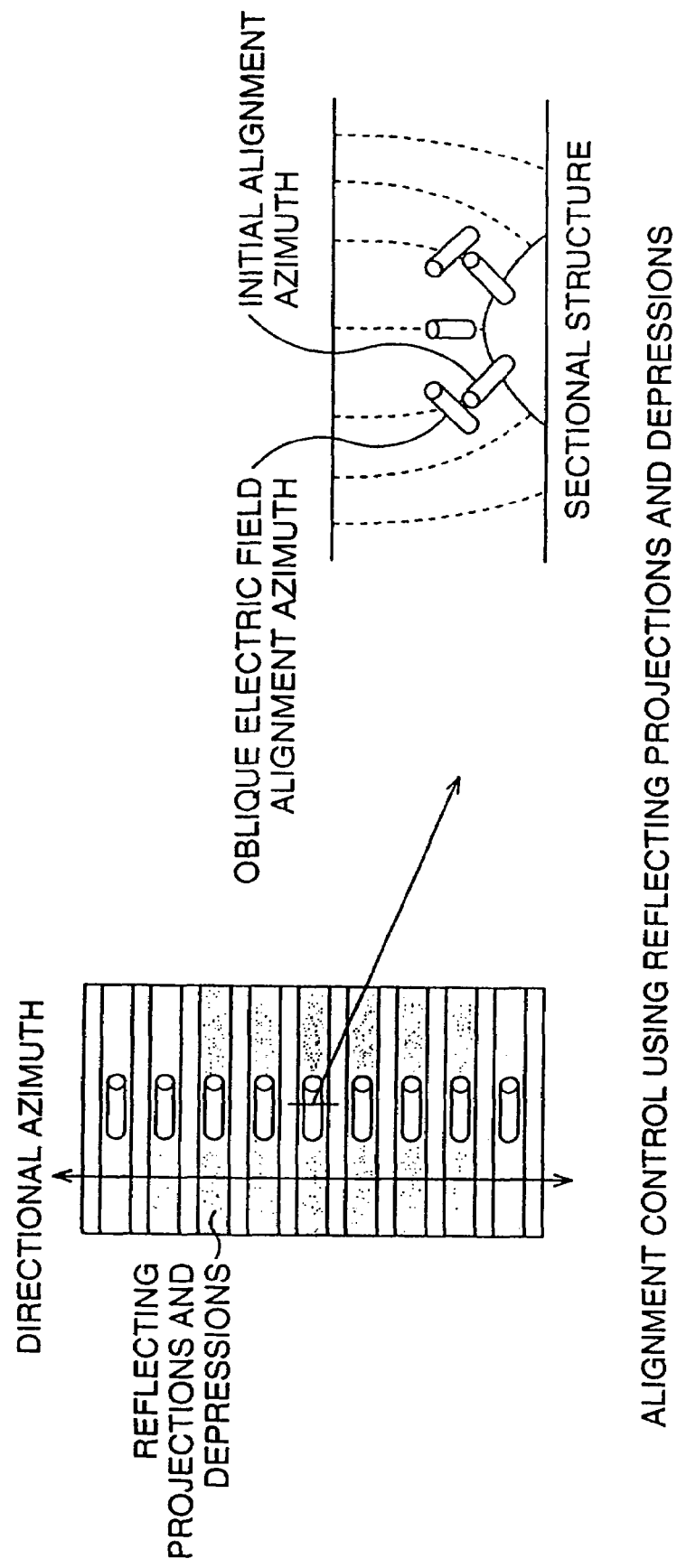
FIG. 33 is a schematic view showing a plane shape of a directional reflector used in a third embodiment.

FIG. 33 is a schematic view showing a plane shape of a directional reflector used in this embodiment.

The directional reflector is made by forming continuous projections and depressions in the shape of protrusions using a resist on a glass substrate, and depositing an aluminum film on the surface. The tilt surfaces of the reflecting projections and depressions are oriented toward almost the directional azimuths (90° azimuth and 270° azimuth) in which the reflection intensity is maximum. Since the reflecting projections and depressions function as conductive protrusions, the azimuth in which the liquid crystal initially tilts and the azimuth in which the liquid crystal is tilt-aligned due to an oblique electric field are opposite, so that the liquid crystal is aligned in an azimuth different by about 90° from the directional azimuth. A directional reflector and a non-directional reflector were used to produce reflection-type liquid crystal elements. Here, rubbing was performed in a 0° azimuth only for the opposite substrate, and liquid crystal having a negative dielectric constant anisotropy (manufactured by Merck KGaA) was injected.

The polarizing plate, retardation plates, reflection-type liquid crystal element were arranged in layers in the configuration shown in FIG. 29, and the contrast ratio was measured in the directional azimuth with respect to a 30° incidence. The contrast ratio of the reflection-type liquid crystal display device using the directional reflector was about 1.5 times that of a reflection-type liquid crystal display device using the non-directional reflector. The retardation of the initially aligned liquid crystal is canceled because the azimuth in which the liquid crystal is tilt-aligned due to the reflecting projections and depressions and the azimuth in which the liquid crystal is tilt-aligned by the rubbing are different by 90° from each other in the reflection-type liquid crystal display device using the directional reflector, while the retardation of the initially aligned liquid crystal is not canceled because the azimuth in which the liquid crystal is tilt-aligned due to the reflecting projections and depressions is random in the reflection-type liquid crystal display device using the non-directional reflector. This greatly affects the contrast ratio.

Besides, in the observation of the alignment performed with the λ/4 plate removed, it was found that the alignment was in almost the same azimuth in the reflection-type liquid crystal display device using the directional reflector, while deflection in alignment azimuth, called φ-deflection, occurred in the reflection-type liquid crystal display device using the non-directional reflector. This shows that the directional reflector generated alignment control force to improve the alignment stability.

Figure 34:
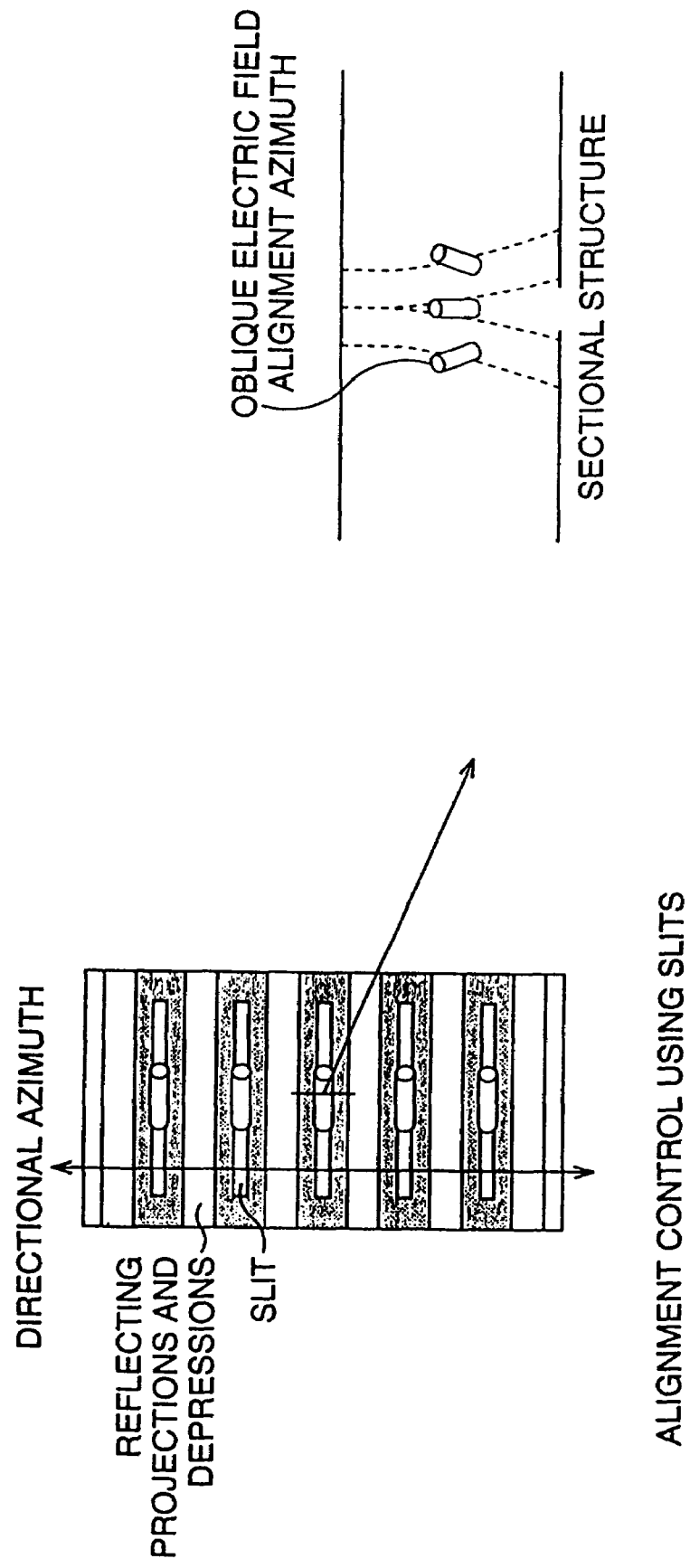
FIG. 34 is schematic view showing a plane shape of a directional reflector with slits used in the third embodiment.

FIG. 34 is schematic view showing a plane shape of a directional reflector with slits used in this embodiment.

The directional reflector is made by forming continuous projections and depressions in the shape of protrusions using a transparent resin (manufactured by JSR Corp.) on a glass substrate, and depositing an aluminum film with slits having a width of 3 μm left in the depressions. The reason why the slits are formed here in the depressions is that the reflection intensity is low in this region and that the cell thickness necessary for the transmission region can be achieved, and the reason why the slit width is set to 3 μm is that the region where an oblique electric field occurs is narrowed to prevent the liquid crystal from being aligned in the azimuth vertical to the tilt surface.

A directional reflector with slits was used to produce a reflection-type/transmission-type liquid crystal display device. Here, rubbing processing was performed in a 0° azimuth only for the opposite substrate, and liquid crystal having a negative dielectric constant anisotropy was injected. In the observation of the alignment performed with the λ/4 plate removed, it was found that alignment azimuths on and near the slits were almost the same, and there occurred no φ-deflection even though the slits were formed in the directional reflector.

As has been described, in the reflection-type liquid crystal display device according to this embodiment, the contrast ratio can be maximum in an azimuth in which the reflection intensity is maximum due to the reflecting projections and depressions, thereby making it possible to realize display that is easy to view even when light is incident from a specific azimuth such as in an indoor environment.

Fourth Embodiment

A fourth embodiment will be described below in detail using the drawings.

FIG. 35A is a characteristic diagram showing azimuth dependence of the reflectance of a polarizing plate+a λ/4 plate, and FIG. 35B is a characteristic diagram showing azimuth dependence of the reflectance of a polarizing plate+a broadband λ/4 plate. The reflectance is a value with respect to a 30° incidence and 0° light reception (the substrate normal), and the reflector in use is a non-directional reflector having no azimuthal anisotropy in reflection intensity. In FIG. 35A, an absorption axis of a polarizing plate (manufactured by Sumitomo Chemical Co., Ltd.) was placed at 0°, and a slow axis of a λ/4 plate (in-plane retardation of 138 nm, thickness retardation of 53 nm, manufactured by Sekisui Chemical Co., Ltd.) was placed at 45°, and in FIG. 35B, the absorption axis of the polarizing plate was placed at 0°, a slow axis of a λ/2 plate (in-plane retardation of 275 nm, thickness retardation of 130 nm (manufactured by Sekisui Chemical Co., Ltd.)) was placed at 10°, and the slow axis of the λ/4 plate was placed at 65°.

Besides, a λ/4 plate and a λ/2 plate having no wavelength dispersion nor retardations in the thickness direction and a λ/4 plate and a λ/2 plate having wavelength dispersion but no retardations in the thickness direction, were set separately to obtain the azimuth dependence of reflectance by calculation. FIGS. 35A and B show that (1) the reflectance increases depending on the axial azimuth, wavelength dispersion, and retardation in the thickness direction (Rth) of the retardation plate, and (2) the broadband λ/4 plate has less wavelength dispersion and its azimuth in which the reflectance is minimum deviates from the azimuth of the polarization axis depending on Rth. The reflectance increase due to the axial azimuth occurs by no birefringence exhibited, the reflectance increase due to the wavelength dispersion occurs by deviation of retardation from λ/4 at wavelengths other than 550 nm, and the reflectance increase due to Rth occurs by addition of negative retardation. The difference in reflectance between the retardation plate having Rth and the retardation plate having no Rth is the reflectance increase due to Rth, which is different depending on the azimuth.

FIG. 36 shows schematic plane views showing plane shapes of reflectors used in this embodiment.

Figure 36A:
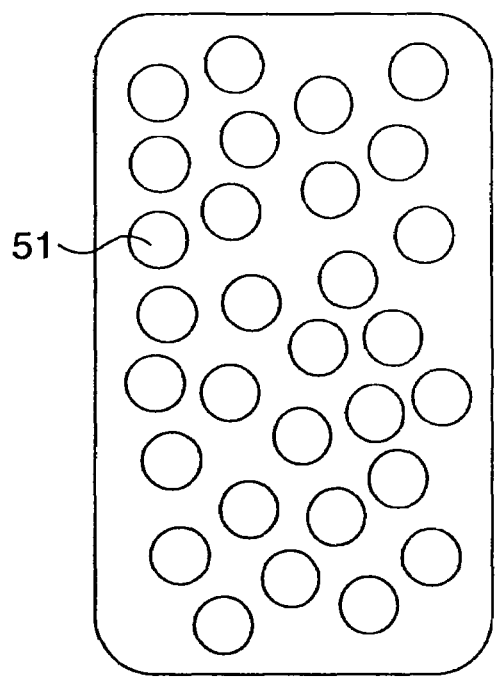
FIG. 36A and FIG. 36B are schematic plane views showing plane shapes of reflectors used in a fourth embodiment.
Figure 36B:
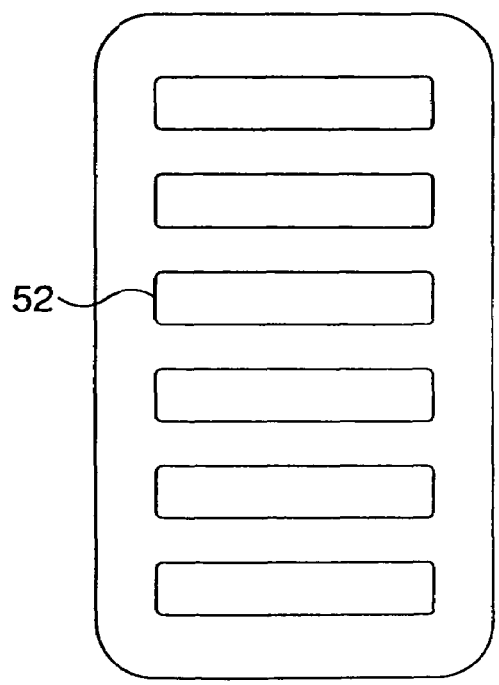

FIG. 36A shows a non-directional reflector in which reflecting projections and depressions 51 in the shape of dots with tilt surfaces oriented toward all azimuths are formed on pixel electrodes, and FIG. 36B shows a directional reflector in which reflecting projections and depressions 52 in the shape of steps with tilt surfaces oriented toward top and bottom (90° and 270°) azimuths are formed on pixel electrodes, respectively.

Figure 37:
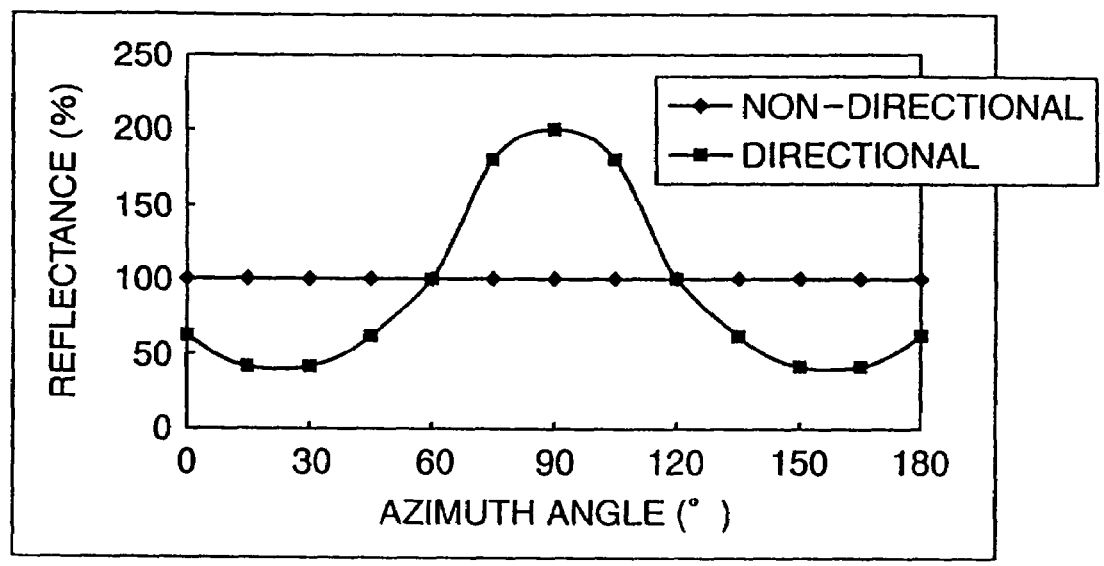
FIG. 37 is a characteristic diagram showing azimuth dependence of the reflectance of a reflector.

FIG. 37 is a characteristic diagram showing azimuth dependence of the reflectance of a reflector.

A non-directional reflector exhibits a uniform reflectance in all azimuths, while a directional reflector shows a reflectance of twice the above reflectance in the directional azimuth (90°) and a reflectance of 60 percent of the above reflectance in the non-directional azimuths (0° and 180°).

Figure 38A:
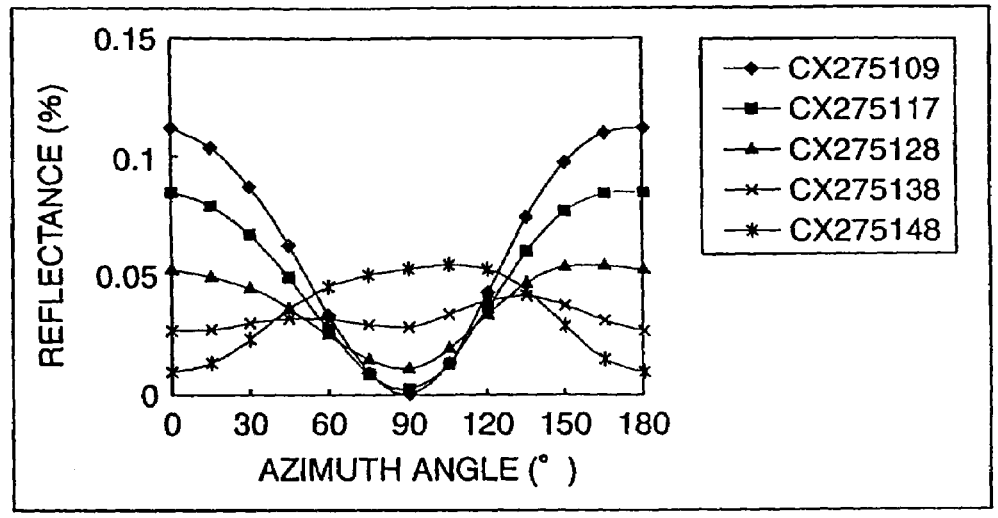
FIG. 38A is a characteristic diagram showing azimuth dependence of reflectance (for a non-directional reflector) of a polarizing plate+a broadband $\lambda/4$ plate+a liquid crystal layer when the in-plane retardation of a $\lambda/4$ plate can be changed between 109 nm and 148 nm.
Figure 38B:
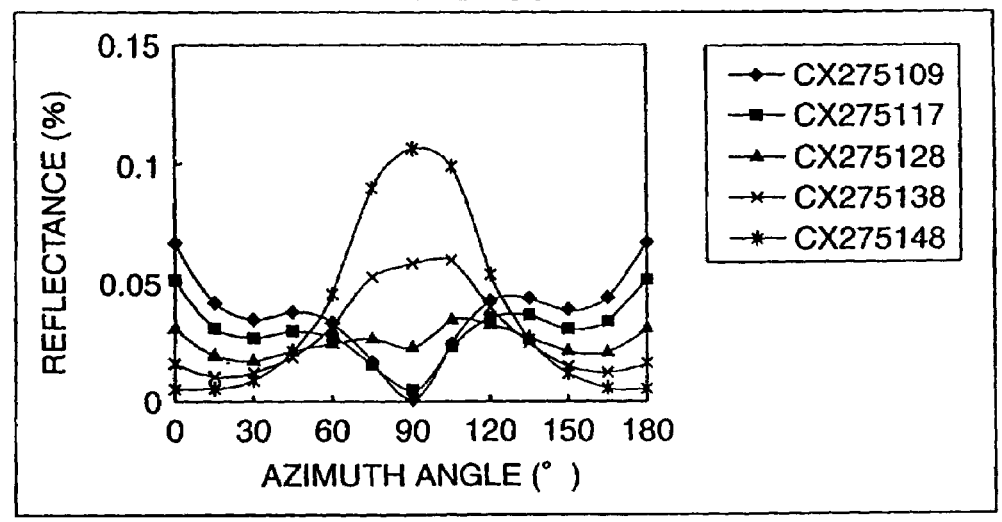
FIG. 38B is a characteristic diagram showing azimuth dependence of reflectance (for a directional reflector) of a polarizing plate+a broadband λ/4 plate+a liquid crystal layer when the in-plane retardation of a λ/4 plate can be changed between 109 nm and 148 nm.

FIG. 38 shows characteristic diagrams each showing azimuth dependence of the reflectance of a polarizing plate+a broadband λ/4 plate+a liquid crystal layer when the in-plane retardation of a λ/4 plate can be changed between 109 nm and 148 nm, for each reflector (A: non-directional reflector, B: directional reflector).

Here, the liquid crystal layer is produced by bonding substrates with Micro-pearl spacer (manufactured by Sekisui Fine Chemical Co., Ltd.) with a diameter of 3 μm intervening therebetween, and injecting negative type liquid crystal (Δn=0.0995, manufactured by Merck KGaA) between the substrates, and is kept in a state where no voltage is applied. Further, the entire axial placement is rotated 30° to the left to set the absorption axis of the polarizing plate at 30° so that the reflectance is minimum in the directional azimuth. Where there is no optical compensation plate, Rth increases in the directional azimuth when the retardation of the λ/4 plate is decreased (preferably, to about 110 nm to 120 nm), so that the retardation of the liquid crystal layer is correspondingly compensated to decrease the reflectance. In contrast to the above, Rth decreases in the non-directional azimuth to increase the reflectance, but application of the directional reflector enables the reflectance to be kept unchanged from that before the change of the retardation plate.

Figure 39A:
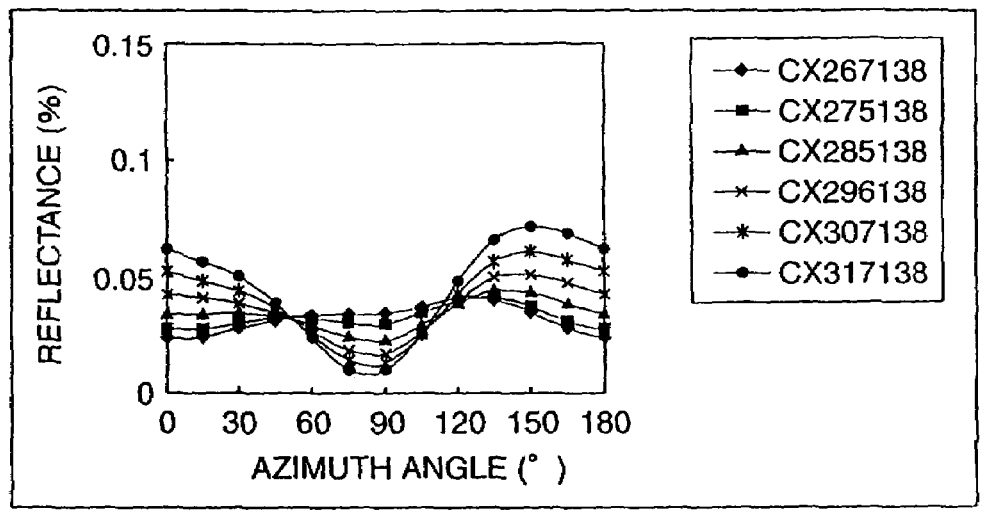
FIG. 39A is a characteristic diagram showing azimuth dependence of the reflectance (for a non-directional reflector) of a polarizing plate+a broadband λ/4 plate+a liquid crystal layer when the in-plane retardation of a λ/2 plate can be changed between 267 nm and 317 nm.
Figure 39B:
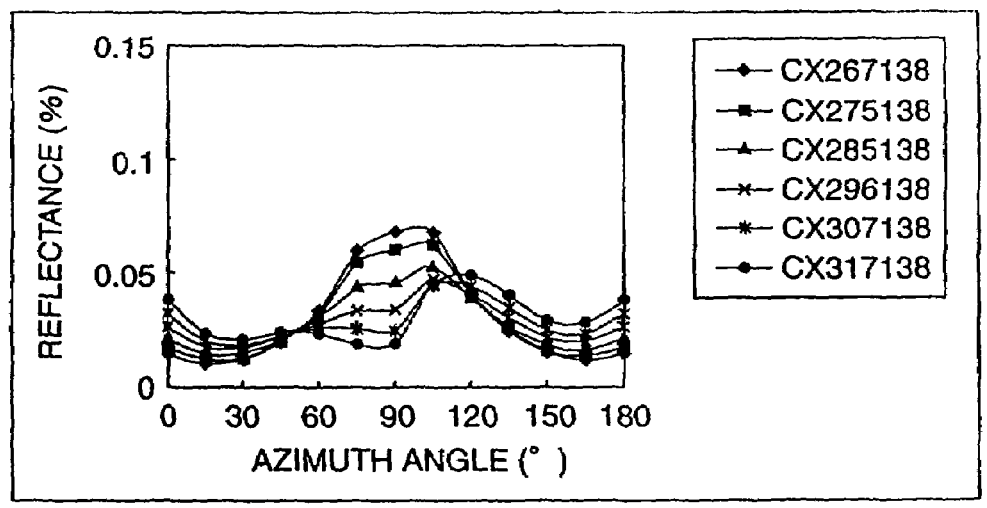
FIG. 39B is a characteristic diagram showing azimuth dependence of reflectance (for a directional reflector) of a polarizing plate+a broadband λ/4 plate+a liquid crystal layer when the in-plane retardation of a λ/2 plate can be changed between 267 nm and 317 nm.

FIG. 39 shows characteristic diagrams each showing azimuth dependence of the reflectance of a polarizing plate+a broadband λ/4 plate+a liquid crystal layer when the in-plane retardation of a λ/2 plate can be changed between 267 nm and 317 nm, for each reflector (A: non-directional reflector, B: directional reflector).

Rth increases in the directional azimuth when the in-plane retardation of the λ/2 plate is increased (preferably to about 300 nm to 320 m), so that the retardation of the liquid crystal layer is correspondingly compensated to decrease the reflectance.

Figure 40:
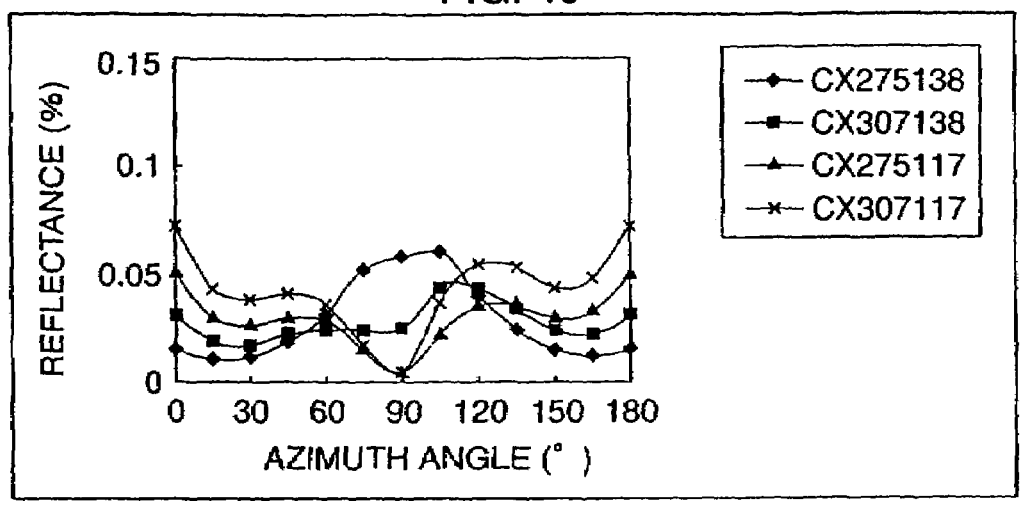
FIG. 40 is a characteristic diagram showing, on a directional reflector, azimuth dependence of the reflectance of a polarizing plate+a broadband λ/4 plate+a liquid crystal layer when the in-plane retardations of both a λ/4 plate and a λ/2 plate can be changed.

FIG. 40 is a characteristic diagram showing, on a directional reflector, azimuth dependence of the reflectance of a polarizing plate+a broadband λ/4 plate+a liquid crystal layer when the in-plane retardations of both a λ/4 plate and a λ/2 plate can be changed. The reflectance in the directional azimuth also decreases by changing the in-plane retardations of both the λ/4 plate and the λ/2 plate. However, the reflectance increase in the non-directional azimuth is more moderate when they are individually changed.

From the above description, where there is no optical compensation plate, the applicable wavelength of the λ/4 plate is small and the applicable wavelength of the λ/2 plate is large, whereby the reflectance can be decreased in the directional azimuth to increase the contrast ratio. Here, it is preferable that the applicable wavelength of the λ/4 plate is about 440 nm to 480 nm and the applicable wavelength of the λ/2 plate is about 600 nm to 640 nm, and that the applicable wavelengths of the respective wavelength plates are made different by a range within less than 200 nm.

Figure 41:
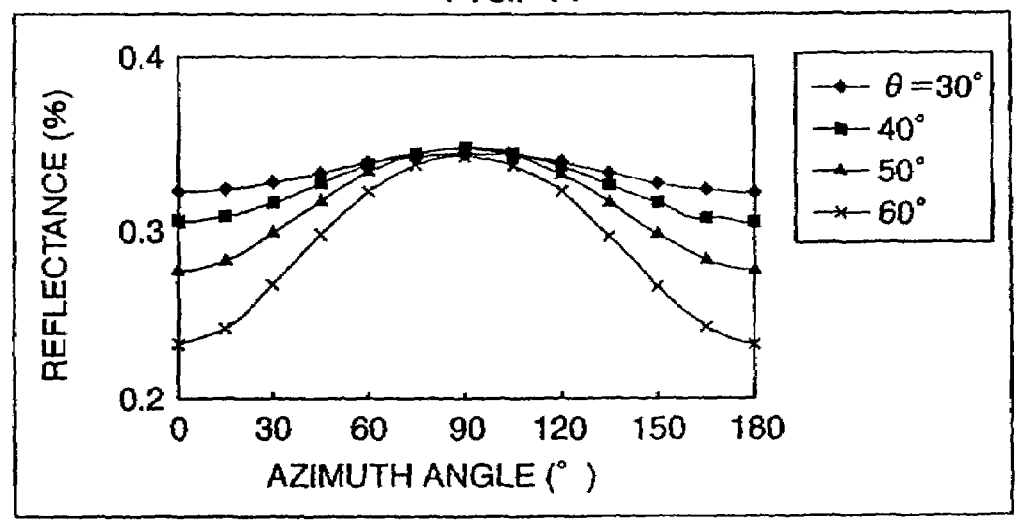
FIG. 41 is a characteristic diagram showing azimuth dependence of the reflectance of a polarizing plate for every polar angle.

FIG. 41 is a characteristic diagram showing azimuth dependence of the reflectance of a polarizing plate for every polar angle.

The azimuths of an absorption axis of the polarizing plate are at 0° and 180° here, and it is shown that the reflectance is decreased in the azimuth of the absorption axis as absorption characteristics of the polarizing plate. The azimuth of a transmission axis of the polarizing plate is arranged within an angle range parallel or nearly parallel to the directional azimuth in which the reflection intensity is maximum in this embodiment, but if the azimuth of the absorption axis of the polarizing plate is arranged within the angle range parallel or nearly parallel to the directional azimuth, the reflectance in white display is also decreased. In other words, when the polarizing plate and the broadband λ/4 plate are rotated 90° from the axial placement of this embodiment, the magnitude relation between the respective wavelength plates is reversed, but, in that axial placement, the reflectance in white display is decreased in the directional azimuth, leading to less improved contrast ratio.

FIG. 42 shows characteristic diagrams each showing azimuth dependence of the reflectance of a polarizing plate+a broadband λ/4 plate+an optical compensation plate+a liquid crystal layer when the in-plane retardation of a λ/4 plate can be changed between 128 nm and 159 nm, for each reflector (A: non-directional reflector, B: directional reflector).

Here, an absorption axis of the polarizing plate was placed at 0°, a slow axis of a λ/2 plate was placed at 10°, a slow axis of the λ/4 plate was placed at 65°, and a slow axis of the optical compensation plate (in-plane retardation of 2 nm, thickness retardation of 150 nm, manufactured by Sumitomo Chemical Co., Ltd.) was placed at 65°. In the configuration in FIG. 45, the axial placement is not rotated as in the case where there is no optical compensation plate. This is because retardation remaining in the liquid crystal layer causes a positive retardation in the thickness direction, so that the azimuth in which the reflection intensity is minimum deviates from the azimuth of the polarization axis, but canceling most of the positive Rth of the liquid crystal layer by the negative Rth of the optical compensation plate eliminates occurrence of the azimuth deviation.

Where there is an optical compensation plate and most of the retardation of the liquid crystal layer is canceled by the optical compensation plate, the azimuth dependence of the reflectance of the polarizing plate+the broadband λ/4 plate is reflected, so that Rth decreases in the directional azimuth when the retardation of the λ/4 plate is increased (preferably, to about 150 nm) to decrease the reflectance. In contrast to the above, Rth increases in the non-directional azimuth to increase the reflectance, but application of the directional reflector enables the reflectance to be kept unchanged from that before the change of the retardation plate.

Figure 43A:
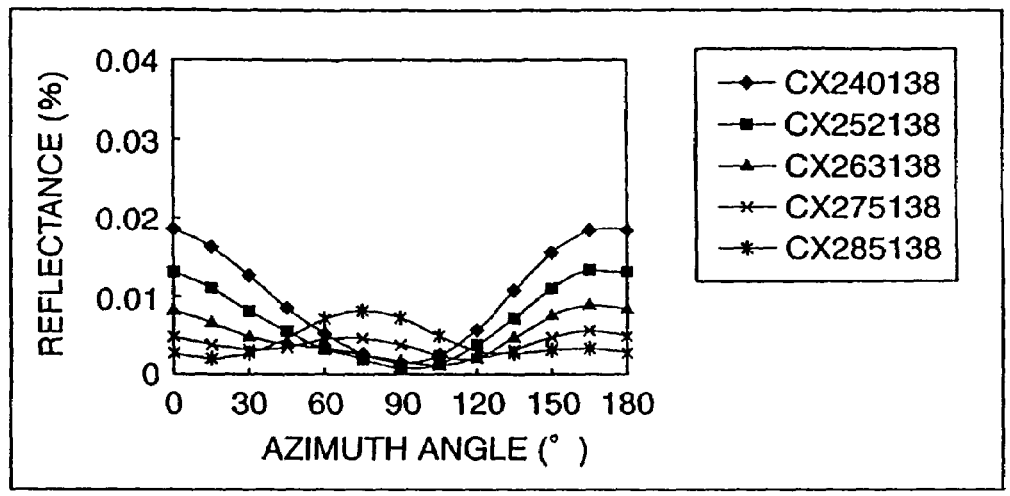
FIG. 43A is a characteristic diagram showing azimuth dependence of the reflectance (for a non-directional reflector) of a polarizing plate+a broadband λ/4 plate+an optical compensation plate+a liquid crystal layer when the in-plane retardation of a λ/2 plate can be changed between 240 nm and 285 nm.
Figure 43B:
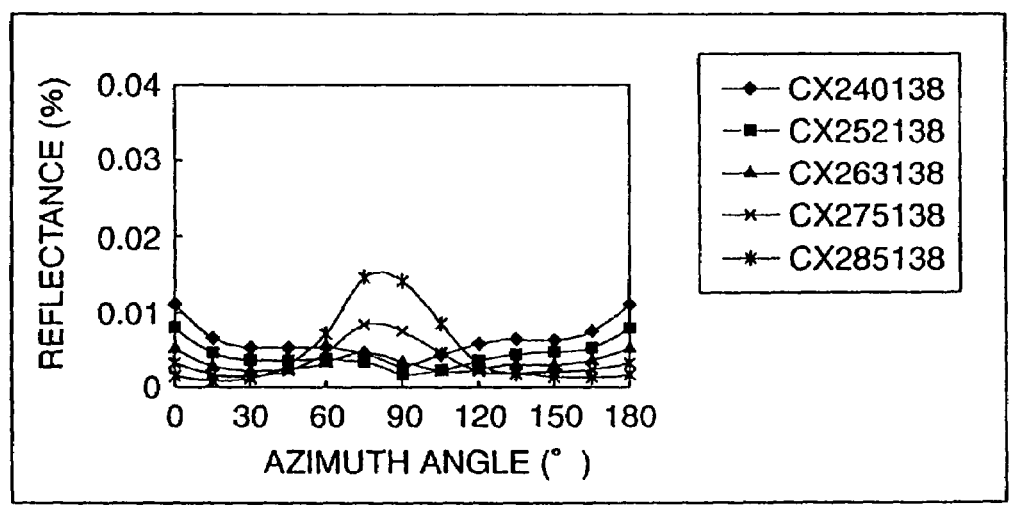
FIG. 43B is a characteristic diagram showing azimuth dependence of the reflectance (for a directional reflector) of a polarizing plate+a broadband λ/4 plate+an optical compensation plate+a liquid crystal layer when the in-plane retardation of a λ/2 plate can be changed between 240 nm and 285 nm.

FIG. 43 shows characteristic diagrams each showing azimuth dependence of the reflectance of a polarizing plate+a broadband λ/4 plate+an optical compensation plate+a liquid crystal layer when the in-plane retardation of a λ/2 plate can be changed between 240 nm and 285 nm, for each reflector (A: non-directional reflector, B: directional reflector).

Rth decreases in the directional azimuth when the in-plane retardation of the λ/2 plate is decreased (preferably to about 240 nm to 260 m), so that the reflectance is decreased.

Figure 44:
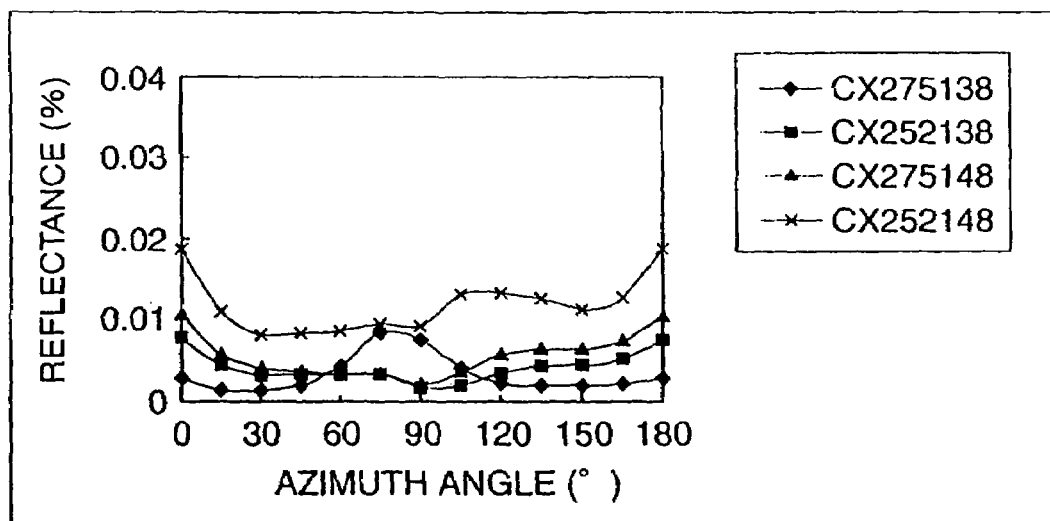
FIG. 44 is a characteristic diagram showing, on a directional reflector, azimuth dependence of the reflectance of a polarizing plate+a broadband λ/4 plate+an optical compensation plate+a liquid crystal layer when the in-plane retardations of both a λ/4 plate and a λ/2 plate can be changed.

FIG. 44 is a characteristic diagram showing, on a directional reflector, azimuth dependence of the reflectance of a polarizing plate+a broadband λ/4 plate+an optical compensation plate+a liquid crystal layer when the in-plane retardations of both a λ/4 plate and a λ/2 plate can be changed.

Since the reflectance in the directional azimuth increases when the in-plane retardations of both the λ/4 plate and the λ/2 plate are changed, they should be individually changed.

From the above description, where there is an optical compensation plate, the applicable wavelength of the λ/4 plate is large and the applicable wavelength of the λ/2 plate is small, whereby the reflectance can be decreased in the directional azimuth to increase the contrast ratio. Here, it is preferable that the applicable wavelength of the λ/4 plate is about 600 nm and the applicable wavelength of the λ/2 plate is about 480 nm to 520 nm, and that the applicable wavelengths of the respective wavelength plates are made different by a range within less than 70 nm.

The above also applies to the case in which a λ/4 plate layered in an orthogonal placement is used as the optical compensation plate. More specifically, an absorption axis of a polarizing plate is placed at 0°, a slow axis of another (second) λ/2 plate is placed at 10°, a slow axis of a (first) λ/2 plate is placed at 65°, and a slow axis of the λ/4 plate is placed at 155°, and the retardation of the λ/2 plate is large and the retardation of the other λ/2 plate is small, whereby the reflectance can be decreased in the directional azimuth to increase the contrast ratio. Here, it is preferable that the λ/2 plate has a retardation of about 290 nm because of including the λ/4 plate as the optical compensation plate and an applicable wavelength of about 580 nm, and the other λ/2 plate has a retardation of about 240 nm to 260 nm and an applicable wavelength of about 480 nm to 520 nm, and that the applicable wavelengths of the respective wavelength plates are made different by a range within less than 70 nm.

As has been described, in the reflection-type liquid crystal display device according to this embodiment, the contrast can be increased in an azimuth in which the reflection intensity is maximum due to the reflecting projections and depressions, thereby making it possible to realize display that is easy to view even when light is incident from a specific azimuth such as in an indoor environment.

What is claimed is:
1. A liquid crystal display device, comprising:
a reflecting layer for reflecting incident light;
a liquid crystal layer provided on said reflecting layer; and
an optical compensation plate provided on a front surface of said liquid crystal layer,
wherein said optical compensation plate has a layer structure constituted of a first retardation plate, a second retardation plate, and a polarizing plate from a side close to said liquid crystal layer,
wherein said first and second retardation plates have uniaxial anisotropies respectively, and both are superposed to create, in a combined manner, a function of a quarter-wave plate and a function of a negative retardation plate,
wherein an angle formed between an absorption axis of said polarizing plate and an optical axis of said second retardation plate is about 45°,
wherein a difference between an in-plane retardation of said second retardation plate and an in-plane retardation of said first retardation plate is set to a quarter wavelength, and
wherein the optical axis of said second retardation plate and an optical axis of said first retardation plate are substantially orthogonal.
2. The liquid crystal display device according to claim 1, wherein said optical compensation plate further includes a half-wave plate on said second retardation plate.
3. The liquid crystal display device according to claim 1, wherein a difference between a retardation of said first retardation plate in a direction vertical to plane thereof and a retardation of said liquid crystal layer is not less than 0 nm nor greater than 200 nm.
4. The liquid crystal display device according to claim 2, wherein where an angle formed between an optical axis of said half-wave plate and an absorption axis of said polarizing plate is θ, the optical axis of said half-wave plate and an optical axis of said second retardation plate is about θ35 45°, wherein a difference between an in-plane retardation of said second retardation plate and an in-plane retardation of said first retardation plate is set to a quarter wavelength, and wherein the optical axis of said second retardation plate and an optical axis of said first retardation plate are substantially orthogonal.

5. The liquid crystal display device according to claim 4, wherein a difference between a sum of retardations of said first and second retardation plates in a direction vertical planes thereof and a retardation of said liquid crystal layer is not less than 0 nm nor greater than 200 nm.

6. The liquid crystal display device according to claim 1, wherein the absorption axis of said polarizing plate forms an angle of not less than 5° nor greater than 30° with respect to alignment directions of liquid crystal molecules of said liquid crystal layer or to tilt directions of the liquid crystal molecules of said liquid crystal layer where voltage is applied.

7. The liquid crystal display device according to claim 1, wherein the in-plane retardation of said first retardation plate is a quarter wavelength.

8. The liquid crystal display device according to claim 7, wherein the in-plane retardation of said first retardation plate is not less than 100 nm nor greater than 180 nm, and the in-plane retardation of said second retardation plate is not less than 200 nm nor greater than 360 nm.

9. The liquid crystal display device according to claim 1, wherein alignment of said liquid crystal layer is twisted nematic or vertical.

* * * * *

UNITED STATES PATENT AND TRADEMARK OFFICE
CERTIFICATE OF CORRECTION

PATENT NO. : 7,630,039 B2
APPLICATION NO. : 11/267839
DATED : December 8, 2009
INVENTOR(S) : Tashiro et al.

It is certified that error appears in the above-identified patent and that said Letters Patent is hereby corrected as shown below:

On the Title Page:

(57)   ABSTRACT

Delete the Abstract and replace it with the following:

-- A liquid crystal display device including a reflecting layer, a liquid crystal layer on the reflecting layer and an optical compensation plate on a front surface of the liquid crystal layer. The optical compensation plate has a layer structure including first and second retardation plates and a polarizing plate. The first and second retardation plates have uniaxial anisotropies respectively and both are superposed to create, in a combined manner, functions of a quarter-wave plate and a negative retardation plate. An angle formed between an absorption axis of the polarizing plate and an optical axis of the second retardation plate is about 45°. The difference between an in-plane retardation of the second retardation plate and an in-plane retardation of the first retardation plate is set to a quarter wavelength. The optical axis of the second retardation plate and an optical axis of said first retardation plate are substantially orthogonal. --.

In the Claims:

Col. 42, Line 67, Claim 4:

Delete "about θ.35 45°" and insert -- about θ±45° -- in its place.

Signed and Sealed this

Eleventh Day of May, 2010

David J. Kappos
*Director of the United States Patent and Trademark Office*